United States Patent
Badavas et al.

(10) Patent No.: US 6,510,352 B1
(45) Date of Patent: Jan. 21, 2003

(54) METHODS AND APPARATUS FOR OBJECT-BASED PROCESS CONTROL

(75) Inventors: Paul C. Badavas, Southboro, MA (US); Peter D. Hansen, Wellesley, MA (US)

(73) Assignee: The Foxboro Company, Foxboro, MA (US)

(*) Notice: Subject to any disclaimer, the term of this patent is extended or adjusted under 35 U.S.C. 154(b) by 0 days.

(21) Appl. No.: 09/627,466

(22) Filed: Jul. 28, 2000

Related U.S. Application Data
(60) Provisional application No. 60/146,406, filed on Jul. 29, 1999, and provisional application No. 60/149,276, filed on Aug. 17, 1999.

(51) Int. Cl.[7] .............................................. G05B 11/01
(52) U.S. Cl. .......................... 700/19; 700/18; 700/20; 700/48; 700/49; 700/50; 700/52; 717/1; 717/9; 717/10; 717/11; 709/100; 709/303
(58) Field of Search ............................... 700/19, 18, 20, 700/48, 49, 50, 51, 52; 717/1, 9, 10, 11; 709/1, 100, 103

(56) References Cited

U.S. PATENT DOCUMENTS

| | | |
|---|---|---|
| 3,665,172 A | 5/1972 | Spaargaren et al. |
| 3,810,119 A | 5/1974 | Zieve et al. |
| 3,825,905 A | 7/1974 | Allen, Jr. |
| 4,006,464 A | 2/1977 | Landell |
| 4,096,566 A | 6/1978 | Borie et al. |
| 4,276,593 A | 6/1981 | Hansen |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,410,942 A | 10/1983 | Milligan et al. |
| 4,413,314 A | 11/1983 | Slater et al. |
| 4,423,486 A | 12/1983 | Berner |
| 4,428,044 A | 1/1984 | Liron |
| 4,435,762 A | 3/1984 | Milligan et al. |
| 4,443,861 A | 4/1984 | Slater |
| 4,456,997 A | 6/1984 | Spitza |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,609,995 A | 9/1986 | Hasebe |

(List continued on next page.)

FOREIGN PATENT DOCUMENTS

| | | |
|---|---|---|
| EP | 0 411 869 A3 | 7/1990 |
| WO | WO 95/04314 | 2/1995 |
| WO | WO 96/31047 | 3/1996 |
| WO | WO 96/23377 | 8/1996 |
| WO | WO 97/07486 | 2/1997 |
| WO | WO 98/20649 | 5/1998 |
| WO | WO 98/36518 | 8/1998 |
| WO | WO 98/54843 | 12/1998 |

OTHER PUBLICATIONS

"Apacs Control System," POWER vol. 139, No. 6 (Jun. 1995) p. 81 (Dialog print–out).

Beestermoller, H.J. et al. "An online and offline programmable Multi–Loop Controller for Distributed Systems," IEEE (1994) pp. 15–20.

"Control system," POWER vol. 139, No. 4 (Apr. 1995) p. 114 (Dialog print–out).

(List continued on next page.)

Primary Examiner—Ramesh Patel
(74) Attorney, Agent, or Firm—David J. Powsner; Nutter McClennen & Fish LLP

(57) ABSTRACT

The provides improved control devices, systems and methods for operation thereof. These rely on control devices that provide virtual machine environments in which Java objects, or other such software constructs, are executed to implement control (e.g., to monitor and/or control a device, process or system). These objects define blocks which are the basic functional unit of the control. They also define the input, output and body parts from which blocks are formed, and the signals that are communicated between blocks. The objects also define nested and composite groupings of blocks used to control loops and higher-level control functions.

72 Claims, 18 Drawing Sheets

U.S. PATENT DOCUMENTS

| | | |
|---|---|---|
| 4,615,001 A | 9/1986 | Hudgins, Jr. |
| 4,628,437 A | 12/1986 | Poschmann et al. |
| 4,639,852 A | 1/1987 | Motomiya |
| 4,641,269 A | 2/1987 | Japenga et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,158 A | 7/1987 | Ito et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,704,676 A | 11/1987 | Flanagan et al. |
| 4,709,325 A | 11/1987 | Yajima |
| 4,719,593 A | 1/1988 | Threewitt et al. |
| 4,727,477 A | 2/1988 | Gavril |
| 4,733,366 A | 3/1988 | Devesso et al. |
| 4,742,349 A | 5/1988 | Miesterfeld et al. |
| 4,750,109 A | 6/1988 | Kita |
| 4,790,762 A | 12/1988 | Harms, deceased et al. |
| 4,805,107 A | 2/1989 | Kieckhafer et al. |
| 4,816,996 A | 3/1989 | Hill et al. |
| 4,817,094 A | 3/1989 | Lebizay et al. |
| 4,872,106 A | 10/1989 | Slater |
| 4,897,777 A | 1/1990 | Janke et al. |
| RE33,162 E | 2/1990 | Yoshida et al. |
| 4,910,658 A | 3/1990 | Dudash et al. |
| 4,910,691 A | 3/1990 | Skeirik |
| 4,918,690 A | 4/1990 | Markkula, Jr. et al. |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,121,318 A | 6/1992 | Lipner et al. |
| 5,122,948 A | 6/1992 | Zapolin |
| 5,124,908 A | 6/1992 | Broadbent |
| 5,129,087 A | 7/1992 | Will |
| 5,131,092 A | 7/1992 | Sackmann et al. |
| 5,134,574 A | 7/1992 | Beaverstock et al. |
| 5,136,704 A | 8/1992 | Danielsen et al. |
| 5,138,708 A | 8/1992 | Vosbury |
| 5,140,677 A | 8/1992 | Fleming et al. |
| 5,146,589 A | 9/1992 | Peet, Jr. et al. |
| 5,150,289 A * | 9/1992 | Badavas ................. 700/51 |
| 5,151,978 A | 9/1992 | Bronikowski et al. |
| 5,151,981 A | 9/1992 | Westcott et al. |
| 5,159,673 A | 10/1992 | Sackmann et al. |
| 5,162,986 A | 11/1992 | Graber et al. |
| 5,163,055 A | 11/1992 | Lee et al. |
| 5,164,894 A | 11/1992 | Cunningham-Reid et al. |
| 5,166,685 A | 11/1992 | Campbell, Jr. et al. |
| 5,168,276 A | 12/1992 | Huston et al. |
| 5,168,441 A | 12/1992 | Onarheim et al. |
| 5,175,829 A | 12/1992 | Stumpf et al. |
| 5,193,175 A | 3/1993 | Cutts, Jr. et al. |
| 5,202,961 A | 4/1993 | Mills et al. |
| 5,212,784 A | 5/1993 | Sparks |
| 5,233,615 A | 8/1993 | Goetz |
| 5,245,704 A | 9/1993 | Weber et al. |
| 5,251,125 A | 10/1993 | Karnowski et al. |
| 5,255,367 A | 10/1993 | Bruckert et al. |
| 5,258,999 A | 11/1993 | Wernimont et al. |
| 5,271,013 A | 12/1993 | Gleeson |
| 5,283,729 A | 2/1994 | Lloyd |
| 5,289,365 A | 2/1994 | Caldwell et al. |
| 5,295,258 A | 3/1994 | Jewett et al. |
| 5,297,143 A | 3/1994 | Fridrich et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,346 A | 4/1994 | Fieldhouse |
| 5,307,372 A | 4/1994 | Sawyer et al. |
| 5,307,463 A | 4/1994 | Hyatt et al. |
| 5,309,556 A | 5/1994 | Sismilich |
| 5,317,726 A | 5/1994 | Horst |
| 5,335,221 A | 8/1994 | Snowbarger et al. |
| 5,347,181 A | 9/1994 | Ashby et al. |
| 5,349,343 A | 9/1994 | Oliver |
| 5,352,033 A | 10/1994 | Gresham et al. |
| 5,359,721 A | 10/1994 | Kempf et al. |
| 5,371,895 A | 12/1994 | Bristol |
| 5,377,315 A | 12/1994 | Leggett |
| 5,381,529 A | 1/1995 | Matsushima |
| 5,384,910 A | 1/1995 | Torres |
| 5,390,321 A | 2/1995 | Proesel |
| 5,392,389 A | 2/1995 | Fleming |
| 5,394,522 A | 2/1995 | Sanchez-Frank et al. |
| 5,398,331 A | 3/1995 | Huang et al. |
| 5,400,140 A | 3/1995 | Johnston |
| 5,408,603 A | 4/1995 | Van de Lavoir et al. |
| 5,410,717 A | 4/1995 | Floro |
| 5,420,977 A | 5/1995 | Sztipanovits et al. |
| 5,426,732 A | 6/1995 | Boies et al. |
| 5,428,734 A | 6/1995 | Haynes et al. |
| 5,428,781 A | 6/1995 | Duault et al. |
| 5,432,711 A | 7/1995 | Jackson et al. |
| 5,434,997 A | 7/1995 | Laundry et al. |
| 5,437,007 A | 7/1995 | Bailey et al. |
| 5,444,851 A | 8/1995 | Woest |
| 5,450,403 A | 9/1995 | Ichii et al. |
| 5,450,425 A | 9/1995 | Gunn et al. |
| 5,450,764 A | 9/1995 | Johnston |
| 5,451,939 A | 9/1995 | Price |
| 5,452,201 A | 9/1995 | Pieronek et al. |
| 5,457,797 A | 10/1995 | Butterworth et al. |
| 5,459,825 A | 10/1995 | Anderson et al. |
| 5,459,839 A | 10/1995 | Swarts et al. |
| 5,461,710 A | 10/1995 | Bloomfield et al. |
| 5,463,735 A | 10/1995 | Pascucci et al. |
| 5,467,264 A | 11/1995 | Rauch et al. |
| 5,475,856 A | 12/1995 | Kogge |
| 5,481,741 A | 1/1996 | McKaskle et al. |
| 5,483,660 A | 1/1996 | Yishay et al. |
| 5,485,620 A | 1/1996 | Sadre et al. |
| 5,490,276 A | 2/1996 | Doli, Jr. et al. |
| 5,491,791 A | 2/1996 | Glowny et al. |
| 5,500,934 A | 3/1996 | Austin et al. |
| 5,504,672 A | 4/1996 | Hardiman et al. |
| 5,504,902 A | 4/1996 | McGrath et al. |
| 5,509,811 A | 4/1996 | Homic |
| 5,513,095 A | 4/1996 | Pajonk |
| 5,513,192 A | 4/1996 | Janku et al. |
| 5,513,354 A | 4/1996 | Dwork et al. |
| 5,517,655 A | 5/1996 | Collins et al. |
| 5,519,605 A | 5/1996 | Cawlfield |

| | | |
|---|---|---|
| 5,519,701 A | 5/1996 | Colmant et al. |
| 5,522,044 A | 5/1996 | Pascucci et al. |
| 5,530,643 A | 6/1996 | Hodorowski |
| 5,539,909 A | 7/1996 | Tanaka et al. |
| 5,544,008 A | 8/1996 | Dimmick et al. |
| 5,549,137 A | 8/1996 | Lenz et al. |
| 5,550,980 A | 8/1996 | Pascucci et al. |
| 5,551,047 A | 8/1996 | Mori et al. |
| 5,555,213 A | 9/1996 | DeLong |
| 5,555,437 A | 9/1996 | Packer |
| 5,555,510 A | 9/1996 | Verseput et al. |
| 5,559,691 A | 9/1996 | Monta et al. |
| 5,559,963 A | 9/1996 | Gregg et al. |
| 5,566,320 A | 10/1996 | Hubert |
| 5,568,378 A | 10/1996 | Wojsznis |
| 5,572,673 A | 11/1996 | Shurts |
| 5,576,946 A | 11/1996 | Bender et al. |
| 5,579,220 A | 11/1996 | Barthel et al. |
| 5,579,487 A | 11/1996 | Meyerson et al. |
| 5,581,760 A | 12/1996 | Atkinson et al. |
| 5,586,112 A | 12/1996 | Tabata |
| 5,586,329 A | 12/1996 | Knudsen et al. |
| 5,586,330 A | 12/1996 | Knudsen et al. |
| 5,587,899 A | 12/1996 | Ho et al. |
| 5,594,858 A | 1/1997 | Blevins |
| 5,594,899 A | 1/1997 | Knudsen et al. |
| 5,596,331 A | 1/1997 | Bonaffini et al. ............ 362/455 |
| 5,596,752 A | 1/1997 | Knudsen et al. |
| 5,598,536 A | 1/1997 | Slaughter, III et al. |
| 5,600,845 A | 2/1997 | Gilson |
| 5,604,871 A | 2/1997 | Pecone |
| 5,611,057 A | 3/1997 | Pecone et al. |
| 5,613,148 A | 3/1997 | Bezviner et al. |
| 5,617,540 A | 4/1997 | Civanlar et al. |
| 5,621,871 A | 4/1997 | Jaremko et al. |
| 5,627,979 A | 5/1997 | Chang et al. |
| 5,629,949 A | 5/1997 | Zook |
| 5,630,056 A | 5/1997 | Horvath et al. |
| 5,630,152 A | 5/1997 | DeLuca et al. |
| 5,642,511 A | 6/1997 | Chow et al. |
| 5,649,121 A | 7/1997 | Budman et al. |
| 5,655,092 A | 8/1997 | Ojala |
| 5,659,680 A | 8/1997 | Cunningham et al. |
| 5,664,101 A | 9/1997 | Picache |
| 5,664,168 A | 9/1997 | Yishay et al. |
| 5,671,374 A | 9/1997 | Postman et al. |
| 5,676,141 A | 10/1997 | Hollub |
| 5,680,404 A | 10/1997 | Gray |
| 5,680,409 A | 10/1997 | Qin et al. |
| 5,682,476 A | 10/1997 | Tapperson et al. |
| 5,687,316 A | 11/1997 | Graziano et al. |
| 5,701,414 A | 12/1997 | Cheng et al. |
| 5,704,011 A | * 12/1997 | Hansen et al. ................ 700/48 |
| 5,708,779 A | 1/1998 | Graziano et al. |
| 5,719,761 A | 2/1998 | Gatti et al. .................... 700/1 |
| 5,726,912 A | 3/1998 | Krall, Jr. et al. ............ 702/186 |
| 5,727,128 A | 3/1998 | Morrison |
| 5,732,218 A | 3/1998 | Bland et al. |
| 5,737,529 A | 4/1998 | Dolin, Jr. et al. |
| 5,742,762 A | 4/1998 | Scholl et al. |
| 5,748,467 A | 5/1998 | Qin et al. |
| 5,751,574 A | 5/1998 | Loebig |
| 5,752,007 A | 5/1998 | Morrison |
| 5,752,008 A | 5/1998 | Bowling |
| 5,752,246 A | 5/1998 | Rogers et al. |
| 5,754,772 A | 5/1998 | Leaf |
| 5,758,073 A | 5/1998 | Liang et al. |
| 5,758,075 A | 5/1998 | Graziano et al. |
| 5,761,518 A | 6/1998 | Boehling et al. |
| 5,764,906 A | 6/1998 | Edelstein et al. |
| 5,768,119 A | 6/1998 | Havekost et al. |
| 5,768,510 A | 6/1998 | Gish |
| 5,774,670 A | 6/1998 | Montulli |
| 5,777,874 A | 7/1998 | Flood et al. |
| 5,790,791 A | 8/1998 | Chong et al. |
| 5,793,963 A | 8/1998 | Tapperson et al. |
| 5,796,602 A | 8/1998 | Wellan et al. |
| 5,797,038 A | 8/1998 | Crawford et al. |
| 5,801,770 A | 9/1998 | Paff et al. |
| 5,801,942 A | 9/1998 | Nixon et al. |
| 5,805,442 A | 9/1998 | Crater et al. |
| 5,805,922 A | 9/1998 | Sim et al. |
| 5,822,220 A | 10/1998 | Baines |
| 5,828,851 A | 10/1998 | Nixon et al. |
| 5,831,669 A | 11/1998 | Adrain |
| 5,832,418 A | 11/1998 | Meyer ........................ 702/119 |
| 5,838,920 A | 11/1998 | Rosborough ................ 709/224 |
| 5,841,360 A | 11/1998 | Binder |
| 5,841,963 A | 11/1998 | Nakamikawa et al. |
| 5,844,601 A | 12/1998 | McPheely et al. |
| 5,844,804 A | * 12/1998 | Schussler .................... 700/193 |
| 5,847,957 A | 12/1998 | Cohen et al. |
| 5,854,750 A | * 12/1998 | Phillips et al. .............. 700/181 |
| 5,854,944 A | 12/1998 | Catherwood et al. |
| 5,862,052 A | 1/1999 | Nixon et al. |
| 5,872,992 A | 2/1999 | Tietjen et al. |
| 5,873,089 A | 2/1999 | Regache |
| 5,874,990 A | 2/1999 | Kato |
| 5,880,775 A | 3/1999 | Ross |
| 5,909,586 A | 6/1999 | Anderson |
| 5,920,479 A | 7/1999 | Sojoodi et al. |
| 5,930,768 A | 7/1999 | Hooban |
| 5,956,487 A | 9/1999 | Venkatraman et al. |
| 5,975,737 A | 11/1999 | Crater et al. |
| 5,980,078 A | 11/1999 | Krivoshein et al. ............ 700/1 |
| 5,980,090 A | 11/1999 | Royal, Jr. et al. |
| 5,982,362 A | 11/1999 | Crater et al. |
| 5,994,998 A | 11/1999 | Fisher et al. |
| 6,002,104 A | * 12/1999 | Hsu ........................ 219/130.5 |
| 6,014,591 A | 1/2000 | Ikeda ........................ 361/119 |
| 6,014,612 A | 1/2000 | Larson et al. ............... 702/183 |
| 6,026,352 A | 2/2000 | Burns et al. ................ 702/182 |
| 6,035,264 A | 3/2000 | Donaldson et al. ......... 702/182 |
| 6,049,775 A | 4/2000 | Gertner et al. ................. 705/8 |
| 6,055,633 A | 4/2000 | Schrier et al. |
| 6,061,603 A | 5/2000 | Papadopoulos et al. |
| 6,078,320 A | 6/2000 | Dove et al. ................ 345/860 |
| 6,085,120 A | * 7/2000 | Schwerdtfeger et al. ...... 700/90 |
| 6,094,600 A | 7/2000 | Sharpe, Jr. et al. ........... 700/19 |
| 6,115,468 A | 9/2000 | De Nicolo |
| 6,139,177 A | 10/2000 | Venkatraman et al. |
| 6,140,911 A | 10/2000 | Fisher et al. |
| 6,151,625 A | 11/2000 | Swales et al. |
| 6,176,421 B1 | 1/2001 | Royal, Jr. et al. |
| 6,195,694 B1 * | 2/2001 | Chen et al. ................ 709/220 |
| 6,195,774 B1 * | 2/2001 | Jacobson .................... 714/727 |
| 6,201,996 B1 | 3/2001 | Crater et al. |
| 6,218,930 B1 | 4/2001 | Katzenberg et al. |
| 6,260,187 B1 * | 7/2001 | Cirne ........................... 717/1 |
| 6,272,556 B1 * | 8/2001 | Gish ........................ 709/315 |

OTHER PUBLICATIONS

Duffey, C.K. et al. "High–Level Control Language Customizes Application Programs," IEEE (Apr. 1991) pp. 15–18.

Gyorki, John R. "PLCs drive standard buses," Machine Design (May 11, 1995) pp. 83–90.

"New Telemacanique Programmable Controllers Feature Multiple Programming Languages," (Feb. 11, 1985) (Dialog print–out).

Peshek, Clifford J. and Mellish, Michael T. "Recent Developments and Future Trends in PLC Programming Languages and Programming Tools for Real–Time Control," IEEE Cement Industry Technical Conference (May 1993) Toronto, Canada pp. 219–230.

Stapleton, N. "802.3 Working Group DTE Power via MDI Call for interest," 3Com Jul. 1999.

Berge, Jonas. "Using Ethernet is a no–brainer," *InTech: The International Journal for Measurement and Control* Jul. 2000, pp. 36–39.

Stevens, et al. "TCP/IP Illustrated, vol. 1. The Protocols," *TCP/IP Illustrated* vol. 1, XP–002106390, pp. 85–96.

*ICCard Design* Sep./Oct. 1995.

Strack, Bob. "The HAWK is Soaring," *Chemical Processing* (May 1996) p. 11.

"Control System Features Plug–and–Play Technology, Scalability," *Chemical Processing* (May 1996), p. 33.

"Editors' Product Picks," *Chemical Processing* (May 1996), p. 34.

"Tribe Computer Works' Net Products Can be Managed via World Wide Web," IAC (SM) Newsletter Database™, DataTrends Publications, Inc., No. 11, vol. 7, May 30, 1995.

"Briefs," Network World, May 29, 1995, p. 19.

Wilder, Clinton, "Network Management; Fussing Nets Via The Web—Tribe's WebManage uses popular interface," InformationWeek, May 29, 1995, p. 62.

"Pipeline; Announced," InfoWorld, May 29, 1995, p. 45.

Bernard, Viki, "Remote–access ware emerge; Shiva, Nortel, and Tribe leading list of innovators," PCWeek, No. 21, vol. 12, May 29, 1995, p. 47.

"Tribe Announces Revolutionary Use of the Internet; Launches Innovative Remote Management Solution; New WebManage Technology Provides Network Management via World Wide Web," Business Wire, May 22, 1995.

"Tribe Launches First Networking Device Capable of Being Managed via Internet Web Browser; TribeLine2 Enables Remote Computing and Internet Access," Business Wire, May 22, 1995.

Dryden, Patrick, "Tribes WebManage Enables Remote Fixes," ComputerWorld, May 22, 1995, p. 14.

Ko, Diffu, "Trobe defines net management role for Web browser software," Network World, May 22, 1995, p. 14.

"Tour an actual TribeLink via WebManage," web page print–out from http://www.tribe.com/products/webmanage/quick_view.htm. (1 page).

"Tribe Launches Innovative Remote Management Solution; New WebManage Technology Provides Network Management Via the World Wide Web," web page print–out (Jul. 12, 1999) from http://www.tribe.com/products/webmanage/wm_pr. (1 page).

"TribeRoute," web page print–out (Jul. 12, 1999) from http://www.tribe.com/products/tr/index. (3 pages).

"TribeStar," web page print–out from http://www.tribe.com/products/tribestar/index.htm (3 pages).

Pappalardo, Denise, "Router Can Be Managed via Net," Internet Week, May 22, 1995, p. 6.

Rodriguez, Karen, "Tribe sets software," Interactive Age, vol. 2, No. 15, May 22, 1995, p. 25.

Welch, Nathalie, "Tribe to manage via Web; Tribe Computer Works Inc.'s TribeLink2 Product Announcement," MacWEEK, vol. 9, No. 21, May 22, 1995, p. 18.

Pappalardo, Denise, "Digi Introduces IP/IPX Router," InternetWeek, Apr. 24, 1995, p. 15.

"WWWF'94: Papers Received," web page print–out (Apr. 7, 2000) from http://www.ncsa.uiuc.edu/SDG/IT94/Agenda/Papers–received html (8 pages).

Elmer–Dewitt, Philip, "Snowballs in Cyberspace; With a modem and a soldering iron, you too can build an internet site that is really cool and totally useless," Time, Jan. 16, 1995, p. 57.

Scharf, Ronald, et al, "Using Mosaic for Remote Test System Control Supports Distributed Engineering," Institute of Computer–Aided Circuit Design—Test and Testsystems Division, University of Erlangen–Nurnberg, Germany, web page printout from http://www.ncsa.uiuc.edu/SDG/IT94/Proceedings/CSCW/scharf.html (8 pages).

Cox, Mark J. and Baruch, Dr. John E. F. "Robotic Telescopes: An Interactive Exhibit on the World–Wide Web," web page print–out from http://www.ncsa.uiuc.edu/SDG/IT94/Proceedings/Museum/cox/marcox.html (11 pages).

Gleick, James. "Fast Forward; Really Remote Control," The New York Times, Section 6, Column 3, p. 42, Dec. 3, 1995.

Silverman, Dwight. "'Attaboy' for the best software and hardware of 1994," The Houston Chronicle, Dec. 25, 1994, p. 2.

Browne, Malcolme W. "South Pole Ready for Internet Revolution," The New York Times, Section C, Column 1, p. 1, Jan. 10, 1995.

Wolfe, Alexander, "Strong Brew," Electronic Engineering Times, Apr. 8, 1996, p. 73.

"Special Topic: PC–Based Control," A Supplement to Software Strategies, pp. 3–5, 7–8, 10–15, 20–21.

Momal, F. and Pinto–Pereira, C. "Using World–Wide–Web for Control Systems," from Proceedings 1995 International Conference on Accelerator and Large Experimental Physics Control Systems, Chicago, IL, Oct. 30–Nov. 3, 1995.

"The 'Only' Coke Machine on the Internet," web page print–out (Feb. 12, 1999) from http://www.cs.cmu.edu/~coke/history_long.txt (3 pages).

"CMU SCS Coke Machine: Current Status," web page print–out (Feb. 12, 1999) from http://www.cs.cmu.edu/~coke/ (1 page).

"The Switzerland Coke Machine Credits," web page print–out (Feb. 12, 1999) from http://www–swiss.ai.mit.edu/htbin/coke/ (1 page).

"Peter Beebee's Home Page," web page print–out (Feb. 12, 1999) from http://www–swiss.ai.mit.edu/htbin/ptbbgate/jwz/?fetch+personal%2Fmain.text.html (2 pages).

"bsy's List of Internet Accessible Coke Machines," web page print–out (Feb. 12, 1999) from http://www–cse.ucsd.edu/users/bsy/coke.html (1 page).

"Disk Drive with Embedded Hyper–Text Markup Language Server," IBM TDB, vol. 38, n. 12, Dec. 1995, pp. 479–480.

Leon, Mark, "Tektronix to add Web software on new printers," InfoWorld, Dec. 4, 1995, p. 6.

"I/A Series Model 51 FoxRemote II Installation and Configuration Guide," Apr. 8, 1998 (Preliminary), pp. i–iv, 1–2.

"New State–Logic Microcontroller," News Release, Control Technology Corp., Jun. 1, 1996, (DialogWeb search result).

"NEW at IPC/92! Ethernet link provides Global PLC Registers," News Release, Control Technology (US), Nov. 20, 1992, (DialogWeb search result).

"NEW at IPC/92! High–Capacity Integrated Motion Controller," News Release, Control Technology (US) Nov. 20, 1992, (DialogWeb search result).

"Dual–Axis Servo Module for Small Controller," News Release, Control Technology (US), Sep. 11, 1990, (DialogWeb search result).

"Innovative Small Controller Family offers Full Integration," News Release, Control Technology, Aug. 17, 1989, (DialogWeb search result).

AC I/O Modules Available for Low–Cost Automation Controller, News Release, Control Technology Corporation, Jun. 28, 1989, (DialogWeb search result).

"New Small Automation Controller features Precision Analog I/O Modules," News Release, Control Technology (US), May 30, 1989, (DialogWeb search result).

"Inexpensive Automation Controller features Message Display Capability," News Release, Control Technology (US), May 19, 1989, (DialogWeb search result).

"Small Multi–Tasking Controller for Cost–sensitive Applications," News Release, Control Technology US, Nov. 8, 1988, (DialogWeb search result).

"CAD/CAM Software creates Automation 'Programming Environment'," News Release, Control Technology (US), Oct. 3, 1988, (DialogWeb search result).

"Automation Programming Environment runs On IBM (R)—PC," News Release, Control Technology (US), Mar. 29, 1988, (DialogWeb search result).

"Low–Cost Automation Controller features Motion Control, Communications," News Release, Control Technology (US), Mar. 7, 1988, (DialogWeb search result).

"System Provides Stepping Motor Control in Workcell Environment," News Release, Control Technology Corp., Dec. 5, 1986, (DialogWeb search result).

"Multi–Tasking Controller provides High–level Instructions for Motion Control, Sequencing," News Release, Control Technology Corporation, Aug. 22, 1986, (DialogWeb search result).

"Operator's Console creates 'Friendly' Machines," News Release, Control Technology (US), May 9, 1986, (DialogWeb search result).

"Automation Controller features fast 80186 Processor, Integrated Software," News Release, Control Technology (US), Apr. 22, 1986, (DialogWeb search result).

"Plug–Compatible Controls and Actuators Speed System Development," News Release, Control Technology (US), Jan. 12, 1986, (DialogWeb search result).

"Modular Valve Assemblies Connect to Controller with Ribbon Cable," New Product Release, Control Technology (US), Jan. 8, 1986, (DialogWeb search result).

"Linear Actuators offer Plug–Compatibility with Controller," News Release, Control Technology (US), Nov. 21, 1985, (DialogWeb search result).

"Compact System combines Motion Control, Machine Control," News Release, Control Technology, May 28, 1985, (DialogWeb search result).

"Automation Controller accepts Customization," News Release, Control Technology, Jul. 12, 1985, (DialogWeb search result).

"SECS–11 Communication Board Plugs into Automation Controller," News Release, Control Technology, Aug. 26, 1985, (DialogWeb search result).

"Operator's Console for Automated Machines," News Release, Control Technology, Aug. 15, 1985, (DialogWeb search result).

"Programmable Controller offers control of Stepping and Servo Motors," News Release, Control Technology, May 31, 1985, (DialogWeb search result).

Taylor, Ken and Trevelyan, James, "A Telerobot on the World Wide Web," printed from http://telerobot.mech.uwa.edu.au/ROBOT/telerobo.htm (14 pages).

"On–Line Vending Machine and Catalog Product Icons," IBM TDB, v. 38, n. 4 (Apr. 1995), pp. 113–116.

Tinham, Brian, "Getting SCADA by web browsner? Supervisory Control and Data Acquisition," Control and Instrumentation, No. 12, vol. 28, Dec. 1995, p. 5.

"Wizards wheel over SCADA systems; Supervisory Control and Data Acquisition," Control and Instrumentation, No. 12, vol. 28, Dec. 1996, p. 23.

Fulcher, Jim and Dilger, Karen Abramic, "Soft control, Internet spark ISA/96," Manufacturing Systems, vol. 14, No. 12, Dec. 1996, p. 40–46.

"Information technology in manufacturing," Manufacturing Systems, vol. 14, No. 12, Dec. 1996, pp. 54–78.

"A sensation in supervisory control," Manufacturing Systems, (Windows NT in manufacturing Supplement), Oct. 1996, pp. 12A–24A.

Demetratekes, Pam. "Go with the info flow; state–of–the–art automation in the food industry; includes related article on computer software for food processors," Food Processing, vol. 57, No. 7, Jul. 1996, P. 47.

"New Products Provide Interactive Graphics Over Web Using Netscape Plug–Ins and Java," PR Newswire, May 20, 1996.

"Integrated Systems; Industry's top embedded operating software supports Java," M2 Presswire, Mar. 4, 1996.

"ErgoTech upgrades ErgoCim; First 'plug and play' component software for manufacturing," Business Wire, Feb. 15, 1996.

"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.

"Industry's top embedded operating software supports Java; pSOSystem enables Embedded Internet applications and Low–cost Internet appliances," Business Wire, Feb. 1, 1996.

"Gensym introduces G2 WebMiner for accessing and reasoning about data from the World Wide Web," Business Wire, May 15, 1996.

"Gensym introduces Internet connectivity for its G2 family of intelligent real–time software," Business Wire, Mar. 18, 1996.

"Gensym Announces Its Initiative for Leveraging Intelligent Systems with Internet/Intranet Technology," Business Wire, Oct. 7, 1997.

"At Interop, Will ToasterNet Be on the Hot List?" Data Communications, vol. 19, No. 13, Oct. 1990, p. 214.

Zeff, Joe. "Maui Sunset in Real Time (Modems not Optional)," The New York Times, Nov. 27, 1995, Section D, Column 2, p. 5.

Toner, Mike. "Web's view of world far and wide," The Houston Chronicle, Nov. 5, 1995, p. 6.

"Internet windows to the world," New Media Age, Oct. 26, 1995, p. 4.

Foster, Kirsten. "surf's up; lights, camera, but no action; Steve is a Tech–Nomad. He wanders the streets with a camera on his head. And he wants you to join him," The Independent (London), Aug. 13, 1995, p. 10.

Henry, Jim, Ph.D., P.E. "Implementation of Practical Control Systems: Problems and Solutions," web page print–out from http://chem.engr.utc.edu/Documents/MACSCITECH/MACSCITECHpaper1.html (22 pages).

"Jim Henry's 1996 ASEE Paper," web page print–out from http://chem.engr.utc.edu/Documents/ASEE–96–full.html (5 pages).

Henry, Jim, Ph.D., P.E. "LabVIEW Applications in Engineering Labs: Controls, Chemical, Environmental," ASEE Conference, Anaheim, CA, Jun. 25–28, 1995, web page print–out from http://chem.engr.utc.edu/Documents/ASEE–95–full.html (22 pages).

"Breaking News for Invensys Software Systems Employees; iBaan and FactorySuite 2000 Integration Announced," internal e–mail dated Mar. 23, 2001.

Gertz, Matthew, et al. "A Human—Machine Interface for Distributed Virtual Laboratories," IEEE Robotics & Automation Magazine 1 (1994) Dec., No. 4 (New York) pp. 5–13.

Soreide, N. N., et al. "Mosaic access to real–time data from the TOGA–TAO array of moored buoys," Computer Networks and ISDN Systems 28 (1995), pp. 189–197.

Goldstein, Ira and Hardin, Joseph. "Guest editorial," Computer Networks and ISDN Systems 28 (1995) p. 1.

Slater, A. F. "Controlled by the Web," Computer Networks and ISDN Systems 27 (1994) pp. 289–295.

Goldberg, Ken, et al. "Beyond the Web: manipulating the real world," Computer Networks and ISDN Systems 28 (1995) pp. 209–219.

Goldstein, Ira and Hardin, Joseph, "Guest editorial," Computer Networks and ISDN Systems 28 (1995) p. 1.

Goldberg, Ken, et al. "Desktop Teleoperation via the World Wide Web," IEEE International Conference on Robotics and Automation, pp. 654–659.

Redman, Jim, et al. "The Intranet and the Internal Web Server: A Standard User Interface for Integrating Manufacturing Applications," Proceedings of the Industrial Computing Conference Inst. Society of American, vol. 6, No. 1, 1996, pp. 193–202.

* cited by examiner

Figure 2.4-1 Object Model Notation.

Figure 8.1-1 Control and Information Collection Class and Object Architecture.

Figure 8.2-1 Control and Information Collection Signal, Part, and Block Classes

Figure 8.2-2 InputOutput Classes for Intelligent and Standard Devices

Figure 8.2-3 Control and Information Collection Nested Classes

Figure 8.2-4 Architecture for a Typical Block Class.

Figure 8.2-5 Examples of Uni-Directional and Cascade Input and Output Part Classes Figure 8.2.5-1 Loop Composite Class.

Figure 8.2.5-2 PLoop Composite Class

Figure 8.2.5-3 Cascade Composite Class.

Figure 8.3.1-1 TempProcess Composite Class.

Figure 5.4.1-1 Loops2 Control and Process Objects.

Figure 8.4.1-2 Loops2 Control and Process Objects and Detail

Figure 8.2.4-1 TempCasc Control and Process Objects.

Figure 8.2.4-2 TempCasc Control and Process Objects and Data

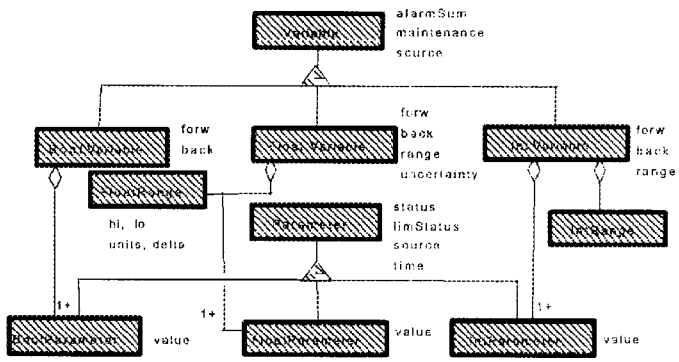

BoolVariable

| | |
|---|---|
| alarmSum (D) | short |
| maintenance (D) | byte |
| source (S) | string |
| forw (D) | BoolParameter |
| back (D) | BoolParameter |

D = Dynamic
S = Static

FloatVariable

| | |
|---|---|
| alarmSum (D) | short |
| maintenance (D) | byte |
| source (S) | string |
| forw (D) | FloatParameter |
| back (D) | FloatParameter |
| range (S) | FloatRange |
| uncertainty (D) | float |

IntVariable

| | |
|---|---|
| alarmSum (D) | short |
| maintenance (D) | byte |
| source (S) | string |
| forw (D) | IntParameter |
| back (D) | IntParameter |
| range (S) | IntRange |

FloatRange

| | |
|---|---|
| hi (S) | float |
| lo (S) | float |
| units (S) | string |
| delta (S) | float |

IntRange

| | |
|---|---|
| hi (S) | short |
| lo (S) | short |

BoolParameter

| | |
|---|---|
| status (D) | byte |
| limStatus (D) | byte |
| source (S) | string |
| time (D) | long |
| value (D) | boolean |

FloatParameter

| | |
|---|---|
| status (D) | byte |
| limStatus (D) | byte |
| source (S) | string |
| time (D) | long |
| value (D) | float |

IntParameter

| | |
|---|---|
| status (D) | byte |
| limStatus (D) | byte |
| source (S) | string |
| time (D) | long |
| value (D) | short |

Rules for Peer-to-Peer Variable and Parameter Transfer

Unidirectional Communication:

A unidirectional variable transfers everything except the "back parameter", which is not instantiated.

- BoolVariable to BoolVariable
- FloatVariable to FloatVariable
- IntVariable to IntVariable
- BoolParameter to BoolParameter
- FloatParameter to FloatParameter
- IntParameter to IntParameter Cascade communication:

Cascade communication is done by transferring the forward parameter in the forward direction and the back parameter in the back direction. The other attributes of the variable are not transferred at runtime.

Figure 8.8.2-2 Variable and Parameter Transfer and Rules.

Figure 18

METHODS AND APPARATUS FOR OBJECT-BASED PROCESS CONTROL

This application claims the benefit of priority of U.S. Patent Application Serial No. 60/146,406, filed Jul. 29, 1999, entitled Process Control Objects, as well as of U.S. Patent Application Serial No. 60/149,276, filed Aug. 17, 1999, entitled Methods and Apparatus for Process Control ("AutoArchitecture"), the teachings of all of the foregoing of which are incorporated herein by reference.

BACKGROUND OF THE INVENTION

The invention pertains to control and, more particularly, to methods and apparatus for implementing process and other control systems at lower cost, with greater flexibility and robustness.

The terms "control" and "control systems" refer to the control of a device or system by monitoring one or more of its characteristics. This is used to insure that output, processing, quality and/or efficiency remain within desired ranges over the course of time. In many control systems, digital data processing or other automated apparatus monitor a device, process or system and automatically adjust its operational parameters or variables. In other control systems, such apparatus monitor the device, process or system and display alarms or other indicia of its characteristics, leaving responsibility for adjustment to the operator.

Control is used in a number of fields. Process control, for example, is typically employed in the manufacturing sector for process, repetitive and discrete manufactures, though, it also has wide application in utility and other service industries. Environmental control finds application in residential, commercial, institutional and industrial settings, where temperature and other environmental factors must be properly maintained. Control is also used in articles of manufacture, from toasters to aircraft, to monitor and control device operation.

Modern day control systems typically include a combination of field devices, controllers, workstations and other more powerful digital data processing apparatus, the functions of which may overlap or be combined. Field devices include temperature, flow and other sensors that measure characteristics of the subject device, process or system. They also include valves and other actuators that mechanically, electrically, magnetically, or otherwise effect the desired control.

Controllers generate settings for the actuator type field devices based on measurements from sensor type field devices. Controller operation is typically based on a "control algorithm" that maintains a controlled device at a desired level, or drives it to that level, by minimizing differences between the values measured values and, for example, a setpoint defined by the operator. Workstations, control stations and the like are typically used to configure and monitor the process as a whole. They are often also used to execute higher-levels of process control, e.g., coordinating groups of controllers and responding to alarm conditions occurring within them.

In an electric power plant, for example, a workstation coordinates controllers that actuate conveyors, valves, and the like, to move coal or other fuels to a combustion chamber. The workstation also configures and monitors the controllers that maintain the dampers that determine the level of combustion. The latter operate, for example, by comparing the temperature of the combustion chamber with a desired setpoint. If the chamber temperature is too low, the control algorithm may call for incrementally opening the dampers, thereby, increasing combustion activity and driving the temperature upwards. As the temperature approaches the desired setpoint, the algorithm incrementally levels the dampers to maintain the combustion level.

The design of control systems and specification of the control algorithms is typically performed using tools known as configurators. An exemplary such tool is provided with the I/A Series® (hereinafter, "IAS" or "I/A") systems, marketed by the assignee hereof. A graphical configurator, FoxCAE,® provided with those systems permits an engineer to model a process hierarchically and to define a control algorithm from that hierarchy. Once configuration is complete, the control algorithm is downloaded to the control devices. This may involve "compiling" the algorithm in order to convert it into code understood by the controllers and other control devices.

While prior art products such as the aforementioned ones by the Assignee hereof continue to meet success in the marketplace, there remains a need for advancement.

In view thereof, an object of this invention is to provide improved methods and apparatus for control. A related object is to provide such methods and apparatus as can be achieved with lower cost, greater flexibility and robustness.

Another object of the invention is to provide such methods and apparatus as facilitate the modeling of control processes by engineers and users alike.

A related object is to provide such methods and apparatus as facilitate the generation of higher-quality modeling software at lower cost and more widespread applicability.

A further object is to provide such methods and apparatus as can be used in process and other control systems.

SUMMARY OF THE INVENTION

The foregoing are among the objects attained by invention which provides, in one aspect, an improved control device for a process or other control system. The device provides a virtual machine environment in which Java objects, or other such software constructs, are executed to implement control (e.g., to monitor and/or control a device, process or system). These objects, referred to herein as process control objects (PCOs), define blocks, which are the basic functional unit of the control. They also define the input, output and body parts from which blocks are formed, and the signals that are communicated between blocks. PCOs also define nested and composite groupings of blocks used to control loops and higher-level control functions.

By way of non-limiting example, a control system with devices according to the invention can have a workstation and controllers, each providing a Java virtual machine (JVM) environment. Executing on the devices are Java PCOs embodying their respective control functions and signaling. Thus, PCOs executing in each controller monitor and control sensors and actuators under that controller's purview. PCOs executing in the workstation monitor and control the controllers themselves (as well, perhaps, as monitoring the outputs of some of the field devices). Intelligent field devices in the control system may also execute PCOs, thereby, further distributing the control function and taking up tasks otherwise handled by the controllers and workstation.

Referential Communication Between Process Control Entities

Further aspects of the invention provide control devices as described above in which individual data, such as measurements, setpoints or other values, are communicated block-type PCOs by reference. To this end, only one object of each pair of objects between which a given datum is communicated stores the datum itself, e.g., by non-limiting example, in a data structure referred to as below as a "variable." The other block maintains only a reference, i.e., a pointer, address, symbolic or other reference, to the datum. In order to access the sole instance of the datum as between at least those two blocks, the latter block interrogates—or, if permitted, sets the value of—the datum by using the pointer, address or other reference.

A given datum, according to further aspects of the invention, can be maintained in the block that is the logical and/or physical source of the measurement, setpoint or other value to which it pertains. For example, a PCO embodying an analog input (AIN) block maintains a data structure containing data measured by it. PCO blocks that use those measurements access that data structure and, thereby, the data, by reference.

The data structures embodying data can themselves be PCOs, e.g., by non-limiting example, instantiated from the "signal" class described in the detailed description, below. According to further aspects of the invention, in addition to storing specific measurements, setpoints or values (e.g., the "variables" described below), these data structures can maintain range, status, time stamps and/or other information pertaining to them.

Thus, for example, a "float" variable data structure in a PCO analog input block maintained in a thermocouple sensor device can have, in addition to a floating point value representing the temperature value measured by that device, range values representing permissible upper and lower values for the measured temperatures. It can also have status values representing signal quality (e.g., SEVA values of the type discussed elsewhere herein) and/or initialization state; limit status for signal limiting and connection status; timestamp values identifying when the value was last changed; among others. According to related aspects of the invention, the "limit status" can include a flag, e.g., a "publish" bit, indicating whether the subject datum has been communicated to other elements of the control system, e.g., by "publication."

An advantage of devices using PCOs that communicate data, i.e., establish "connections," in the manner described above is that they minimize the unnecessary duplication of data and the attendant cost of maintaining coherency. A further advantage is that they can more readily propagate variables and their attendant values, ranges, and so forth, throughout the system.

With respect to this latter point, a control system having devices as described above will typically implement a control scheme wherein a value generated (or measured) by single block is used by several downstream blocks. Thus, for example, a PCO block maintained by a thermocouple field device might be connected to a PCO control block executing in a controller that processes the thermocouple output to adjust a fuel intake valve. It might also be connected to a PCO control block executing in an intelligent field device that adjusts a damper level.

The use of data structures as described above facilitate establishing common values, ranges, and so forth, e.g., for the thermocouple output, among all of the PCO blocks that use connections. That information is stored only in the source PCO, e.g., the thermocouple PCO. Hence, the risk of data loss or misinterpretation resulting from lack of coherency is minimized, as is the risk of incorrect scaling and the like among the blocks participating in the connections.

Control devices as described above can, according to further aspects of the invention, maintain unilateral and/or bilateral connections for the information that they exchange. Unilateral connections utilize a data structure as described above to store a single "forward going" data value (or set of values), along with its attendant range, status, limit status, time and other related information. These are typically used, for example, in connections to/from sensors and actuators.

The control devices can also utilize PCOs that establish bilateral connections maintaining two data values (or sets of values), along with attendant range, status, limit status, time and other related information. These can be used, for example, in connections in which a forward going data value is dependent on a backward going one.

For example, a PCO functioning as a proportional integral derivative (PID) control block and executing in an intelligent actuator might provide the setpoint to a PCO executing as an analog output (AOUT) control block in that same actuator. A single data structure maintaining the AOUT setpoint can be stored in the PID, with the AOUT accessing it by reference. The PID requires feedback, such as the current valve position, in order initialize its output to avoid bumping that value at startup. The AOUT can provide that feedback, according to related aspects of the invention, by accessing the data structure by reference and storing a backward going data value (or feedback value) there. Similar bilateral communications are required between cascaded controllers where the output of one is the setpoint of another.

Control devices utilizing PCO that establish bilateral connections have additional advantages, including, eliminating the need to establish and ensure that forward-going and back-going values for each connection necessarily run between the same two blocks. In addition, they ensure that consistent range, status, limit status, time and other information concerning the forward-going and back-going values are shared by both PCO that are parties to the connection.

Process Control Entities with Mandatory and Optional Parts

Further aspects of the invention provide control devices as described above that include PCOs with mandatory parts for which memory space is allocated at the time of object creation (or instantiation) and with optional parts for which memory space is allocated only as needed. The optional parts can be added subsequent to creation, typically, for example, during configuration.

By way of example, an intelligent field device embodying a PCO according to the invention representing an analog input block (AIN) can have a mandatory input part for receiving, linearizing, filtering and scaling measurements. It can also have a mandatory output part for processing or switching and for making the result available to PCOs, e.g., embodying control algorithms. These mandatory parts are instantiated when the AIN PCO is first instantiated. Optional parts for the AIN PCO permit, inter alia, establishing alarm limits, defining a characterizer that linearizes an input measurement, defining filtering for an input measurement, and defining limits for output values, and to utilize potential emergency interlock output values. These optional parts can be instantiated, if at all, e.g., when the already-instantiated PCO is being configured.

The invention provides, in other aspects, control devices as described above in which the parts, whether optional or mandatory, are associated with block-type PCOs and are instantiated locally in relation to the respective blocks that contain them. Put another way, the parts are instantiated in the processes responsible for executing the PCO in which they are contained.

Further aspects of the invention provide control devices as described above in which mandatory parts of a PCO are instantiated in a declaration or a constructor method (e.g., a default constructor) of a class from which the PCO is instantiated. While optional parts can be instantiated by a constructor (e.g., other than the default constructor), they can also be instantiated by configurator following creation of the PCO.

Control device incorporating dynamically configurable PCOs, i.e., with mandatory and optional parts, as described herein are advantageous, for example, in that their constituent blocks provide all necessary input, output and/or processing behaviors, without dedicating memory or other resources to unused ones. Thus, the AIN PCO described in the example above can be selectively configured to allocate memory and processor resources to alarms and filters, yet, not to consume resources with optional features that will not be used, e.g., interlocks and characterizers. Moreover, such PCOs instill in their respective control devices (e.g., their respective control stations, work stations, controllers, or field devices) optional behaviors that execute as if "compiled in," yet, not requiring recompilation on configuration.

In addition to individual block-type PCOs that are dynamically configurable, further aspects of the invention provide control devices and systems with dynamically configurable composite PCOs. These are PCOs with mandatory constituent blocks for which memory space is allocated at the time of object creation (or instantiation) and with optional blocks for which memory space is allocated only as needed. The optional blocks are added at the time each composite PCO is created, e.g., during configuration, or later.

By way of example, a control system executing a PCO composite-type object representing a process control loop, can have a mandatory analog input block (AIN), a mandatory analog output (AOUT) block and a mandatory proportional-integral-derivative (PID) control block. Optional blocks for the composite PCO can provide for feedforward control. These can include, for example, an optional second AIN block, e.g., for detecting disturbances in the controlled process, as well as for an optional, feed forward control block that generates additional control values to facilitate disturbance compensation in the first (feedback), PID block.

Process Control System with Blocks Having Common Input and/or Output Sections

Still further aspects of the invention provide control systems and control devices as described above with block-type and composite-type PCOs that use standardized classes (or other definitional software constructs) to define input and output parts that receive and transmit information on behalf of the PCOs. The classes provide common interfaces between interconnected blocks, as well as insuring common processing of information by them.

By way of example, PCO blocks executing on the workstations, controllers, intelligent field devices and other control devices in a control system according to the invention can have input and output parts instantiated from a common set of input and output classes, respectively. The PCOs can be of a variety of composite block types and individual block types, the latter including, for example, AnalogInput, AnalogOutput, PID, and Feedback Tuner. The common set of classes from which their input and output parts are instantiated include, according to one aspect of the invention and by way of non-limiting example, cascaded floating point input, cascaded floating point output, unidirectional boolean input, unidirectional boolean output.

According to related aspects of the invention, the input and output parts of the block PCOs are created from possibly overlapping subsets of classes selected from a common set of standardized classes. Thus, for example, PCOs that embody PID control blocks include input and output parts defined with standardized cascaded floating point input and cascaded floating point output classes. PCOs that embody "user" control blocks also use the standardized cascaded floating point output classes, though their input parts are defined using a different standardized class, to wit, the unidirectional floating point input class.

Further aspects of the invention provide control systems and control devices as described above wherein the input and output parts, themselves, use standardized classes to define objects that reflect, by way of non-limiting example, state, status, mode, and option assignments shared by the respective blocks and their parts, as well as to define information that is communicated between the blocks. In addition to providing common methods for setting and getting values, these classes define methods for linking variables (and their constituent parameters) to establish connections between blocks.

By way of example, the standardized cascaded floating point input part contained in the above-described PID control blocks can have constituent objects defined from a standardized "lrs" setpoint mode class that characterizes the setpoint source for an input part, e.g., whether it is set by an external block, by a supervisory task, or by the operator. By way of further example, the cascaded floating point output part of such a PID block can include a constituent objects defined from a standardized "mas" mode class that characterizes source of the outgoing signal generated by that output part, e.g., whether it is set by the block, a supervisory task or the operator.

A control device with a PCO block having input and output parts utilizing objects instantiated independent classes, such as the lrs and mas classes described above, can provide for the independent characterization of setpoints received and generated by the PCO. Thus, for example, the block can be set by an operator at runtime to provide for any of local, remote or supervisory setpoint input and, at the same time, for any of manual automatic and supervisory setpoint output. Moreover, the block can retain a setpoint value previously defined, e.g., before transition into manual or supervisory mode, to facilitate transition back to automatic mode.

Further related aspects of the invention provide control systems and control devices where the input, output, body and other parts use other standardized classes. These can include, by way of non-limiting example, a signal quality status class, a maintenance status class, a limit indication and linking/setting permissions class, among others.

The invention provides, in still further aspects, control systems and devices as described above in which memory is allocated for mandatory constituent portions of a part at the time of creation and in which memory is allocated for optional portions only as necessary, e.g., during configuration. These portions can include PCOs defined in accord with the aforementioned signal classes, as well as in accord with other classes that make up the parts.

According to further related aspects of the invention, that parts of PCO control blocks utilized in control systems and devices can have the mandatory constituent that include, by way of example, the aforementioned lrs and mas setpoint mode classes of the cascaded floating point input and output parts, respectively. Further mandatory classes of these parts can include, by way of further non-limiting example, a floating point variable class for containing the setpoints received or set by the input and output parts, respectively.

Optional classes for these parts can include a limit class (defined as a "parts" class in the discussion below) used to define high and low setpoint values for the input and output parts that include the limit class.

Still further aspects of the invention provide control systems and devices as described above in which the block-type PCOs include body parts, in addition to input and output parts. The body parts can, for example, embody attributes and methods that are unique to the particular block class, in addition to standardized parts such as for feedback tuning and deadtime compensation.

Multi-Input Analog Input Block for Process Control System

Further aspects of the invention provide a control device with an analog input block (AIN) coupled to accept readings from multiple sensors or other input devices and to generate an output based on one or more of those readings. The analog input block, which can be a PCO as described above, can take a reading from each of the multiple sensors during each block processing cycle (BPC), e.g., each cycle during which the AIN is invoked (typically, along or in sequence with other blocks in a common control system).

Related aspects of the invention provide a control device configured as an AIN as described above that generates an output based on the multiple inputs every "block period," e.g., every period (typically multiple BPCs) in which the output of the AIN is updated. The output can be, by way of non-limiting example, minimum, maximum, median, weighted average (e.g., based on uncertainty values, such as SEVA, provided by the sensor as part of the variable data structure) or other selection or function of the multiple inputs.

Further related aspects of the invention provide a control device configured by a PCO as an AIN block as described above in which the input part of that block samples measurements received from its respective sensor every BPC, notwithstanding that the block period may run over several BPCs. Those measurements can be averaged with one another (e.g. by the input or body parts of the PCO), prior to being statistically compared or combined with the outputs of other input parts in the AIN.

Still further aspects of the invention provide a AIN PCO as described above having multiple input parts, each receiving, filtering, characterizing and/or otherwise processing a respective one of the measurements received by the AIN block. A control device in which such an AIN is embodied can dedicate memory space upon instantiation of the block or its subsequent configuration to only such input parts as are required by the particular implementation. Moreover, such a control device can apply independent filtering, characterizing or other functions to each of the inputs.

Further aspects of the invention provide control systems embodying one or more control devices as described above and/or utilizing PCOs as described above. Other aspects provide control devices and systems having individual ones of the features described above, alone or in combination with other ones of the features.

Yet other aspects of the invention provide methods of operating control devices and control systems paralleling the foregoing.

These and other aspects of the invention are evident in the attached drawings, and in the description and claims that follow.

BRIEF DESCRIPTION OF THE DRAWINGS

A more complete understanding of the invention may be attained by reference to the drawings, in which:

FIG. 18 depicts variable and parameter transfer and rules in a control system according to the invention.

DETAILED DESCRIPTION OF THE ILLUSTRATED EMBODIMENT

Figure 1:
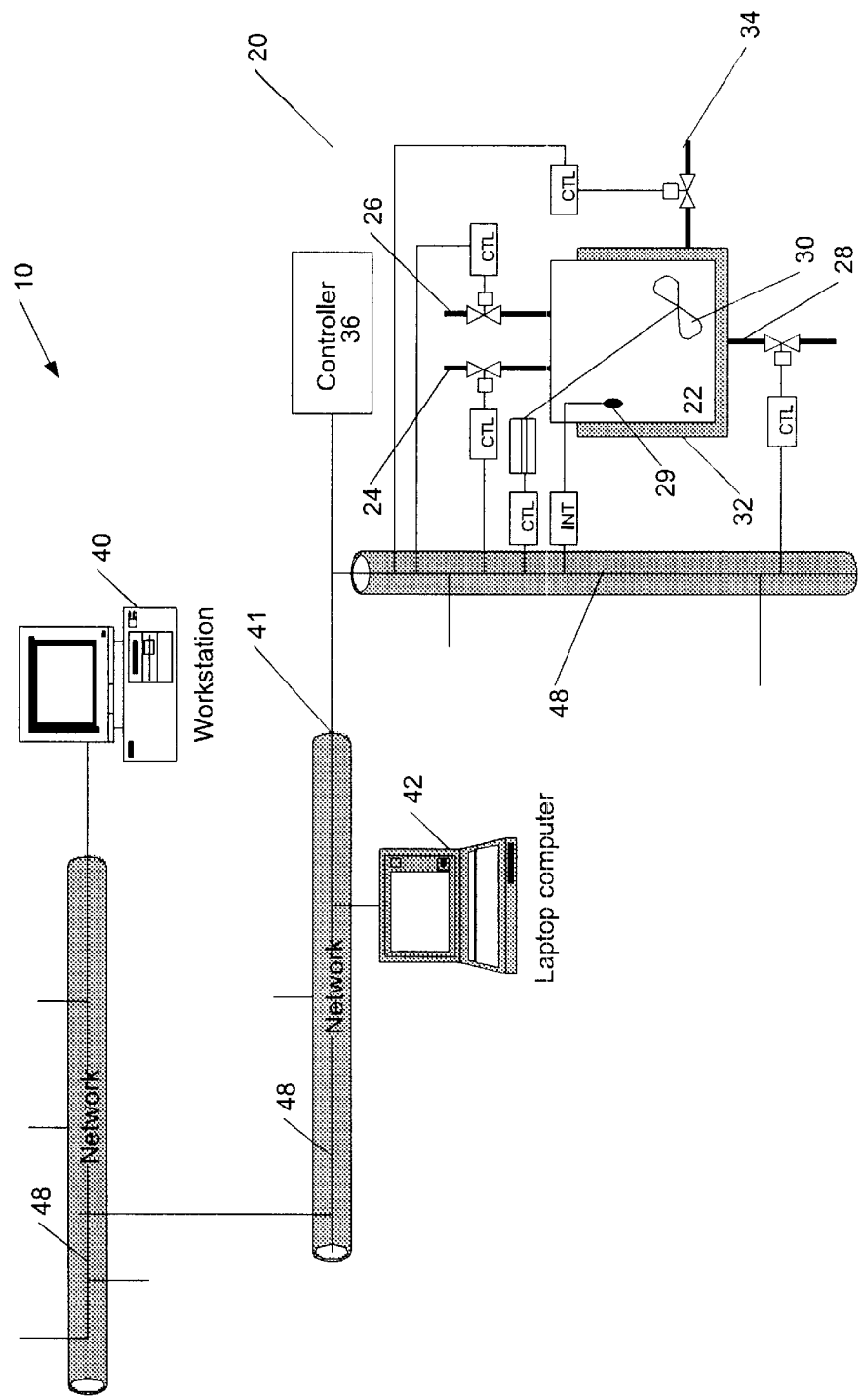
FIG. 1 depicts a process control system 10 of the type with which the invention is practiced.

FIG. 1 depicts a process control system 10 of the type with which the invention is practiced. The system includes networked control devices that monitor and control a hypothetical mixing process 20 that utilizes mixing chamber 22, fluid inlets 24, 26, fluid outlet 28, paddle 30, cooler 32, and cooler inlet 34. Though illustrated and described below for use in connection with process control, those skilled in the art will appreciate that apparatus and methods according to the invention can be used in connection with any industrial, manufacturing, service, environmental or other process, device or system amenable to monitoring or control (hereinafter, collectively, "control").

The networked control devices include actuators, such as the valves depicted as controlling inlets and outlets 24–28 and 34. A further actuator is shown controlling paddle 30. These and other actuators utilized by the control system are constructed and operated in the conventional manner, as modified in accord with the teachings hereof. The actuators operate under control of respective field device controllers, labeled CTL, that are also constructed and operated in the conventional manner to provide initialization, signal conditioning and communications functions.

Rather than using separate controllers CTL, the actuators can be of the intelligent variety and can include integral microprocessors or other digital data processing apparatus for control, initialization, signal conditioning, communications and other control-related functions. For sake of convenience, the label CTL is used regardless of whether the control-related functionality is integral to the actuators (e.g., as in the case of intelligent actuators) or otherwise.

Illustrated sensor 29 monitors a temperature, level or other characteristic of fluid in chamber 22. The sensor 29, as well as other sensing apparatus utilized by the system, are constructed and operated in the conventional manner known in the art, as modified in accord with the teachings hereof. They can be coupled to the control network via a transmitter or other interface device INT that, too, is constructed and operated in the conventional manner, as modified by the teachings hereof. The interface devices facilitate initialization, signal conditioning and communications between the sensors and the control system. As above, one or more sensors can be of the intelligent variety, incorporating integral microprocessors or other digital data processing capabilities for initialization, signal conditioning, communications and other control-related functions. Here, too, the label INT is used in reference to the control-related functionality, regardless of whether embodied in an intelligent transmitter or otherwise.

The networked control devices include one or more controllers 36 that monitor and control respective aspects of the hypothetical mixing process in the conventional manner, as modified in accord with the teachings hereof. The controllers can comprise mainframe computers, workstations 40, personal computers 42, special-purpose hardware or other digital data processing apparatus capable of performing conventional monitoring and control functions. Preferred controllers are constructed and operated in the manner of the CP control processors commercially available from the assignee hereof, as modified in accord with the teachings herein.

The control system 10 includes elements that serve as user interfaces and that provide configuration and/or control functions, all in the conventional manner as modified in accord with the teachings hereof. Illustrated for these purposes are, for example, workstation 40 and personal (laptop) computer 42. These devices can provide configuration and control functions directly, as in the case of workstation 40, or in cooperation with server devices (not shown). Apparatus 36–42 can couple with one another directly, e.g., via bus or network connection (as illustrated below), or indirectly, e.g., via satellite, wireless connection or modem connection.

The devices 36–42, CTL and INT, collectively, referred to as "control" devices, are coupled for communications via a medium that permits at least selected ones of the devices to communicate with one another. To this end, in the illustrated embodiment those devices are coupled via one or more networks 48 that are, preferably, IP-based such as, by way non-limiting example, Ethernets. The network(s) can include, as indicated by the multiple segments shown in the drawing, multiple segments such as various wide and local area networks. They may also include high and/or low bandwidth components, such as phone lines, and low and/or high latency components, such as satellites networks.

In the preferred, illustrated embodiment, each of the control devices 36–42, CTL and INT, provides virtual machine environment for executing Java byte code (or other such intermediate code) in the form of Java applications, Java applets, Java servlets, or like constructs in other software languages that, for example, configures the respective device to provide monitoring and/or control (collectively, "control"), including, by way of non-limiting example, servicing sensors to provide inputs (analog or otherwise), servicing actuators to provide outputs, executing blocks (composite, individual or otherwise) that include a control algorithm and/or otherwise to participate in the control system.

By way of non-limiting example, the illustrated intelligent field devices can include low power processors, along with a random access memory, read-only memory, FlashRAM, and appropriate sensor/actuator interfaces. The processors of those devices can execute a real-time operating system, as well as a Java virtual machine (JVM). Process control blocks or entities in Java byte code execute in the JVMs to configure the respective field devices to perform process control functions, e.g., for analog input (AIN), analog output, proportional integral derivative (PID) control and so forth.

By way of further non-limiting example, the controllers, workstations, control stations and other digital data processor-based control devices can include larger, more powerful central processing units, along with on-board memory (e.g., RAM, ROM, FlashRAM), mass storage, sensor/actuator interfaces, as necessary, conventional operating systems and JVMs, and so forth. The JVMs on these more powerful devices permit them to perform a still wider range of control functions, e.g., to monitor control larger scale plant operations.

A further appreciation of the hardware and software environment provided by system 10 may be attained by reference to commonly-assigned, co-pending U.S. patent application Ser. No. 09/591,604, and to counterpart PCT Application Serial No. PCT/US 00/15860, both filed Jun. 9, 2000, entitled METHODS AND APPARATUS FOR CONTROL USING CONTROL DEVICES THAT PROVIDE A VIRTUAL MACHINE ENVIRONMENT AND THAT COMMUNICATE VIA AN IP NETWORK, The teachings of these applications are incorporated herein by reference.

Described below are aspects of the operation of the aforementioned control devices 36–42, CTL and INT, and, more generally, of the control system 10 deriving from execution on the devices of Java applications, applets, servlets (or other such software constructs) to implement control. These objects, referred to herein as process control objects (PCOs), define blocks which are the basic functional unit of the control. They also define the input, output and body parts from which blocks are formed, and the signals that are communicated between blocks. PCOs also define nested and composite groupings of blocks used to control loops and higher-level control functions.

The Advantages of PCOs

As evident in the discussion above and in the pages that follow Process Control Objects facilitate the development, implementation and maintenance of control systems, additionally, maximizing their flexibility of configuration and robustness. PCOs also facilitate the introduction of new control objects and enhancements without affecting the running system, in addition to enabling on-line modification and upgrade of objects. Control systems utilizing PCOs are, moreover, portable: control classes, written once, can run everywhere. The systems are also scaleable.

By way of both review and introduction, control systems implemented with PCOs implement optional parts and functionality separately from mandatory parts, thus, minimizing consumption of undue resources. Their use of separate input and output parts speeds implementation, while permitting the input and output sides of each block to be independently configured and operated.

The PCO control architecture provides standardized input and output part classes used in all blocks. Input and output part classes provide initialization, anti-windup, cascade handling, local/remote/supervisory switching, manual/auto/supervisory switching, standardized variable naming, input and output multiplicative and additive feedforward, output selection (limiting with an override controller). In addition optional parts for the input and output classes furnish alarming, limiting, filtering, feedforward, characterization, and interlock. Architecturally the input and output part classes provide standard interfaces between interconnected blocks.

PCOs provide a framework where interconnected block and nested classes are aggregated to create higher level nested classes, which are then used to create object instances. These higher nested instance include, for example, all control for a process unit, all information collection for a process unit, and so forth. Information is stored at its source, permitting other objects to reference it, e.g., via implicit pointers, addresses, symbolic references, or the like, in order to obtain specific datum (such as measurements) and information pertaining to it. For objects residing in remote stations the source passes the referenced information to proxy objects residing in those stations.

In a control system implemented using PCOs, scaling is done at the source and transmitted to the sink(s) when it changes. For example, in a cascaded controller, the local, remote, and supervisory setpoints obtain scaling from the measurement input. A cascade output obtains scaling from its back-calculated input. In general, cascade scaling information flows upstream. An analog output object has no measurement, therefore the scaling of its remote setpoint and back-calculated output is either entered locally or obtained from the downstream field device.

Other aspects of a control implementation using PCOs is that it permits the creation of object classes for required inter-block signals to communicate values with signal (SEVA) quality status, cascade handling (bumpless initialization and anti-windup) logic, and permissions for connection, setting, and configuration. Moreover, it makes automatically the backward interconnection for cascaded blocks.

Object Model Notation

Figure 2:
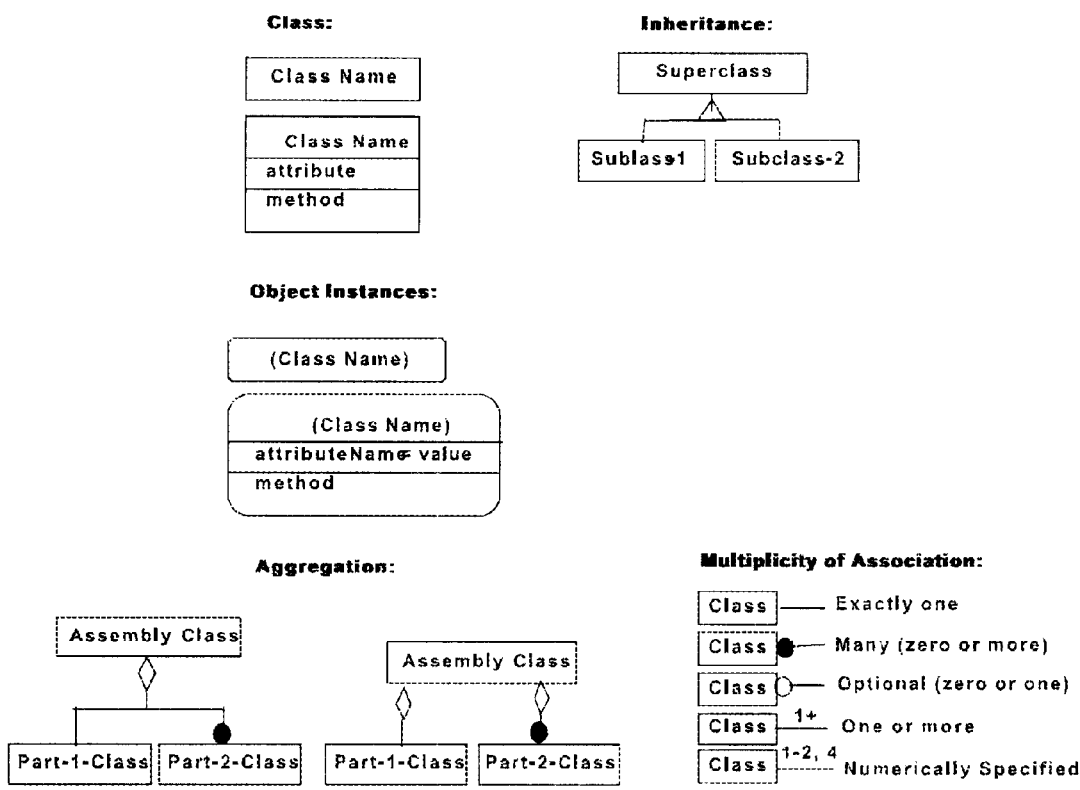
FIG. 2 depicts the object model notation utilized in this disclosure.

FIG. 2 shows the notation for object and class diagrams used in this patent application. Those skilled in the art will appreciate that this is a subset of the standard Rumbaugh notation.

Architecture of Process Control Classes

This section describes the overall architecture for Process Control Objects and introduces the signal, part, block, nested, and composite classes and objects.

Signal Object

A signal object is an object that is implemented as a component of a block or a part object, and its name includes the name of its block object. It is located locally in relation to the block object that contains it. A signal object is an instance of a signal class. Signal objects contain the information communicated between blocks or inserted into blocks as constants. These objects also provide methods to be used by users and tasks for setting and getting values and for linking and unlinking parameters and variables.

Signal Classes

Signal Classes are classes that provide signal objects as defined above.

Part Object

A part object is an object that is implemented as a component of a block or another part object, and its name includes the name of its block object. It is located locally in relation to the block object that contains it. A part object is an instance of a part class. Input and output part objects contain or reference float, boolean, or integer signal objects, which enable unidirectional and cascade communication between blocks. Some part classes provide objects for optional functionality such as alarm, limit, and filter, which can be components of the input and output part objects or blocks.

Part Classes

Part Classes are classes that provide part objects as defined above.

Block Object

A block object is an instance of a block class and provides a base level of functionality. It is the lowest level object, which can be implemented as an independent object with a network-wide unique name. A block object is made up of input part objects, a body, and output part objects. The input and output parts are independent of the body and enable unidirectional and cascade communication between blocks. The body contains the attributes and methods that are unique to the particular block class. In addition the body may contain optional parts such as feedback tuner, feedforward tuner, and deadtime. AnalogInput, AdvancedPID, and AnalogOutput are examples of block objects. Typically, block objects are used to create a hierarchy of nested objects.

Block Classes

Block Classes are classes that provide block objects as defined above.

Nested Object

A nested object is an instance of a nested class and is a component of possibly interconnected block and nested objects. Replication of a control solution is achieved with multiple instances of a nested class. Each object instance can be implemented as an independent object with a network-wide unique tag name. An example of a nested class is a loop class, name it Loop, which contains the AnalogInput, AdvancedPID, and AnalogOutput block classes with appropriate connections achieved by linking the input and output parts of the blocks. Class Loop can then be used to create many instances of loop composite objects. A second level nested class can be created by nesting together the AnalogInput and AdvancedPID block classes and the Loop class with appropriate connections to create a cascade class, name it Cascade. Class Cascade can then be used to create many instances of cascade composite objects.

Nested Classes

Nested Classes are classes that provide nested objects as defined above.

Composite Object or Composite

A composite object is an instance of a nested class implemented as an independent object with a network-wide unique name. For example instances of class Loop or Cascade with network-wide unique names are composite objects.

Composite Class

A composite class is a nested class whose object instances are implemented as independent objects with a network-wide unique name, that is, composite objects. When class Loop is used to create instances with network-wide unique names it is a composite class. However, the same class Loop when used as a component of the Cascade class is a component class, while class Cascade is a composite class.

Figure 3:
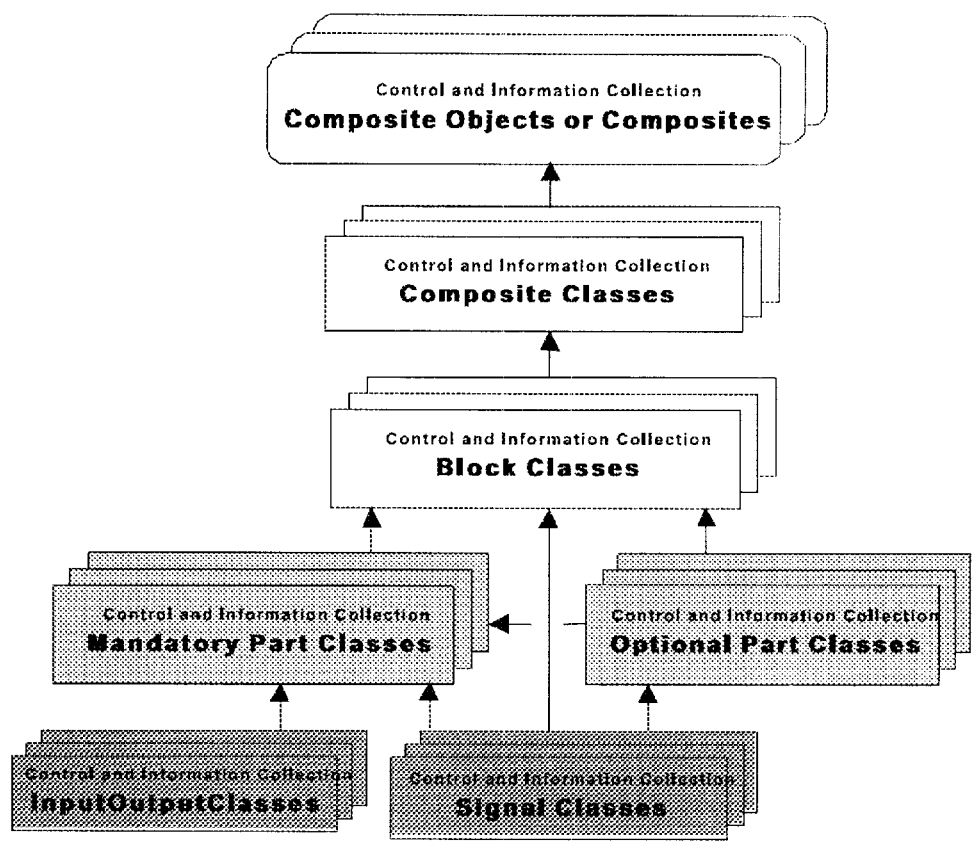
FIG. 3 depicts a control and information collection class and object architecture in a control system according to the invention.

FIG. 3 shows the architecture for the Process Control Objects (PCO). Square boxes indicate classes, while rounded ones indicate object instances (objects). The Signal Classes, shown with vertical lines, provide signal classes to the part and block classes, for example the float parameter and float variable classes.

The Part Classes, shown shaded, provide mandatory and optional part classes to the block classes, for example the uni-directional and cascade float input and output classes. The optional part classes also provide optional part classes to the mandatory part classes.

The Block Classes are typically used to create component and composite classes, which are then used to create many instances of composite objects (composites).

A tag name is an arbitrary string.

Predefined (Implementation-Standard) Control Classes

Figure 4:
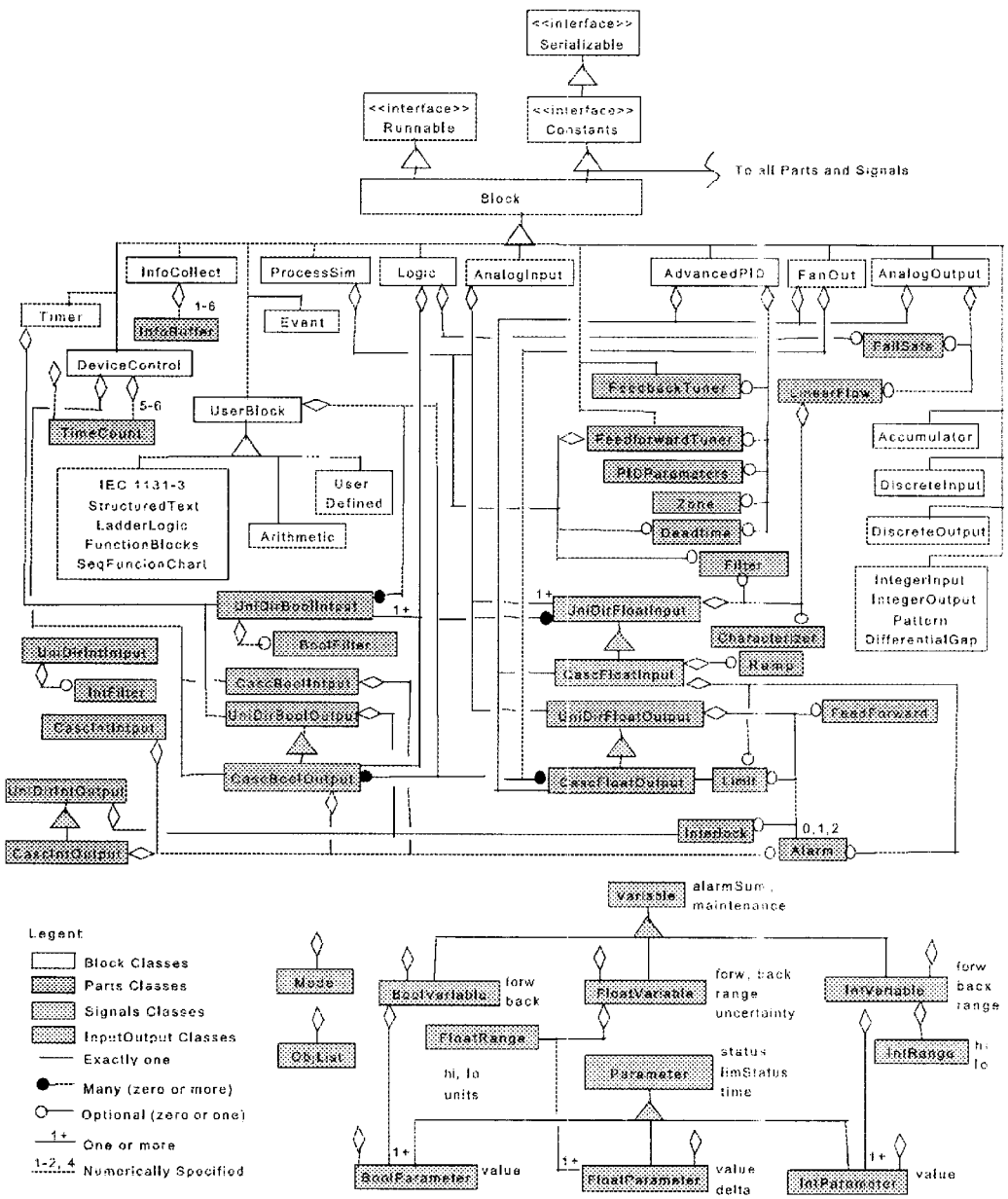
FIG. 4 depicts control and information collection signal, part, and block classes in a control system according to the invention.

FIG. 4 shows the signal, part, and block classes for control and information collection in more detail. In particular it shows the inheritance hierarchy and aggregation of the part and block classes for control and information collection.

Class names start with a capital letter, while names for objects, attributes, and methods start with small letters with additional words concatenated to the first word starting with capital letters. This is the recommended practice by many authors and developers and is followed in this document.

The clear rectangular boxes indicate block classes, for example, AnalogInput class. The shaded rectangular boxes indicate part classes, for example, Alarm and FloatVariable classes. The boxes with the diagonal lines indicate signal classes, for example, boolean and float parameters and variables.

Figure 5:
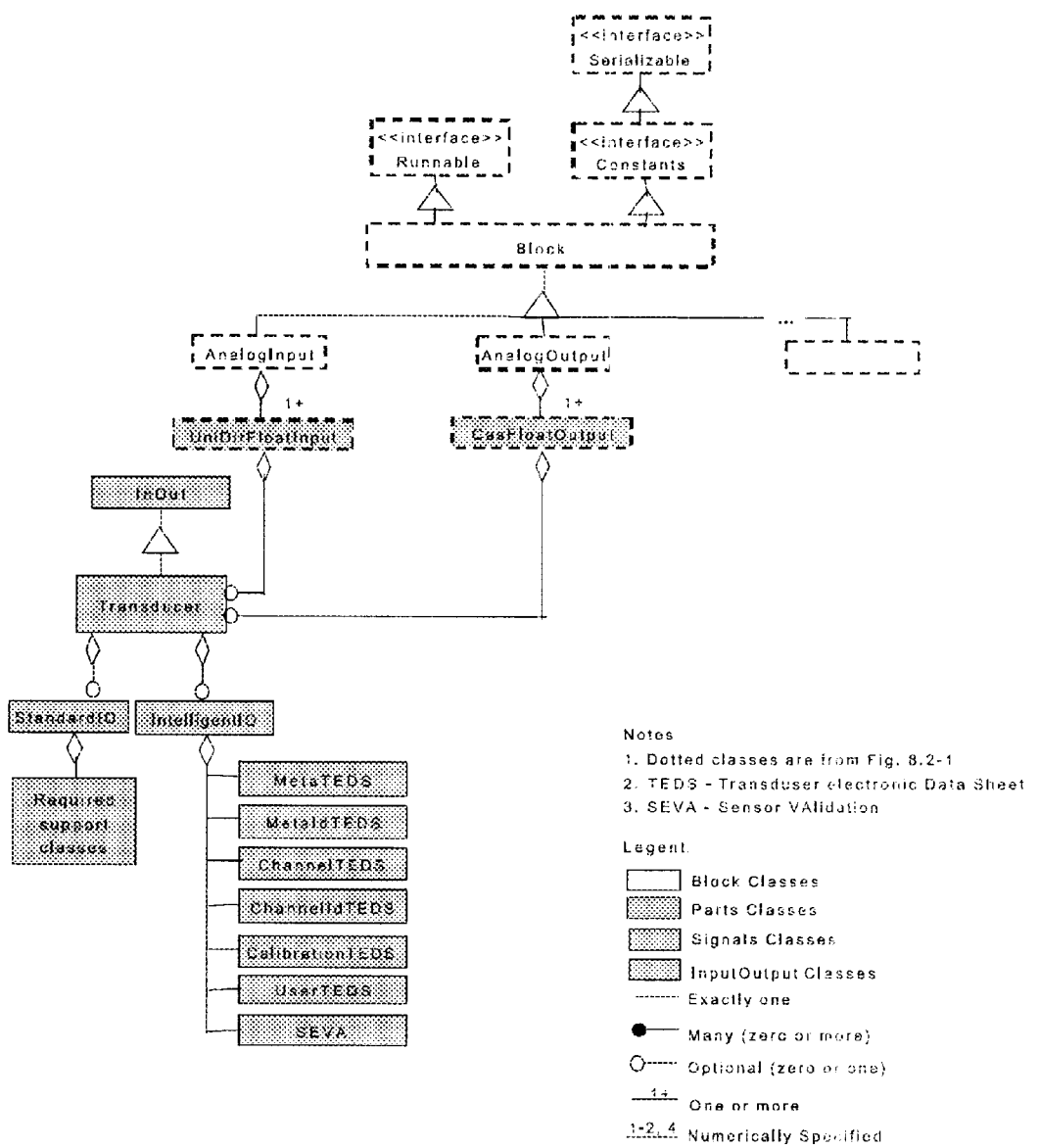
FIG. 5 depicts input/output classes for intelligent and standard devices in a control system according to the invention.

FIG. 5 shows the InputOutput classes for intelligent and standard devices, which are indicated by boxes filled with dots. The boxes with dotted lines indicate classes from FIG. 4. The InputOutput classes are parts of the UniDirFloatInput and CascFloatOutput classes for analog inputs and analog outputs, respectively.

Figure 6:
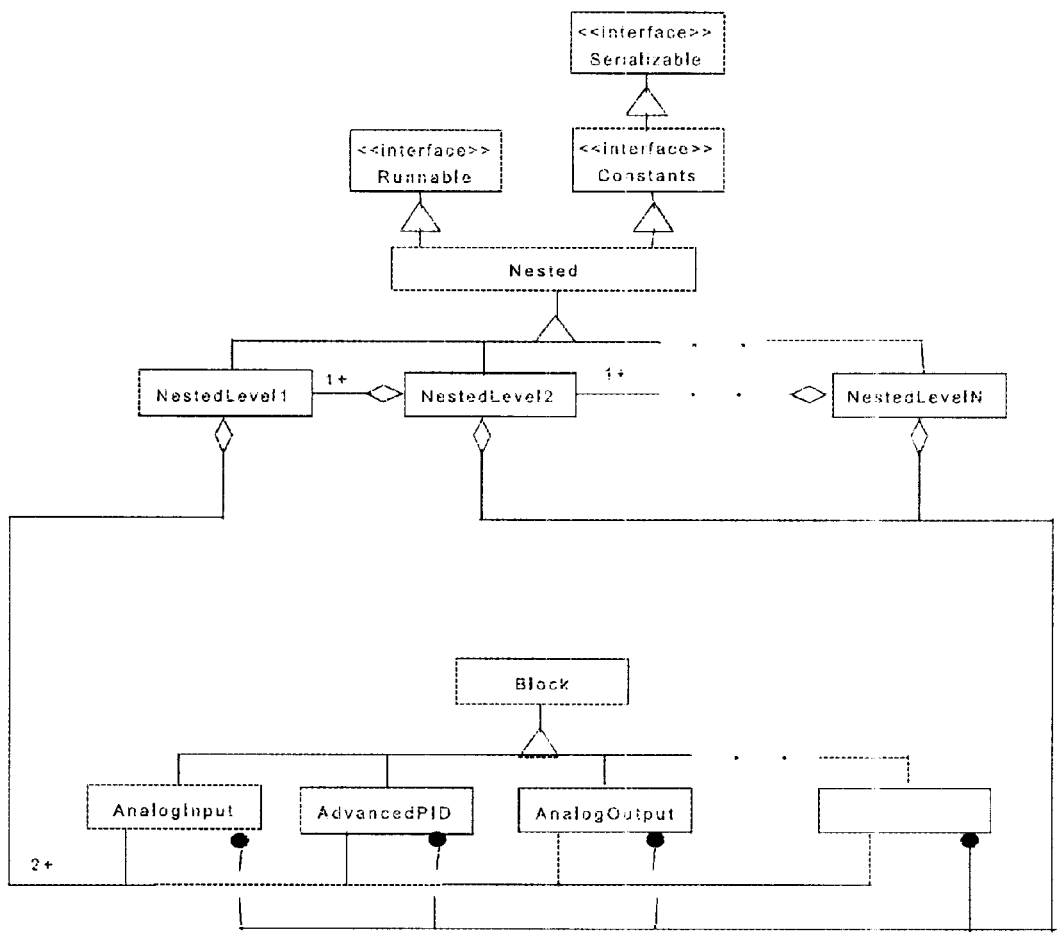
FIG. 6 depicts control and information collection nested classes in a control system according to the invention.

FIG. 6 illustrates the aggregation of control block classes to create many levels of nested classes. The inheritance hierarchy and aggregation classes for control part and block objects shown in FIG. 4 furnishes the control block classes used to create nested classes.

As shown in the figure, the objects of class ControlNestedLevel1 contain block objects. In particular, they contain combinations of two or more (indicated by 2+) block objects. The objects of class ControlNestedLevel2, contain combinations of one or more (indicated by 1+) ControlNestedLevel1 objects, and optionally zero or more block objects. A level 2 control nested object must contain at least one level 1 control nested object.

Following this procedure, nesting can be generalized to N levels. Each higher level control nested object contains at least one control nested object from the level below it, and optionally, zero or more objects from any other levels as well as zero or more block objects.

This is how the composite classes of FIG. 3 are created and then used to create many instances of composite objects as required.

Figure 7:
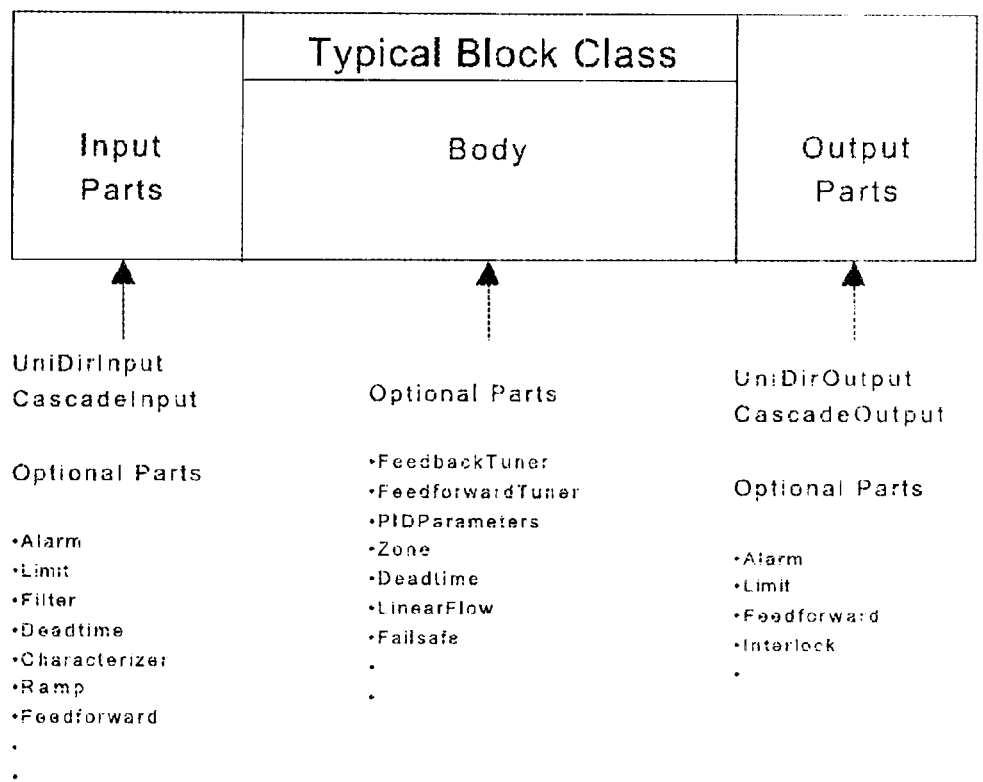
FIG. 7 depicts an architecture for a typical block class in a control system according to the invention.

FIG. 7 shows the architecture for a typical block class. The Input Parts contain the parts and references for unidirectional and cascade variables. The input parts can also contain optional parts such as filter and alarm. The Output Parts contain parts and references for unidirectional and cascade variables. The output parts can also contain optional parts such as limit and alarm. The Body contains the attributes and methods that are unique to the particular block class. It can also contain optional parts such as feedback tuner and deadtime.

Figure 8:
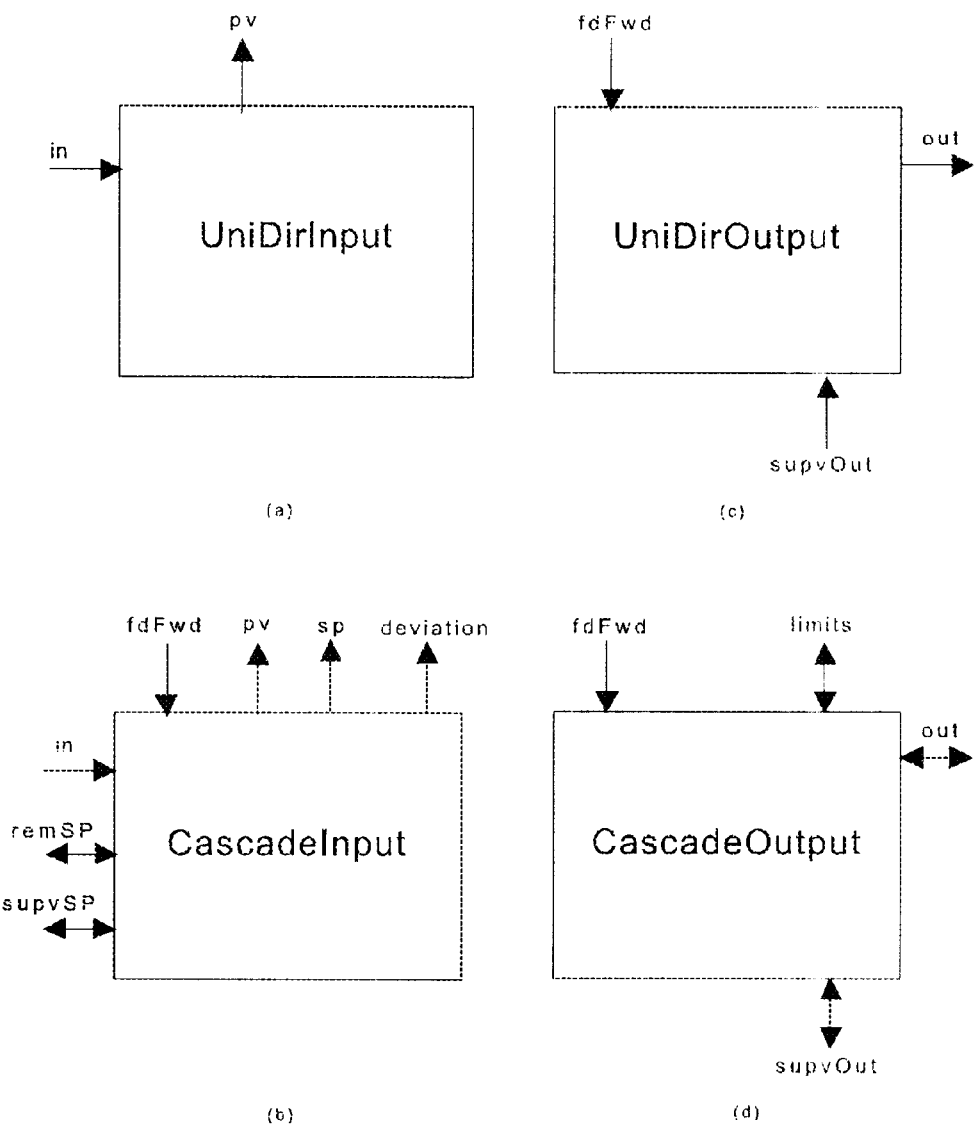
FIG. 8 shows examples of unidirectional and cascade input and output part classes in a control system according to the invention.

FIG. 8 provides examples of unidirectional and cascade input and output parts. More particularly, FIG. 8(a) shows the unidirectional part UniDirInput. The variable in comes from a source and there is no backward communication as indicated by the single incoming arrow. The variable pv can be a source for many sinks and there is no backward communication as indicated by the single outgoing arrow.

FIG. 8(b) shows the cascade part CascadeInput. The cascade part enables uni-directional and bi-directional communications. The variables in, fdFwd, pv, sp, and deviation are uni-directional as indicated by the single arrow. Variables remSP and supvSP are bi-directional as indicated by the double arrow.

Similarly, FIGS. 8(c) and (d) shows the uni-directional part UniDirOutput and the cascade part CascadeInput, respectively.

The Input and Output parts are instances of the part classes that are shown in the Control and Information Class structure of FIG. 4 and they are separate and independent from the Body of the typical block class. This enables inter-operability between components by connecting the output variable of an output part to the input variable of an input part.

When either the output part of the source block or the input part of the sink block is uni-directional, the communication between them is unidirectional (one-way) from the source to the sink. For example, the value and status of the output part's variable is passed by reference to the input part's variable.

When both the output part of the source block and the input part of the sink block are cascade, the communication between them is also cascade. That is from the source to the sink for both the forward value and status, and from the sink to the source for both the back value and status. In this case the sink component is connected to the source component and the source component is connected to the sink component. A single linkage of the sink to the source connects both the forward and back signals.

Control applications use both unidirectional and cascade connections. Consider, for example, heating cold water in a heat exchanger by condensing steam. The cold water flows through the tubes of the heat exchanger and steam flows through the shell of the heat exchanger. The objective is to heat the water to a desired temperature using cascade control, whereby the temperature controller sets the setpoint of the steam flow controller. The temperature controller uses the hot water temperature measurement, while the steam flow controller uses the steam flow measurement. The steam flow controller delivers the required steam by throttling the steam valve.

This is an example of cascade control, that is, the output of the temperature controller is cascaded to the setpoint of the steam flow controller. Consider the case where the operator opens the cascade by placing the steam flow controller on local control, and sets the steam flow setpoint herself, thereby disabling the temperature controller from doing so. When the operator closes the cascade and transfers control to the temperature controller there is going to be a "bump" in the steam flow unless the temperature controller output was initialized to the value of the steam flow local setpoint at the time of transfer.

This is precisely accomplished with the cascade connection. In normal cascade control the output of the temperature controller is connected to the setpoint of the steam flow controller. The forward value and status of the steam flow controller setpoint are the value and status of the temperature controller output to which it is connected. Also the back value and status of the temperature controller output are the back value and status of the steam flow controller remote setpoint to which it is connected.

When the cascade has been open for a period of time and the operator transfers control to the temperature controller by switching the steam flow controller from local to remote, the temperature controller knows this from its output's back status from the steam flow controller setpoint. At this time the temperature controller initializes and computes the value of its forward output to be the output back value, which the steam flow controller sets equal to its local setpoint value at the time of transfer. From then on normal cascade control commences again and the temperature controller manipulates the steam flow setpoint to drive the actual water temperature to the desired value, as determined by the value of the temperature controller setpoint.

Signal Classes

The signal classes are contained in the Signals package, described below. A package contains a number of Java files and each Java file contains one and only one class. Objects from Signals classes contain the information communicated between linked blocks or inserted into blocks as constants. These classes also provide methods to be used by users and tasks for setting and getting values and for linking and unlinking parameters and variables. The Signals package also contains an interface for shared constants, and a mode class, which is used by cascade input parts for local/remote/supervisory switching and by cascade output parts for manual/auto/supervisory/interlock switching.

The signal classes include the following: BoolParameter, BoolVariable, FloatParameter, FloatRange, FloatVariable, IntParameter, IntRange, IntVariable, Mode, ObjList. Parameter and Variable are abstract classes passing common methods and attributes through inheritance to the individual XxxParameter and XxxVariable classes.

Part Classes

The part classes are contained in the Parts package. A Part must be contained in a block or other part contained in a block. Each block may have one or more input parts, a body, and one or more output parts. Input and output Part classes contain or reference FloatVariable, BoolVariable, or IntVariable signals, which enable uni-directional or cascade communication between blocks. Some part classes provide objects for optional functionality such as alarm, limit, and filter and they can be components of input and output part objects or blocks.

An unused optional part has a null reference. The configurator must instantiate an optional part before it can be used or its parameters set.

The parts classes include the following: Alarm, BoolFilter, Characterizer, CascBoolInput, CascBoolOutput, CascFloatInput, CascFloatOutput, CascIntInput, CascIntOutput, Deadtime, Failsafe, FeedForward, Filter, InfoBuffer, IntFilter, Interlock, Limit, LinearFlow, PIDParameters, Ramp, TimeCount, UniDirBoolInput, UniDirBoolOutput, UniDirFloatInput, UniDirFloatOutput, UniDirIntInput, UniDirIntOutput, Zone, InputOutput Classes The InputOutput classes are contained in the InputOutput package. The InputOutput classes are parts of the UniDirFloatInput and CasFloatOutput classes for analog inputs and analog outputs, respectively. They are optional parts with a default null reference. The configurator must instantiate them before they can be used or their parameters set.

The InputOutput Classes provide the interface to input and output signals using the Java Native Interface (JNI), which provides Java classes with native methods.

Block Classes

The block classes are contained in the Blocks package. The block classes provide block object instances, which can be implemented as independent objects with network-wide unique names. Typically, block classes are used to provide component classes for composite classes, which are then used to create many instances of composite objects.

FIG. 7 shows the architecture for a typical block class. The Input Parts contain the parts for uni-directional and cascade variables. The input parts can also contain optional parts such as filter and alarm. The Output Parts contain the parts for uni-directional and cascade variables. The output parts can also contain optional parts such as limit and alarm. The Body contains the attributes and methods that are unique to the particular block class. It can also contain optional parts such as feedback tuner and deadtime.

The Input and Output parts are instances of the part classes and are separate and independent from the Body of the typical block class. This enables inter-operability between components by connecting the output variable of an output part to the input variable of an input part.

The configurator must instantiate a block and its mandatory and selected optional parts before it can be used or its parameters set.

Block is a parent class (superclass) to all block classes including the UserBlock class and its attributes and methods are inherited by all block classes. The UserBlock is a parent class to the Arithmetic and UserDefined classes and its attributes and methods are inherited by them. The following two sections provide a detailed functional description of the Block and UserBlock classes.

Block Class

Overview

Block is an abstract class that contains data and methods common to all blocks. It implements the Constants and Runnable interfaces. Options, mode, and status are conveyed with packed Booleans. Bit-mask definitions are contained in the Constants interface, which is inherited by most classes.

A part class, which provides a common function, may be contained in several block classes or other part classes. An optional part may be instantiated at configure time. If it is not configured, it has a "null" value in the container object.

The run method of each block is called each bpc. Its output is updated each period at a specified phase. The bpc is a configured float number in seconds, an integer number of milliseconds, preferably an integer multiple of 0.1 seconds. The nominal period is an integer number of bpcs less than or equal to the configured float blockPeriod, but at least one bpc. The execute method determines when each block updates its output based on its configured blockperiod and phase. The actual period is based on the time since the start of the last execution.

An output variable object is stored in an output part of its source block object. An input variable object of a block's input part may be linked (connected) to the output variable object by setting the input variable object equal to the output variable object. This is done at configure time with the output variable object's linkTo method, which checks for permissions.

Output variables are instances of the FloatVariable, BooleanVariable, or IntVariable classes. These contain a forw and may contain a back parameter object which are instances of the FloatParameter, Boolean Parameter, or IntParameter classes. Each of the parameter classes contains a value and two status bytes. The status bytes provide SEnsor VAlidation (SEVA) quality indications, cascade handling bits, downstream limit bits, and permissions. The parameter classes have getStatus, getValue, setValue, linkTo, and unlink methods to be used by users and tasks.

The Variable classes contain alarmSum and maintenance status. The FloatVariable also contains linkTo, ack, and getAlarm methods, a range object, and the SEVA 'uncertainty'. Both source and sink have access to the members of a linked Variable object.

There are two types of input objects. One is an instance of the UniDirFloatInput class, the other is an instance of the CascadeFloatInput class. The UniDirFloatInput class accepts one input variable object. It may contain charac and filter objects, used to precondition the input variable prior to its use in the block algorithm. It outputs the pv variable. The CascadeFloatInput class inherits from the UniDirFloatInput class and also receives local, remote, supervisory, and feedforward input variables in addition to the measurement input variable. It outputs pv and deviation. The CascadeFloatInput class does the local, remote, supervisory mode switching and cascade handling for bumpless transfer and initialization. It also may contain a setpoint limit object, a local setpoint ramp object, a deviation alarm object, and an additive or multiplicative fdFwd object.

There are also two types of output objects. One is an instance of the UniDirFloatOutput class, the other is an instance of the CascFloatOutput class. The UniDirFloatOutput class provides one output variable object and receives manual and supervisory input variable objects. It provides auto, manual, supervisory mode switching and may provide an output 'limit' object and two output alarm objects. The CascFloatOutput inherits from the CascFloatOutput class. It also provides bumpless mode transfer and initialization. It may contain an additive or multiplicative fdFwd object and a limit object.

Attributes
tag object instance tag, a string.
description object instance description, a string.
type object instance type, a string
blockperiod is the time in seconds between output updates, float, default 0.5.
phase object instance phase, a double integer, default is 0.
Methods
run Arguments: none.
    Executes object instance when invoked.
    Returns: none.
UserBlock Class
Overview
An object from the UserBlock class has parts from the UniDirBoolInput, IntInput, and UniDirFloatInput classes, parts from the CascBoolOutput, CascIntOutput, and CascFloatOutput classes, and output mode parts from the Mode class.

Initialization, bumpless auto/manual/supervisory switching, and antiwindup protection are automatically provided when the user program calculates its outputFloat[i] .out.forw.value by adding an incremental change to its outputFloat[i].out.back.value. Toggled booleans are treated similarly. The number of inputs, outputs, and modes are specified as the constructor arguments in the above order.

Methods from the FloatParameter, IntParameter and BoolParameter classes can be used to getValue( ), setValue( ), and getStatus( ). Methods from the FloatVariable and BooleanVariable classes can be used to getAlarm( ) and ack( ). Methods from the Mode class can be used to getMode( ) and setMode( ). Definitions of status and modes are in the Constants interface.

Figure 9:
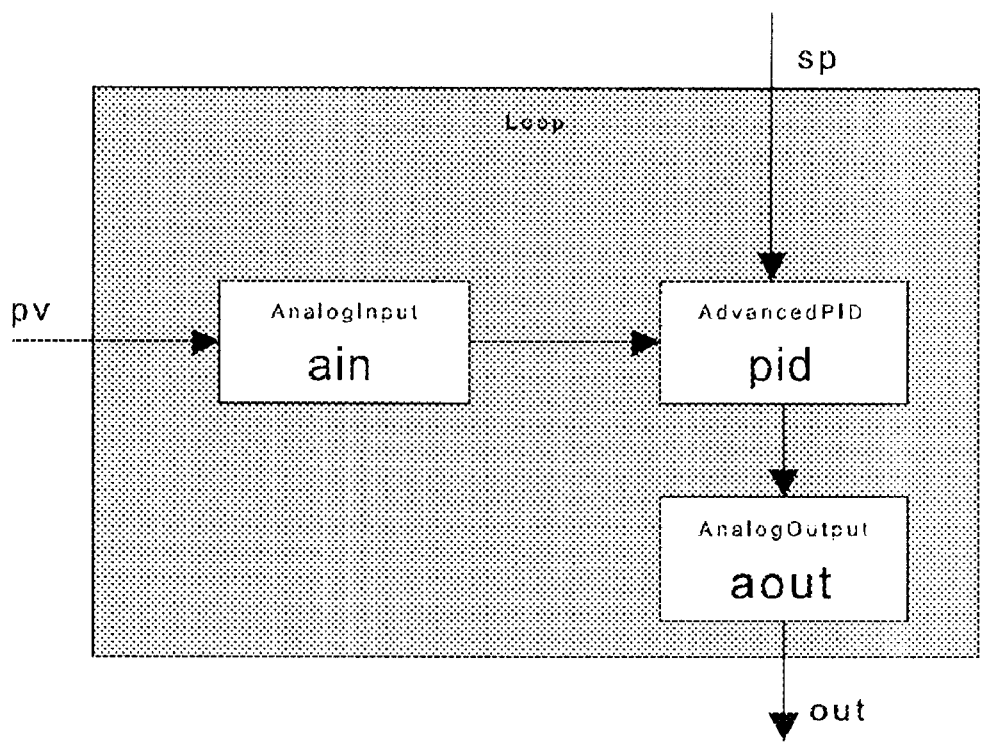
FIG. 9 depicts a loop composite class in a control system according to the invention.

Attributes
inputBool is an optional array of BooleanInput parts.
outputBool is an optional array of CascBoolOutput parts.
inputFloat is an optional array of UniDirFloatInput parts.
outputFloat is an optional array of CascFloatOutput parts.
numberFloatOut number of float outputFloats specified as constructor argument.
mode is an optional array of Mode parts.
seed=100001 is an int seed number for generating the uniform (0,1) probability Distribution. Different seed numbers generate different, and statistically independent distributions.
Methods
run
    Arguments: none
    Called each time step to run the block.
    Returns: none
runMethod contains the user written code.
    Arguments: none
    Called by run method
    Returns: none
ranUniform
    Arguments: none.
    Computes uniform random number when invoked.
    Returns: random number uniformly distributed between 0 and 1,
ranGauss
    Arguments: none.
    Computes Gausian random number when invoked.
    Returns: random number distributed normally, with mean=0 and standard deviation ($\delta$)=1.0, also known as the Gaussian distribution.
Composite Classes
FIG. 5 shows the implementation of composite classes in general. This section describes a library of the Nested superclass and composite classes.
Nested
Overview
Nested is an abstract class containing Strings for nested classes. It implements the Constants and Runnable interfaces. The config method prepares a comp list of its runnable components. The run method calls the run method of each composite and block on the comp list.
Attributes
tag_desc is a String composite user tag
description is a String composite brief description.
type is a String identifying the composte class.
offOn is a boolean that allows its components to run when true. Its default is false.
Methods
config
    Arguments: none.
    Returns: none.
run
    Arguments: none.
    Returns: none
Loop
Overview
Loop is a user defined nested class. It contains config and run methods, which are called by the main method.
FIG. 9 shows the Loop composite class, which contains the AnalogInput, AdvancedPID, and AnalogOutput classes connected as shown. Each time the Loop class is used to create a Loop composite object it also creates an instance of ain, pid, and aout. Each Loop composite object is created with the default attributes of the ain, pid, and aout, however, the default attributes can be overridden.

Attributes
ain is an instance of AnalogInput class.
pid is an instance of AdvancedPID class.
aout is an instance of AnalogOutput class.
comp is a ObjList of Runnable objects.
sp is the alias for the pid setpoint, a FloatParameter
pv is the alias for the pid process variable, a FloatParameter
out is the alias for the pid output, a FloatParameter
Attributes from Superclass
tag user specified Loop tag, a String
description "Secondary", a String.
type "Loop", a String.
Methods
Methods from Superclass
Config
   Arguments: none.
   Returns: none.
run
   Arguments: none.
   Returns: none
PLoop
Overview PLoop is a user defined nested class. It contains config and run methods, which are called by the Configure class.

Figure 10:
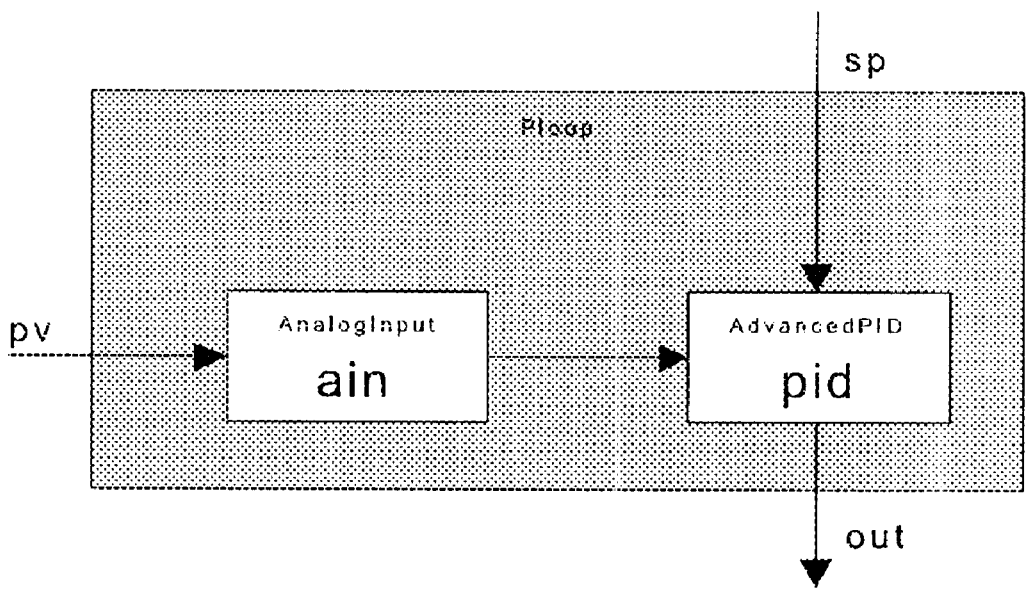
FIG. 10 depicts a PLoop composite class in a control system according to the invention.

FIG. 10 shows the Ploop (Primary Loop) composite class, which contains the AnalogInput and AdvancedPID classes connected as shown. Each time the PLoop composite class is used to create a PLoop composite object it also creates an instance of ain and pid. Each PLoop composite object is created with the default attributes of ain and pid, however, the default attributes can be overridden.

Attributes
   ain is an instance of AnalogInput class.
   pid is an instance of AdvancedPID class.
   comp is a ObjList of Runnable objects.
   sp is the alias for the pid setpoint, a FloatParameter
   pv is the alias for the pid process variable, a FloatParameter
   out is the alias for the pid output, a FloatParameter
Attributes from Superclass
tag user specified Ploop tag, a String
description "Primary", a String.
type "Ploop", a String.
Methods from Superclass
config specifies internal default values and connections.
   Arguments: none.
   Returns: none.
run schedules and runs contained components when run is called.
   Arguments: none.
   Returns: none
Cascade
Overview Cascade is a user defined nested class. It contains config and run methods, which are called by the Configure class.

Figure 11:
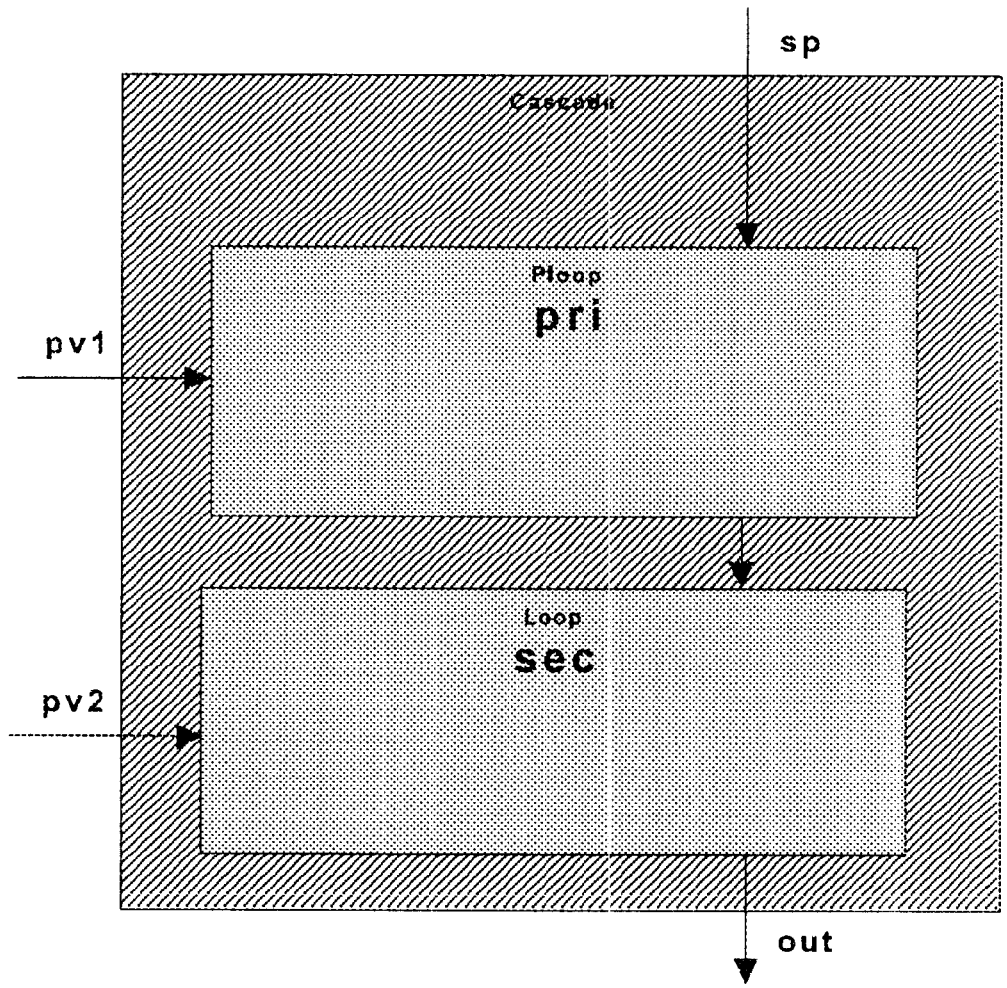
FIG. 11 depicts a cascade composite class in a control system according to the invention.

FIG. 11 shows the Cascade composite class, which contains the Ploop and Loop composite classes connected as shown.

Attributes
Pri is an instance of the Ploop class.
sec is an instance of the Loop class.
comp is a ObjList of Runnable objects.
attributes from superclass
tag user specified Cascade tag, a String
description "TempCascade", a String.
type "TempCascade", a String.
Methods from Superclass
config specifies internal default values and connections.
   Arguments: none.
   Returns: none.
run schedules and runs contained components when run is called.
   Arguments: none.
   Returns: none
User Composite Classes The user composite classes are examples of classes that would be created by a user in the same way as the composite classes discussed above. In addition users can create their own subclasses under the superclass UserBlock shown in FIG. 4.

The remainder of this section describes the TempProcess composite class, which is used to create instances that simulate a process, which provides temperature and flow measurements.

TempProcess
Overview

Figure 12:
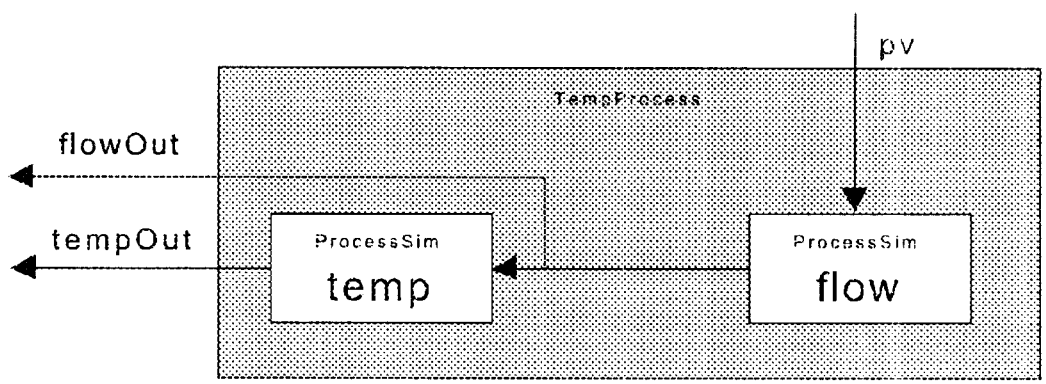
FIG. 12 depicts a TempProcess Composite class in a control system according to the invention.

FIG. 12 shows the TempProcess user composite class, which contains two ProcessSim classes connected as shown. Each time the TempProcess composite class is used to create a TempProcess composite object it also creates an instance of flow and temp. Each TempProcess composite class is created with the default attributes of flowOut and tempOut, however, the default attributes can be overridden. The flow process is a one time step delay (0.5 sec.) and the temperature process is a 10 sec. delay.

Attributes
flow is a ProcessSim block with 1 input.
temp is a ProcessSim block with 1 input.
comp is a ObjList of Runnable objects.
FlowOut is the output of the flow process, a FloatVariable.
TempOut is the output of the temp process, a FloatVariable.
Attributes from Superclass
tag user specified TempProcess tag, a String
description is the String "Temperature Process".
type is the String "TempProcess".
Methods
config specifies internal default values and connections.
   Arguments: none.
   Returns: none.
run schedules and runs contained components when run is called.
   Arguments: none.
   Returns: none
Supv
Overview Supv is a user defined class derived from the UserBlock class. It contains a run method. It has one floatOut and no inputs. It contains the controller parameters and ramps its output, used as the supervisory setpoint of the temperature controller.

Attributes
parTC is a PIDParameters part that contains parameters for the temperature controller.
ParFC is a PIDParameters part that contains parameters for the flow controller.
Attributes from Superclass
tag user specified Supv tag, a String
description is the String "Supervisory Setpoint".
type is the String "Supv".

Methods from Superclass
run
    Arguments: none
    Called each time step to run the block.
    Returns: none
runMethod contains the user written code.
Arguments: none
    Called by run method
    Returns: none Process Control Application Classes The Block, Composite, and UserComposite classes can be used to create many object instances, which are simply referred to as composite objects or composites. An application instantiates and configures the composite objects using the config method and then executes them using the run method. The config method prepares a comp list of its runnable composites. The run method calls the run method of each composite on the comp list. The following two sections present the Loops2 and TempCasc applications.

Loops2

The Loops2 application illustrates composite objects for control and process simulation, which are made up of block objects.

Overview

Figure 13:
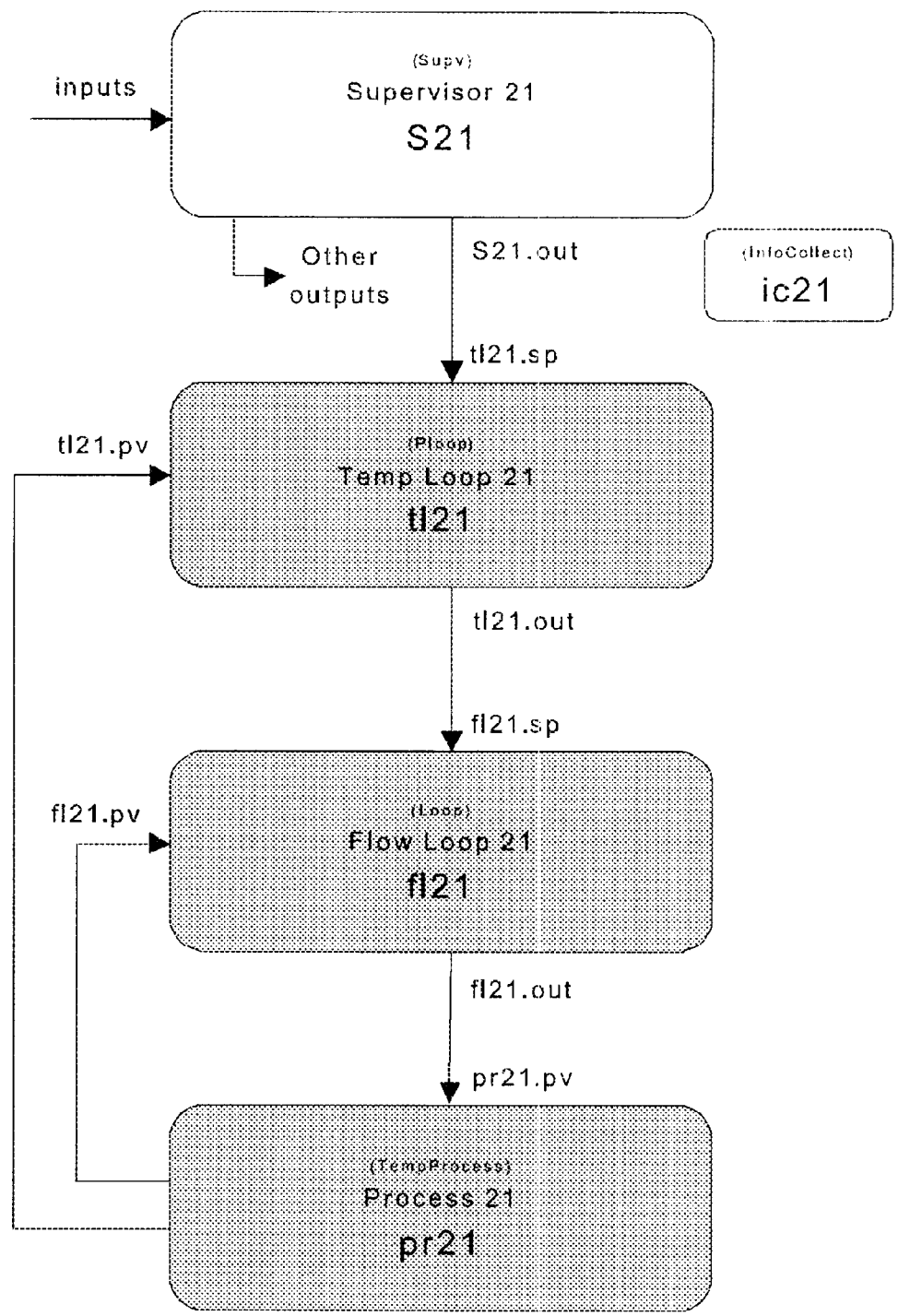
FIG. 13 depicts Loops2 control and process objects in a control system according to the invention.

FIG. 13 shows the Loops2 control composite objects and the process composite object, while FIG. 8.4.1-2 shows the same composites in detail. Application Loops2 uses the config method to instantiate (configure) composite objects s21, tl21, fl21, and pr21 and the run method to schedule them for execution.

Composite object s21 (Supervisor 21) is an instance of the Supv block class described in Sec. 8.3.2. It acts as a supervisory component and its output s21.out sets the temperature setpoint tl21.sp of Temp Loop tl21.

Composite object tl21 is an instance of the PLoop component class shown in FIG. 10 and is a single loop made up of block instances ain, and pid. Temp Loop 21 compares the temperature measurement value tl21.pv to the temperature setpoint tl21.sp and computes tl21.out, which sets the required steam flow setpoint fl21.sp Composite object fl21 (Flow Loop 21) is an instance of the Loop composite class shown in FIG. 9 and is a single loop made up of block instances ain, pid, and aout. Flow Loop 21 compares the steam flow measurement value fl21.pv to the required steam flow setpoint fl21.sp and computes the required steam valve position fl21.out, which sets process variable pr21.pv Composite object pr21 (Process 21) is an instance of the TempProcess composite class shown in FIG. 8.3.1-1 and simulates the temperature process. Process 21 uses process variable pr21.pv and computes the resulting steam flow fl21.pv and temperature tl21.pv.

Object ic21 is an instance of the InfoCollect block class. Object ic21 collects the date/time, value, and status for 10 (configurable) samples of tl21.pv, tl21.sp, fl21.pv, fl21.sp, and fl21.out. Each of these objects is double-buffered and when one buffer fills it switches to the other, which it overwrites.

Attributes
s21 is a Supv block.
tl21V1 is version 1 of a Ploop composite.
tl21 is an alias for a Ploop composite.
tl21V2 is version 2 of a Ploop composite
fl21 is a Loop composite.
pr21 is a TempProcess composite.
ic21 is an InfoCollect block.
comp is a ObjList of Runnable objects.
Methods
config overrides default values and makes external connections.
    Arguments: none.
    Returns: none.
run schedules Loop2 objects and calls their run methods.
    Arguments: none.
    Returns: none TempCasc The TempCasc application illustrates the cascade composite object for control, which is made up of component (composite) objects, while the process composite is made up of block objects.

Overview

Figure 14:
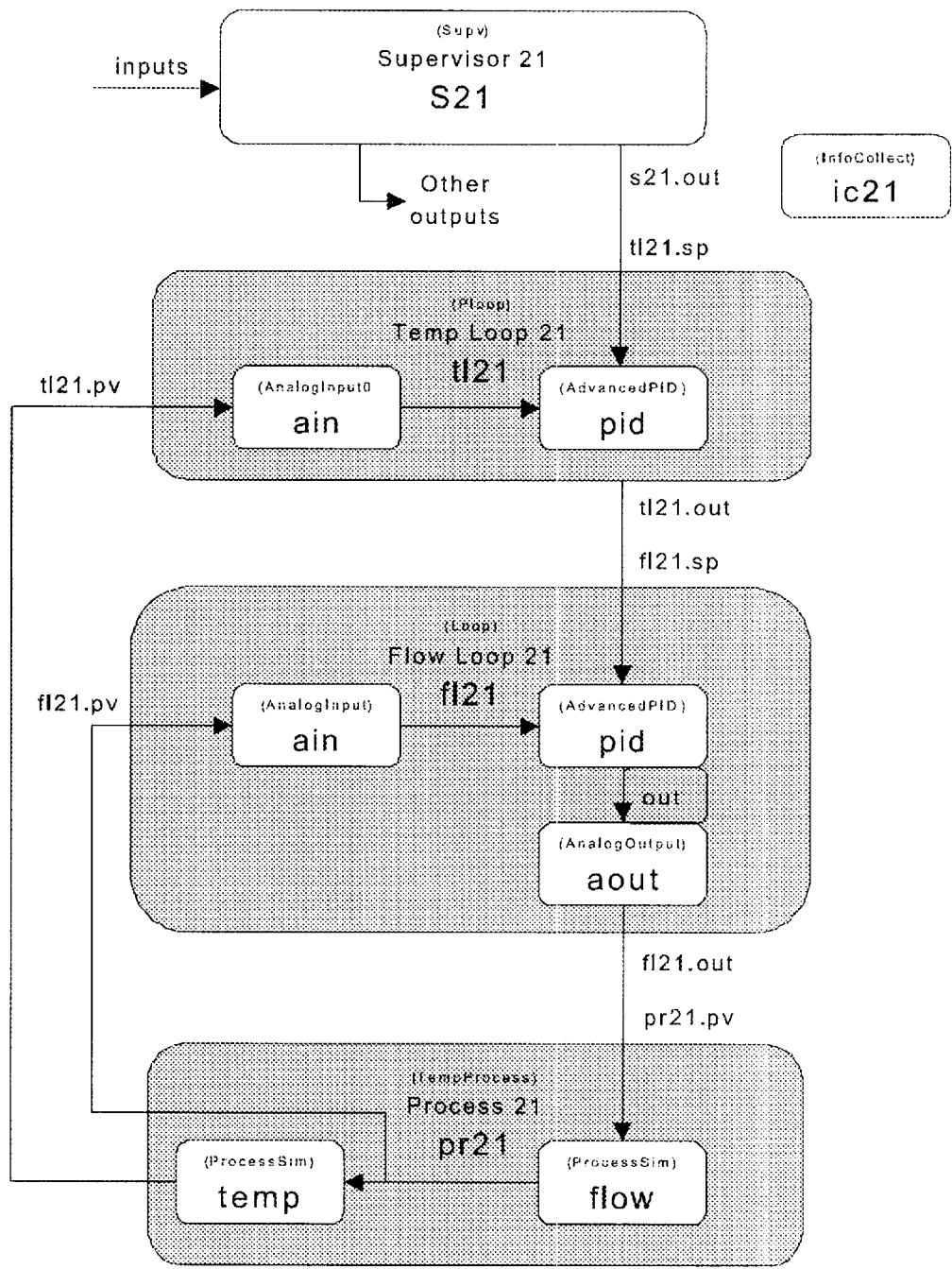
FIG. 14 depicts Loops2 control and process objects and details in a control system according to the invention.
Figure 15:
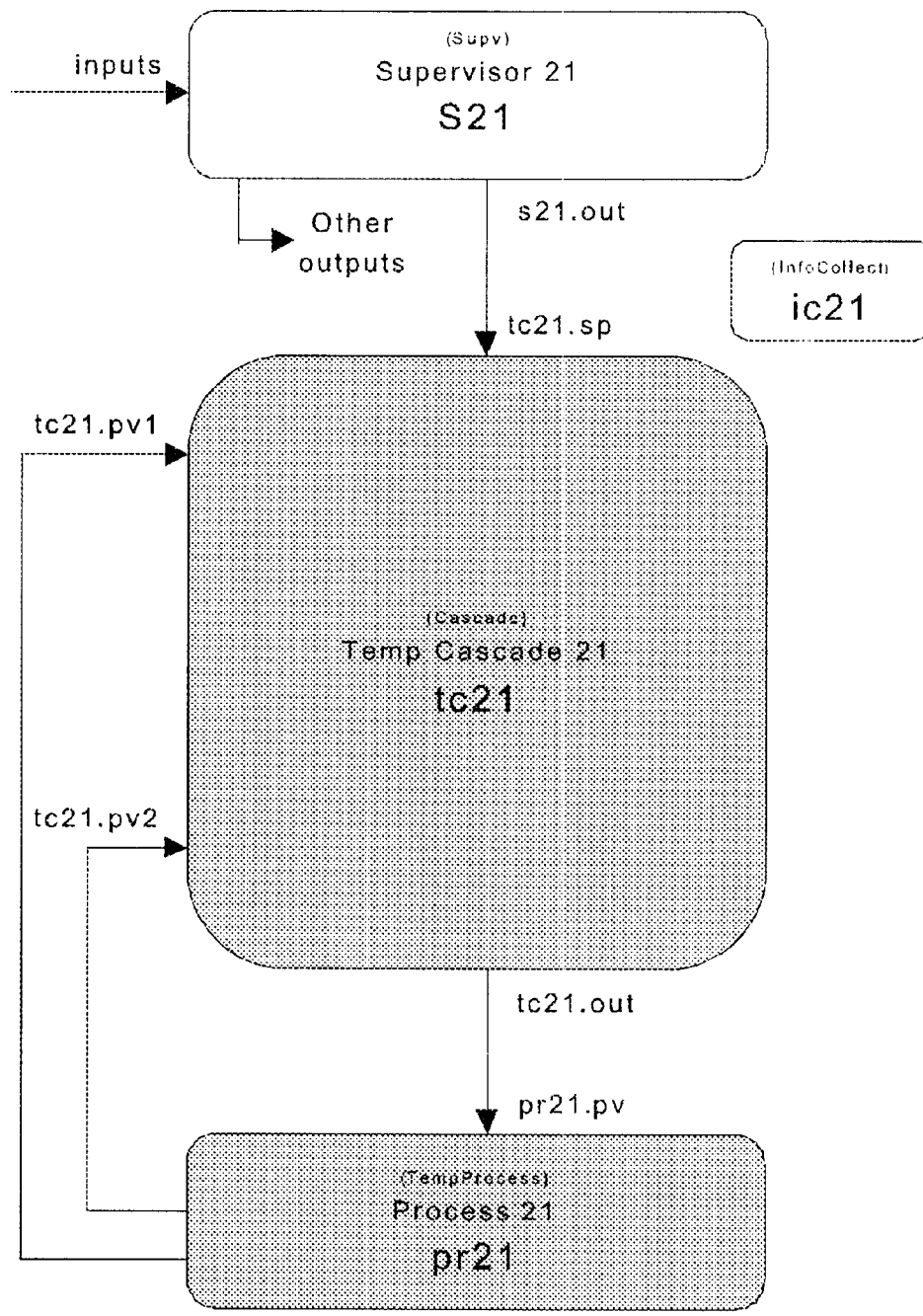
FIG. 15 depicts TempCasc control and process objects in a control system according to the invention.

FIG. 13 shows the TempCascade composite object and process, while FIG. FIG. 14 shows the same components in detail. Application TempCasc uses the config method to instantiate composite objects s21, tc21 and pr21, and the run method to schedule them for execution.

Composite object s21 (Supervisor 21) is an instance of the Supv block class described in Sec. 8.3.2. It acts as a supervisory component and its output s21.out sets the temperature setpoint tc21.sp of Temp Loop tc21.

Composite object Temp Cascade 21, tc21, is an instance of the Cascade composite class shown in FIG. 8.2.5-3 and is a cascade loop made up of Ploop instance pri, and Loop instance sec.

Temp Cascade 21, tc21, uses measurement values tc21.pv1 and tc21.pv2 and temperature setpoint tc21.sp and computes the required steam valve position out21.

Composite object pr21 (Process 21) is an instance of the TempProcess component class shown in FIG. 8.3.1-1 and simulates the temperature process. Process 21 uses process variable pr21.pv and computes the resulting steam flow fl21.pv and temperature tl21.pv.

Object ic21 is an instance of the InfoCollect block class. Object ic21 collects the date/time, value, and status for 10 (configurable) samples of tc21.sp, tc21.pv1, tc21.pv2, and fl21.out. Each of these objects is double-buffered and when one buffer fills it switches to the other, which it overwrites.

Attributes
s21 is a Supv block.
tc21 is a Cascade composite.
pr21 is a TempProcess composite.
comp is a ObjList of Runnable objects.
Methods
Config overrides default values and makes external connections.
    Arguments: none.
    Returns: none.
Run schedules TempCasc objects and calls their run methods.
    Arguments: none.
    Returns: none Information Collection Objects The purpose of information objects is to collect information for date/time, bool, int, and float parameters, alarmSum, and modes.

The purpose of InfoCollect objects is to collect a specified number of samples for the date/time, value, and status of a specified number of bool and float parameters, alarmsSum, and mode. The samples are collected in two buffers. When one buffer fills data storage is switched to the other.

An object from the InfoCollect class has paramBool parts from the BoolParameter class, paramInt parts from the IntParameter class, paramFloat parts from the FloatParameter class, actual mode parts from the Mode class, and alarmSum short integers.

Methods from the source FloatParameter and BoolParameter classes can be used to linkTo( ).

An object from the Event class may have a paramBool part from the BoolParameter class, paramInt parts from the IntParameter class, aparamFloat part from the FloatParameter class, an actual mode part from the Mode class, and an alarmSum short integer.

Methods from the BoolParameter, IntParameter, and FloatVariable classes can be used to linkTo( ).

Configuration

All parts that a block or part may use are declared. Mandatory parts are instantiated in the declaration or constructor, while optional parts are not. If optional parts are used, they are instantiated by the configurator. An arbitrary number of a specific part type is specified as an argument of the container's constructor method. For example, see the Supv class derived from the UserBlock in Loops2. An example of an optional part class is Filter, which is used in the CascFloatInput class.

Block classes are the lowest level classes that can be used as component classes that are optionally interconnected to create composite classes. Of course the composite classes can contain not only block classes but also other composite (component) classes, and so on. The block classes and their mandatory and optional part, signal, and inputOutput classes contain default values for each attribute.

Configuration of Composite Classes

Java code is written and compiled to create a new composite class. An already existing composite class can be instantiated and the resulting composite object can be customized to suit the application without compiling.

The code for a new composite contains name declarations of component blocks and composites. Its constructor method preferably contains calls to the component's constructor methods. A block object that may have multiple part objects from the same part class requires that the number of such part objects be specified as an argument in the block's constructor. This number may be passed from a containing composite constructor's argument.

A config method can be written that makes the internal variable and parameter connections between components and overrides default parameter value and option assignments. Connections are made and broken with linkTo and Unlink methods of the source parameter or variable. The linkto method will not succeed if the sink parameter or variable is already linked. A bidirectional cascade variable connection is made or broken with a single linkTo or Unlink method.

Each component composite's config method is called before overriding its assignments. This method may be used to instantiate new optional part objects and override their defaults. Each component block or composite is added to the composite's comp list in the order in which they are to execute.

A run method must be written. This calls in sequence the run method of each component block and composite.

After compilation any number of new composite objects can be created from this composite class in the same way as standard composite objects can be created from its library class.

The following are examples of composite classes: Loop, Ploop, Cascade, TempProcess.

Configuration of Block and Composite Object Instances

The block classes, the composite classes, and the user composite classes can be used to configure as many block and composite object instances as desired without recompiling provided there is a capable configure process.

Examples of block and composite object instances: Loops2 and TempCasc.

Configuration without Compilation

A control system implemented with PCOs as described above can be configured without compilation. To this end, the following steps can be performed:

Create a configuration object which contains configured PCO objects including parameter values, initial target mode and all connections among various blocks necessary for a closed-loop control.

Download the configuration object to the field device.

Create an object file based on the configuration object.

Start PCO execution from the object file.

Change connections among PCO blocks on the fly by invoking a remote method.

Transfer PCO parameters or variables from a client (host) to a server (field device) together with a string identifying the blocks and related PCO parts and signals.

Add and remove new blocks on the fly. New blocks are instantiated in the device and added into the runList. Connections to the new blocks are made on the fly as well.

Enable PCO optional parts on the fly.

Checkpoint on demand.

Upload an object file into the configurator.

A general RMI RemoteInterface is designed to make all on-line operations listed above possible. The methods in this RemoteInterface provide a useful framework for further development. In particular, several common methods are provided to deal with the following important issues:

Access PCO Parameters and Variables via a string name and an object. The string name follows the naming convention outlined in this document.

Make connections between blocks by invoking a remote method. Sink and source of arrays can be connected by a single remote method call.

Enable any PCO optional parts of any PCO blocks by invoking a single remote method.

The implementation of these methods utilizes the Java Reflection package which is included in Java 1.1.

IEC 1131-3

The IEC 1131-3 specification requires that its Sequential Function Charts and the three different languages namely, Structured Text, Ladder Logic, and Function Blocks work in concert, that is, a user can intermix them and create a control strategy. An example is the creation of a task using Structured Test which invokes the in-line code execution of a Ladder(s) or a Function Block(s).

Referring to FIG. 4 the IEC 1131-3 functionality (Sequential Function Charts, Structured Text, Ladder Logic, and Function Blocks) is shown as a subclass(es) under the UserBlock class. The UserBlock class provides the inputs and outputs as defined by the PCO to all its subclasses, thus enabling interconnection between PCO and IEC 1131-3 objects. The IEC 1131-3 configurator then can produce Java bytecode directly, or can compile source code of another language such as structured text into Java bytecode.

Execution Environment

Process Conrol Objects are preferably run as Java applications (though, they can be run as Java applets, servlets, or the like), with each composite and block object having its own run method, which is called by the run method of the next higher level composite object. Scheduling of a thread is preferably also done in Java, though it can be performed elsewhere. For example, a real-time operating system can be used for scheduling, though, it is preferably not hardware specific. The sleep interval until the next run start is determined by adding the Block Processing Cycle (BPC) time to the present desired run start time and subtracting the current time (in milliseconds).

Each thread preferably has its own object set and run methods. When device is powered up, it starts a PCO application shell. The application shell itself is a Java application. Once it gets started, it runs until device is powered down or rebooted. After the application shell starts, it periodically checks for messages sent from a host running the configurator. In the illustrated embodiment, it understands three types of messages, FileCreation, Commit and Checkpoint.

FileCreation

This message is sent when the OK button is pressed. Once this message is received, the application shell serializes the configuration object to a file in the local file system of the device.

Commit

This message is sent when the Commit button is pressed. Once this message is received, the application shell does the following:

(1) Load the object file from the file system with the file name given in the message;

(2) Loop through the HashTable built in configuration object to identify all blocks;

(3) Make the block objects available to the remote object;

(4) Start a control thread which executes each object in the runList.

Checkpoint

This message is sent when the Checkpoint button is pressed. Once this message is received, the application shell serializes the current configuration object into a file in the local file system. This file is the checkpoint file which can be transferred to any computer via FTP.

Verification and Validation

Verification and validation of control blocks can be implemented in the manner described in copending, commonly assigned U.S. patent application Ser. No. 09/345,215, filed Jun. 30, 1999, and its counterpart PCT Application Serial No. US00/16152, filed Jun. 9, 2000, both entitled Process Control and Method with Auto-Updating, the teachings of which are incorporated herein by reference, Platform Communications Intra-Platform Communication A cascaded FloatVariable, IntVariable or BoolVariable requires that some of its fields (subobjects) be communicated downstream (forw, alarmSum, uncertainty, maintenance) and others upstream (back, range). All unidirectional variable fields are communicated downstream. Intra-platform communication is done by reference. Variables are stored in an output part of the upstream block and linked to the downstream block with a linkTo( ) method called at configure time. There is also an unLink( ) method that can be called to reconfigure.

Objects are not moved from place-to-place within a platform. Input and output signals are instances of the xxVariable class. Variable linking is discussed above. "Constants" such as a gain or time constant are instances of the FloatParameter class. A FloatParameter can be linked to a forw or back parameter of a FloatVariable with a linkTo( ) method. Each Parameter (such as forw and back) has two status bytes, one is enumerated providing SEVA (clear/blind etc. instead of good/bad) status and cascade status, the other a packed Boolean containing limit bits and linking and setting permission status bits.

Cascade Peer-to-Peer Communication

Block-to-block input-output Variable connections within a station are made by reference. Although the data resides in the upstream block, either block may be the source for a particular attribute. Thus in a cascade (one-to-one) connection, the forw Parameter (value, status, limStatus) and alarmSum are set by the upstream block and the back Parameter and Range are set by the downstream block. The upstream block sets all of the unidirectional Variable attributes.

When the upstream and downstream blocks are in different stations, both unidirectional and bidirectional communication is more complicated. A copy (proxy) of the Variable (or Parameter) that resides in the upstream block must also exist in the downstream block. A cascade Variable must be split into its forward- and back-propagated Parameters. If push (publish-subscribe) communications are used, the source station needs a publish list of the source object references and a source String names (topics). The sink object needs a subscribe list of the sink object references (proxies) and source object String names (topics).

Figure 17:
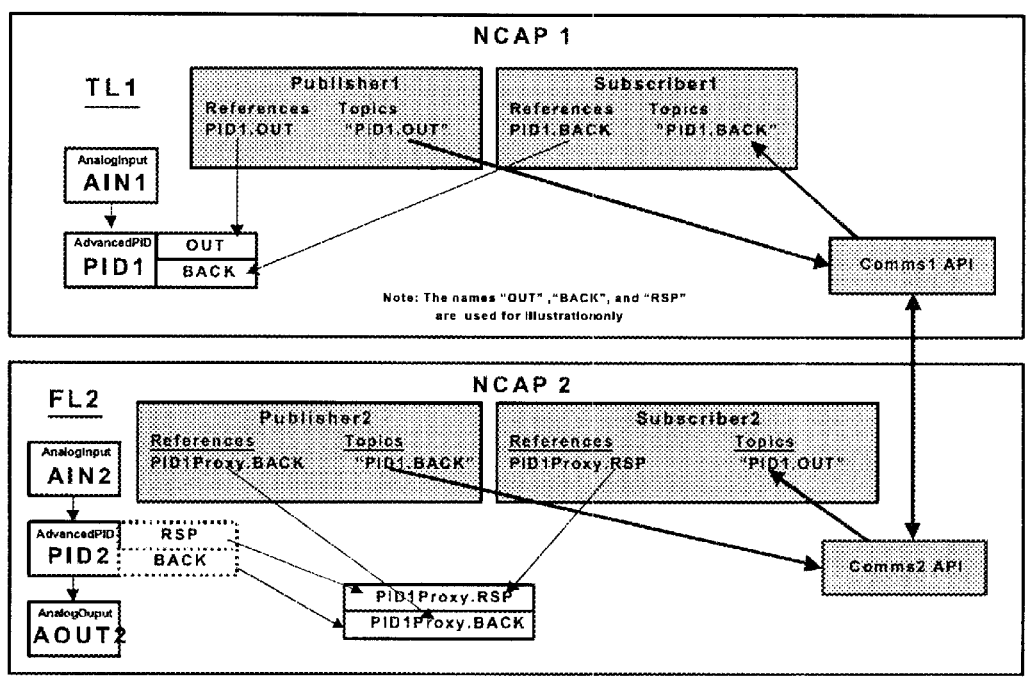
FIG. 17 depicts cascade peer-to-peer communication in a control system according to the invention.

FIG. 17 shows an example of cascade peer-to-peer communication. The cascade control loop consists of AIN1 and PID1 that make up the temperature loop TL1 and AIN2 and PID2 that make up flow loop FL2. TL1 is in device NCAP1 and FL2 is in device NCAP2. In the forward direction from PID1 to PID2, output OUT of PID1 sets the remote setpoint RSP of PID2. In the backward direction from PID2 to PID1, output BACK of PID2 sets the BACK of PID1.

Each device has a Publisher and a Subscriber list and a CommsAPI. Each publisher and subscriber list contains references and topics. The topics are strings indicated in quotes.

Consider the communication in the forward direction from PID1 to PID2. Publisher1 shows reference PID1.OUT, which points to the actual parameter object OUT that needs to be transferred to its subscriber(s) and its corresponding topic "PID1.OUT". This topic is subscibed to by Subscriber2, which shows topic "PID1.OUT" and reference PID1Proxy.RSP. This reference points to the actual parameter proxy object PID1Proxy.RSP where the required parameter object is transferred to. Controller PID2 references this object and uses it when it executes.

Now consider the communication in the back direction from PID2 to PID1. Publisher2 shows reference PID1Proxy.BACK, which points to the actual parameter object that needs to be transferred to its subscriber(s) and its corresponding topic "PID1.BACK". This topic is subscibed to by Subscriber1, which shows topic "PID1.BACK" and reference PID1.BACK. This reference points to the actual parameter object BACK where the required parameter object is transferred to.

PCO Object Based Transfer

There are two types of communications transfer cascade and unidirectional.

Cascade transfer for peer-to-peer inter-platform communication requires transfer of parameters (value, status, limStatus, time). The previous section provides an example of transfer of parameters for cascade transfer.

Unidirectional transfer for peer-to-peer inter-platform communication requires transfer of variables (forw parameter, range, uncertainty, maintenance, alarmSum).

Object transfer as opposed to fundamental data type allows more information to be transferred in each message, therefore fewer messages and a smaller lookup table. Periodic transfers can be done using publish-subscribe services. One-to-one event driven transfers can be done with client-server services.

Peer-to-peer requires transfer of parameters (value, status, limStatus, time) for cascade transfer or variables (forw parameter, range, uncertainty, maintenance, alarmSum) for unidirectional transfer. Assuming publish-subscribe, each published object must have a unique string name that the subscribing device can recognize.

Operator display requires a trend object (setpoint, measurement, output forw parameters and input and output modes). Publish-subscribe may be used for this also. User setpoint, output, and mode changes can be transmitted using RMI.

Block details require transfer of an object containing the part parameters on each open window each time one changes. Settable changes can be transmitted using RMI.

Configuration requires the streaming of a PCO configuration or checkpoint file. Also it is necessary to be able to invoke remote methods with object arguments.

A historian can receive InfoCollect buffer objects.

FIG. 18 provides a summary of the variable and parameter transfer and rules.

Discussion

Blocks structured with a body and one or more input and output parts. Each cascade input part supports local/remote/supervisory switching, setpoint limiting, matched characterization, additive or multiplicative feedforward (bias or ratio setpoint), pv (process variable) output, measurement (in) filtering, deviation 9pv-sp), alarming, and support for bumpless initialization and antiwindup recovery from downstream limiting. Each output part supports manual/auto, supervisory switching, output limiting and alarming, additive or multiplicative feedforward, and bumpless initialization and antiwindup recovery from downstream limiting.

Variables are alarmed at their source and alarm status is communicated to sinks as part of the variable. Range is specified at a measurement source and communicated to sinks as part of the variable. Cascaded range is transmitted upstream. Blocks are the lowest level objects that are recognized at the system level. Each block and its parts must reside in a single station or device. Composites may span stations or devices.

Parts Classes

This section describes the part classes, which are contained in the Parts package. A Part must be contained in a block or other part contained in a block. Each block may have one or more input parts, a body, and one or more output parts. Input and output Part classes contain or reference either FloatVariable, BoolVariable, or IntVariable signals which enable uni-directional or bi-directional communication between blocks.

An unused optional part has a null reference. The configurator must instantiate an optional part before it can be used or its parameters set.

UniDirFloatInput

Overview

UniDirFloatInput is a measurement path input interface part that initializes and applies charactization, and filtering to its in signal.

Attributes in is a reference to a FloatVariable source. in.forw.value is in eng. units.

charac is a reference to an optional signal Characterizer.
charac.xPt[i] and charac.yPt[i] are breakpoint coordinates, float values.

filter is a reference to an optional signal Filter.

options is a packed boolean byte with:

I_O in is provided from device and point device is the String name of an i/o device that is the source of in.

point is an integer used to identify an i/o address within the device.

pv is a Float Variable output representing the processed in value.

gain is a FloatParameter that multiplies pv.

dtime is a reference to an optional Deadtime part.

Methods for Developer

UniDirFloatInput (constructor)

Arguments: none.

Returns: none.

startup

Arguments: none
tests span.

Returns: true if ready to run.

CascFloatInput

Overview

CascFloatInput is an input interface part that provides initialization, local/remote/supervisory switching, optional setpoint limiting, optional local or supervisory setpoint ramping, optional deviation alarming, and an optional multiplicative or additive feedforward input.

Its internal methods are called by its container block.

startup( ) Called when out-of-service, returns true if ready to run.

inHandle( ) Sets back values and status, processes in.

locRemTarget( ) Determines the internal target mode.

devHandle(period) Handles setpoint and deviation.

initialize( ) Provides bumpless mode transitions.

modeHandle( ) Provides functionality for active mode.

limitStatus(lim) Propagates limit bits to back.status.

Attributes remSP is an optional reference to the source of the remote setpoint FloatVariable.

supvSP is an optional reference to the source of the supervisory setpoint, a FloatVariable.

lrs is the setpoint local/remote/supervisory Mode having target, actual, permitted, and last packed boolean bytes whose bits are:

O_S Block is out of service

INITIALIZE Transition actual mode enables bumpless transfer to target mode

LOCAL Operator or set method can set sp.

REMOTE External block (remSP) sets setpoint.

SUPER Supervisory task (supvSP) sets setpoint.

LINKED Permitted attribute indicates target connected to external source.

fdFwd is an optional reference to the source of a Feedforward object.

fdFwd.ff is a reference to the source of a FloatVariable.

fdFwd.gain is a FloatParameter gain applied to fdFwd.ff ramp is an optional reference to the source of a Ramp object.

ramp.rateDn is a positive FloatParameter specifying the rate down.

ramp.rateUp is a positive FloatParameter specifying the rate up.

ramp.target is a FloatParameter that contains the termination value.

ramp.trigger is a BoolParameter that starts the ramp.

limit is an optional reference to the source of a setpoint Limit object.

limit.hi is the high limit, FloatParameter limit.lo is the low limit, FloatParameter alarmDevi is an optional reference to the source of a deviation Alarm object.
 alarmDev.hi is the high alarm limit a FloatParameter.
 alarmDev.lo is the low alarm limit, a FloatParameter.
  alarmDev.hys is the alarm hysteresis, a FloatParameter.
  alarmDev.delay is an optional alarm delay in seconds, a FloatParameter
  alarmDev.noAck is a boolean, alarm requires no acknowledge if true.
sp is a FloatVariable representing the current setpoint. In the LOCAL mode sp can be set
deviation is a FloatVariable output representing in—sp. It can be alarmed.
Attributes from Super Class
in is a reference to a FloatVariable source. inforw.value is in eng. units.
charac is a reference to an optional signal Characterizer.
 charac.xPt[i] and charac.yPt[i] are breakpoint coordinates, float values.
filter is a reference to an optional signal Filter.
 options is a packed boolean byte with bits assigned as:
 SP_PV_TRK_MAN Setpoint tracks PV when output is manually set.
 SP_DN_UNCER Setpoint is decreased by the uncertainty.
 SP_UP_UNCER Setpoint is increased by the uncertainty.
 MULT_FF Feedforward is multiplicative, else it is additive.
device is the String name of an i/o device that is the source of in.
point is an integer used to identify an i/o address within the device.
pv is a Float Variable output representing the processed in value.
Methods for Developer
CascFloatInput (constructor)
 Arguments: none.
  Instantiates sp and deviation.
 Returns: none.
startup
 Arguments: none.
 Called when out-of-service.
 Returns: true if ready to run.
inHandle
 Arguments: none.
 Sets back values and status, processes in and feedforward.
 Returns: none.
locRemTarget
 Arguments: none.
 Determines the internal target mode.
 Returns: none.
devHandl
 Arguments: period is the time since the last update in seconds, a double.
 Handles setpoint and deviation.
 Returns: none
initialize
 Arguments: none.
 Provides bumpless mode transitions
 Returns: none.

modeHandle
 Arguments: none.
 Provides functionality for active mode.
 Returns: none.
limitStatus
  Arguments: lim holds limit bits to be propagated upstream, an integer.
  Propagates limit bits to back.status.
 Returns: none.
UniDirFloatOutput
Overview
 UniDirFloatOutput is an output interface part that provides auto/manual/supervisory switching, optional out limiting, optional out alarming, and an optional multiplicative or additive feedforward input.
 Its methods are called by its container block.
startup( ) Called when out-of-service, returns true if ready to run.
manAutoTarget( ) Determines the internal target mode.
modehandle(period) Provides functionality for active mode.
Attributes
fdFwd is an optional reference to the source of a Feedforward object.
 fdFwd.ff is a reference to the source of a FloatVariable.
 wd.gain is a FloatParameter gain applied tofdFwd.ff.
supvOut is an optional reference to the source of the supervisory output, a FloatVariable.
mas is the output manual-auto-supervisory Mode having target, actual, permitted, and last packed boolean bytes whose bits are:
 O_S Block is out of service
 INITIALIZE Transition actual mode enables bumpless transfer to target mode
 MANUAL Operator or set method can set out.
 AUTO Block algorithm sets out.
 SUPER Supervisory task (supvSP) sets setpoint.
 LINKED Permitted attribute indicates target connected to external source.
 INTERLOCK interlock.in sets out when interlock.trigger is true.
options is a packed boolean byte with bits assigned as:
 LIM_MAN Limits are applied to manual output.
 ALM_MAN Alarming is applied to a manual output.
 MAN_START Block returns from out-of-service in MANUAL mode.
 MULT_FF Feedforward is multiplicative, else it is additive.
 ALARM_BLURRED Block alarm triggered by BLURRED signal status.
 I_O out is provided to device and point.
limit is an optional reference to the source of an out Limit object.
 limit.hi is the high limit, FloatParameter
 limit.lo is the low limit, FloatParameter
alarmHi is an optional reference to the source of an out Alarm object.
 alarmHi.hi is the high alarm limit, a FloatParameter.
 alarmHi.lo is the low alarm limit, a FloatParameter.
 alarmHi.hys is the alarm hysteresis, a FloatParameter.
 alarmHi.delay is an optional alarm delay in seconds, a FloatParameter
 alarmHi.noAck is a boolean, alarm requires no acknowledge if true.
alarmHiHi is an optional reference to the source of an out Alarm object.
 alarmHiHi.hi is the high alarm limit, a FloatParameter.
 alarmHiHi.lo is the low alarm limit, a FloatParameter.
  alarmHiHi.hys is the alarm hysteresis, a FloatParameter.

alarmHiHi.delay is an optional alarm delay in seconds, a FloatParameter
alarmHiHi.noAck is a boolean, alarm requires no acknowledge if true.
interlock is an optional object used to invoke an override of the current Mode.
  interlock.trigger is a BoolParameter used to invoke INTERLOCK Mode.
  interlock.reset is a BoolParameter used to return to normal Mode, provided interlock.trigger is false.
  interlock.in is a FloatParameter that sets out in the INTERLOCK Mode.
device is the String name of an i/o device that is the sink of out.
point is an integer used to identify an i/o address within the device.
out is a FloatVariable representing the current output. In the MANUAL mode out can be set
fbk is the integral feedback input, a FloatParameter, which is connected by default to out.back if it is connected externally, otherwise to out.forw.

Methods for Developer
UniDirFloatOutput (constructor)
  Arguments: none.
    Instantiates out.
  Returns: none.
startup
  Arguments: none.

Attributes from Super Class
FdFwd is an optional reference to the source of a Feedforward object.
  fdFwd.ff is a reference to the source of a FloatVariable.
  fdFwd.gain is a FloatParameter gain applied to fdFwd.ff.
supvOut is an optional reference to the source of the supervisory output, a FloatVariable.
mas is the output manual-auto-supervisory Mode having target, actual, permitted, and last packed boolean bytes whose bits are:
  O_S Block is out of service
  INITIALIZE Transition actual mode enables bumpless transfer to target mode
  MANUAL Operator or set method can set out.
  AUTO Block algorithm sets out.
  SUPER Supervisory task (supvSP) sets setpoint.
  LINKED Permitted attribute indicates target connected to external source.
  INTERLOCK interlock.in sets out when interlock.trigger is true.
options is a packed boolean byte with bits assigned as:
  LIM_MAN Limits are applied to manual output
  ALM_MAN Alarming is applied to a manual output.
  MAN_START Block returns from out-of-service in MANUAL mode.
  MULT_FF Feedforward is multiplicative, else it is additive.
  ALARM_BLURRED Block alarm triggered by BLURRED signal status.
limit is a reference to the source of an out Limit object.
  limit.hi is the high limit, FloatParameter
  limit.lo is the low limit, FloatParameter
alarmHi is an optional reference to the source of an out Alarm object.
alarmHiHi is an optional reference to the source of an out Alarm object.
  alarmHiHi.hi is the high alarm limit, a FloatParameter.
  alarmHiHi.lo is the low alarm limit, a FloatParameter.
  alarmHiHi.hys is the alarm hysteresis, a FloatParameter.
  alarmHiHi.delay is an optional alarm delay in seconds, a FloatParameter
  alarmHiHi.noAck is a boolean, alarm requires no acknowledge if true.
interlock is an optional object used to invoke an override of the current Mode.
  interlock.trigger is a BoolParameter used to invoke INTERLOCK Mode.
  interlock.reset is a BoolParameter used to return to normal Mode, provided interlock.trigger is false.
  interlock.in is a FloatParameter that sets out in the INTERLOCK Mode.
device is the String name of an i/o device that is the sink of out.
point is an integer used to identify an i/o address within the device.
out is a FloatVariable representing the current output. In the MANUAL mode out can be set Methods for Developer
CascFloatOutput (constructor)
  Arguments: none.
    Instantiates out and limit.
  Returns: none.
manAutoTarget
  Arguments: none.
    Determines the internal target mode
  Returns: none.
bkCalc
  Arguments: none.
    Compensates integral feedback for feedforwards.
  Returns: none.
initialize
  Arguments: none.
    Provides bumpless mode transitions.
  Returns: none.

Methods from Super Class
startup
  Arguments: none.
    Called when out-of-service, returns true if ready to run.
  Returns: none.
modeHandle
  Arguments: period is the time since the last update in seconds, a double.
    Provides functionality for active mode.
  Returns: none.

Alarm
Overview
Alarm is an optional part for all outputs. Its float method is func(x,type,period) where type is true for HH and LL, false for HI and LO. Its boolean method is func(x,period). Alarm reporting can be delayed if the optional delay parameter is not null or inhibited if inhib is true.

Attributes
hi is the high alarm limit, a FloatParameter.
lo is the low alarm limit, a FloatParameter.
hys is the alarm hysteresis, a FloatParameter.
lim is the boolean alarm state, a BoolParameter.
lim is an optional output, true if alarm is active, a BoolParameter.
delay is an optional alarm delay in seconds, a FloatParameter.
noAck is a boolean, alarm requires no acknowledge if true.
inhib is a boolean, inhibits alarm if true.

Methods for Developer
Alarm (constructor)
   Arguments: none, signifying a float alarm.
   Returns: none.
Alarm (constructor)
   Arguments: r is a FloatRange.object used to set the alarm limits.
   Returns: none.
Alarm (constructor)
   Arguments: b is a boolean signifying a boolean alarm.
   Returns: none.
func
   Arguments: x is the alarmed BoolVariable.
      period is the time since the last update in seconds, a double blurAl
   Returns: none.
func
   Arguments: x is the alarmed BoolVariable.
      period is the time since the last update in seconds, a double blurAl
   Returns: none.
Characterizer
Overview
   Characterizer is an optional part class used in the CascFloatInput part, UniDirFloatInput part, LinearFlow part, and ProcessSim block classes. Its method is y=func(x). The number of breakpoints is specified as the constructor argument.
Attributes
xPt[i] and yPt[i] are breakpoint coordinates, float values.
Methods for Developer
Characterizer (constructor)
   Arguments: nPt is an int number of (xPt, yPt) break points.
   Returns: none.
Func
   Arguments: u. is the input to the function, a double (x if forw is true).
      Forw is true if u=x, v=y, else u=y, v=x.
      Returns: v is the output of the function, a double (y if forw is true)
FeedForward
Overview
   Feedforward is an optional part class used in CascFloatInput, CascFloatOutput, and UniDirFloatOutput classes. It provides multiplicative or additive compensation for the input. Its methods are f=forwFunc(f, mult, out) and b=backFunc(b,mult), where mult and out are booleans indicating if true that the compensation is multiplicative and applied to output respectively.
Attributes
ff is a reference to the source of a FloatVariable.
Gain is a FloatParameter gain applied to ff
Methods for Developer
Feedforward (constructor)
   Arguments: none.
   Returns: none.
ForwFunc
   Arguments: sig is the internal pre feedforward out.forw.value, a double.
      mult is true if feedforward is multiplicative.
         out is true if the feedforward is an output part. Then a multiplicative feedforward is normalized with its high-range value.
   Returns: the prelimited out forw.value, a double.
backFunc
   Arguments: sig=fbk.value, a double.
      mult is true if feedforward is multiplicative.
   Returns: the back-calculated internal fbk, a double.
Filter
Overview
   Filter is a part class used in the CascFloatInput part, UniDirFloatInput part, and ProcessSim block classes. Its method is y=func(x,period). It is initialized with init(X).

$$s = \frac{d()}{dt}$$

$$y = \frac{x}{1 + fTime \cdot s + fType \cdot (fTime \cdot s)^2}$$

$$v = fTime \cdot s \cdot y$$

$$\text{returns: } \frac{(1 + lead \cdot s) \cdot x}{1 + fTime \cdot s + fType \cdot (fTime \cdot s)^2}$$

Attributes
FTime is the filter time in seconds, a FloatParameter.
lead is the lead time in seconds, a FloatParameter.
fType specifies the filter denomiator type, a FloatParameter.
   ½ Butterworth, ⅓ Averaging, ¼ Two-Lag, 0 One-Lag
y is the low-pass filtered output, a double.
v is the band-pass filtered output, a double.
Methods for Developer
Filter (constructor)
   Arguments: none.
      Instantiates fTime to 0., fType to 0.5, and lead to 0.
   Returns: none.
init
   Arguments: x is the filter input, a double
      Initializes the filter output to equal its input.
   Returns: none.
func
   Arguments: x is the filter input, a double.
      period is the time since the last update in seconds, a double
   Returns: the filter output, a double.
Limit
Overview
   Limit is a part class applied to the setpoint in the CascFloatInput, and to the out of a CascFloatOutput, and UniDirFloatOutput classes. Its method is x=func(x). The high limit cannot be less than the low limit. Neither limit may be more than 2% beyond the range limits.
Attributes
hi is a reference to a FloatVariable containing the high limit.
lo is a reference to a FloatVariable containing the low limit.
Methods for Developer
Limit (constructor)
   Arguments: none.
      Instantiates hi and lo.
   Returns: none.
func
   Arguments: x is the FloatVariable to be limited.
   Returns: none.
Ramp
Overview
   Ramp is an optional part class applied to the local setpoint in the CascFloatInput class. It provides a triggered ramp function with the method y=func(x,period).
Attributes
rateDn is a positive FloatParameter specifying the rate down.

rateUp is a positive FloatParameter specifying the rate up.
target is a FloatParameter that contains the termination value.
trigger is a BoolParameter that starts the ramp.
Methods for Developer
Ramp(constructor)(boolean link)
    Arguments: none.
    Returns: none.
Ramp(constructor)
    Arguments: none.
    Returns: none.
func
    Arguments: spt is the input to the ramp, a double.
        period is the time since the last update in seconds, a double.
    Returns: the ramp result, a double.
UniDirBoolInput
Overview
    UniDirBoolInput is a measurement path input interface part that initializes to its in signal.
Attributes
in is a reference to a BoolVariable source.
filter is a reference to an optional signal Filter.
options is a packed boolean byte with:
I_O in is provided from device and point
device is the String name of an I/O device that is the source of in.
point is an integer used to identify an I/O address within the device.
pv is a BoolVariable output representing the processed in value.
Methods for Developer
UniDirFloatInput (constructor)
    Arguments: none.
    Returns: none.
startup
    Arguments: none
    Returns: true if ready to run.
CascBoolInput
Overview
    CascBoolInput is an input interface part that provides initialization and local/remote/supervisory switching.
    Its internal methods are called by its container block.
startup( ) Called when out-of-service, returns true if ready to run.
inHandle( ) Sets back values and status, processes in.
locRemTarget( ) Determines the internal target mode.
devHandle(period) Handles setpoint and deviation.
initialize( ) Provides bumpless mode transitions.
modeHandle( ) Provides functionality for active mode.
Attributes
remSP is an optional reference to the source of the remote setpoint BoolVariable.
supvSP is an optional reference to the source of the supervisory setpoint, a BoolVariable.
lrs is the setpoint local/remote/supervisory Mode having target, actual, permitted, and last packed boolean bytes whose bits are:
    O_S Block is out of service
    INITIALIZE Transition actual mode enables bumpless transfer to target mode
    LOCAL Operator or set method can set sp.
    REMOTE External block (remSP) sets setpoint.
    SUPER Supervisory task (supvSP) sets setpoint.
    LINKED Permitted attribute indicates target connected to external source.
sp is a BoolVariable representing the current setpoint. In the LOCAL mode sp can be set
filter is a reference to an optional signal BoolFilter.
options is a packed boolean byte with bits assigned as:
pv is a IntVariable output representing the processed in value.
Methods for Developer
CascBoolInput(constructor)
    Arguments: none.
    Returns: none.
startup
    Arguments: none.
        Called when out-of-service.
    Returns: true if ready to run.
inHandle
    Arguments: none.
        Sets back values and status.
    Returns: none.
locRemTarget
    Arguments: none.
        Determines the internal target mode.
    Returns: none.
devHandl
    Arguments: none.
        Handles setpoint.
    Returns: none
initialize
    Arguments: none.
        Provides bumpless mode transitions
    Returns: none.
modeHandle
    Arguments: none.
        Provides functionality for active mode.
    Returns: none.
UniDirBoolOutput
Overview
    UniDirBoolOutput is an output interface part that provides auto/manual/supervisory switching.
    Its methods are called by its container block.
startup( ) Called when out-of-service, returns true if ready to run.
manAutoTarget( ) Determines the internal target mode.
modehandle(period) Provides functionality for active mode.
Attributes
supvOut is an optional reference to the source of the supervisory output, a BoolVariable.
mas is the output manual-auto-supervisory Mode having target, actual, permitted, and last packed boolean bytes whose bits are:
    O_S Block is out of service
    INITLALIZE Transition actual mode enables bumpless transfer to target mode
    MANUAL Operator or set method can set out.
    AUTO Block algorithm sets out.
    SUPER Supervisory task (supvSP) sets setpoint.
    LINKED Permitted attribute indicates target connected to external source.
    INTERLOCK interlock.in sets out when interlock trigger is true.
options is a packed boolean byte with bits assigned as:
    ALARM_BLURRED Block alarm triggered by BLURRED signal status.
    I_O out is provided to device and point.
alarm is an optional reference to the source of an out Alarm object.

alarmHi.hi is the high alarm limit, a FloatParameter.
alarmHi.lo is the low alarm limit, a FloatParameter.
alarmhi.hys is the alarm hysteresis, a FloatParameter.
   alarmHi.delay is an optional alarm delay in seconds, a FloatParameter
alarmHi.noAck is a boolean, alarm requires no acknowledge if true.
interlock is an optional object used to invoke an override of the current Mode.
   interlock trigger is a BoolParameter used to invoke INTERLOCK Mode.
   interlock.reset is a BoolParameter used to return to normal Mode, provided interlock.trigger is false. interlock.in is a FloatParameter that sets out in the INTERLOCK Mode.
device is the String name of an I/O device that is the sink of out.
point is an integer used to identify an I/O address within the device.
out is a BoolVariable representing the current output. In the MANUAL mode out can be set.
Methods for Developer
UniDirBoolOutput (constructor)
   Arguments: none.
      Instantiates out.
   Returns: none.
startup
   Arguments: none.
   Called when out-of-service, returns true if ready to run.
   Returns: none.
manAutoTarget
   Arguments: none.
      Determines the internal target mode
   Returns: none.
modehandle
   Arguments: period is the time since the last update in seconds, a double.
   Provides functionality for active mode.
   Returns: none.
CascBoolOutput
Overview
   CascBoolOutput is an output interface part that provides initialization, auto/manual/supervisory switching.
   Its methods are called by its container block.
startup( ) Called when out-of-service, returns true if ready to run.
manAutoTarget( ) Determines the internal target mode.
bkCalc( ) Set the backword values.
initialize( ) Provides bumpless mode transitions.
modeHandle(period) Provides functionality for active mode.
Attributes
out0 is a BoolVariable representing the first output. In the MANUAL mode out0 can be set.
out1 is a BoolVariable representing the second output. In the MANUAL mode out1 can be set.
point0 is an integer used to identify the I/O address of out0.
point1 is an integer used to identify the I/O address of out1.
Attributes from Super Class
supvOut is an optional reference to the source of the supervisory output, a BoolVariable.
mas is the output manual-auto-supervisory Mode having target, actual, permitted, and last packed boolean bytes whose bits are:

O_S Block is out of service
INITIALIZE Transition actual mode enables bumpless transfer to target mode
MANUAL Operator or set method can set out.
AUTO Block algorithm sets out.
SUPER Supervisory task (supvSP) sets setpoint.
LINKED Permitted attribute indicates target connected to external source.
INTERLOCK interlock.in sets out when interlock.trigger is true.
alarm is an optional reference to the source of an out Alarm object.
alarmHi.hi is the high alarm limit, a FloatParameter.
alarmHi.lo is the low alarm limit, a FloatParameter.
alarmHi.hys is the alarm hysteresis, a FloatParameter.
   alarmHi.delay is an optional alarm delay in seconds, a FloatParameter
alarmHi.noAck is a boolean, alarm requires no acknowledge if true.
interlock is an optional object used to invoke an override of the current Mode.
   interlock.trigger is a BoolParameter used to invoke INTERLOCK Mode. interlock.reset is a BoolParameter used to return to normal Mode, provided interlock.trigger is false. interlock.in is a FloatParameter that sets out in the INTERLOCK Mode.
device is the Sting name of an I/O device that is the sink of out.
point is an integer used to identify an I/O address within the device.
out is a BoolVariable. It is assigned to out0, the first output.
Methods for Developer
CascBoolOutput (constructor)
   Arguments: none.
      Instantiates out0 and out1.
   Returns: none.
manAutoTarget
   Arguments: none.
      Determines the internal target mode
   Returns: none.
bkCalc
   Arguments: none.
      Set the backword values for out0 and out1.
   Returns: none.
initialize
   Arguments: none.
      Provides bumpless mode transitions.
   Returns: none.
Methods from Super Class
startup
   Arguments: none.
   Called when out-of-service, returns true if ready to run.
   Returns: none.
modeHandle
   Arguments: period is the time since the last update in seconds, a double.
   Provides functionality for active mode.
   Returns: none.
BoolFilter
Overview
   BoolFilter is a part class used in classes such as DeviceControl and Logic. Its method is y=func(x, period). It is initialized with init( ) to y=0 each time the input changes state.

$$s = \frac{d()}{dt}$$

$$y = \frac{1}{1 + fTime \cdot s}$$

$$\text{returns: } \begin{cases} \text{tinput state} & y \geq 0.632 \\ \text{output state} & \text{otherwise} \end{cases}$$

Attributes
fTime is the filter time in seconds, a FloatParameter.
Methods for Developer
BoolFilter(constructor)
    Arguments: none.
    Returns: none.
init
    Arguments: x is the filter input, a double
        Initializes the filter output to its input.
    Returns: none.
func
    Arguments: x is the filter input, a double.
        period is the time since the last update in seconds, a double
    Returns: the filter output, a boolean.
UniDirIntInput
Overview
    UniDirIntInput is a measurement path input interface part that initializes to its in signal.
Attributes
in is a reference to a IntVariable source.
filter is a reference to an optional signal IntFilter.
options is a packed boolean byte with:
I_O in is provided from device and point
device is the String name of an I/O device that is the source of in.
point is an integer used to identify an I/O address within the device.
pv is a IntVariable output representing the processed in value.
Methods for Developer
UniDirIntInput (constructor)
    Arguments: none.
    Returns: none.
startup
    Arguments: none
    Returns: true if ready to run.
CascIntInput
Overview
    CascIntInput is an input interface part that provides initialization and local/remote/supervisory switching.
    Its internal methods are called by its container block.
startup( ) Called when out-of-service, returns true if ready to run.
inHandle( ) Sets back values and status, processes in.
locRemTarget( ) Determines the internal target mode.
devHandle(period) Handles setpoint and deviation.
initialize( ) Provides bumpless mode transitions.
modeHandle( ) Provides functionality for active mode.
Attributes
remSP is an optional reference to the source of the remote setpoint IntVariable.
supvSP is an optional reference to the source of the supervisory setpoint, a IntVariable.
lrs is the setpoint local/remote/supervisory Mode having target, actual, permitted, and last packed boolean bytes whose bits are:
    O_S Block is out of service
    INITIALIZE Transition actual mode enables bumpless transfer to target mode
    LOCAL Operator or set method can set sp.
    REMOTE External block (remSP) sets setpoint.
    SUPER Supervisory task (supvSP) sets setpoint.
    LINKED Permitted attribute indicates target connected to external source.
sp is a IntVariable representing the current setpoint. In the LOCAL mode sp can be set
pv is a IntVariable output representing the processed in value.
Methods for Developer
CascBoolInput(constructor)
    Arguments: none.
    Returns: none.
startup
    Arguments: none.
    Called when out-of-service.
    Returns: true if ready to run.
inHandle
    Arguments: none.
    Sets back values and status.
    Returns: none.
locRemTarget
    Arguments: none.
    Determines the internal target mode.
    Returns: none.
devHandl
    Arguments: none.
    Handles setpoint.
    Returns: none
initialize
    Arguments: none.
    Provides bumpless mode transitions
    Returns: none.
modeHandle
    Arguments: none.
    Provides functionality for active mode.
    Returns: none.
UniDirIntOutput
Overview
    UniDirIntOutput is an output interface part that provides auto/manual/supervisory switching.
    Its methods are called by its container block.
startup( ) Called when out-of-service, returns true if ready to run.
manAutoTarget( ) Determines the internal target mode.
modeHandle(period) Provides functionality for active mode.
Attributes
supvOut is an optional reference to the source of the supervisory output, a IntVariable.
mas is the output manual-auto-supervisory Mode having target, actual, permitted, and last packed boolean bytes whose bits are:
    O_S Block is out of service
    INITIALIZE Transition actual mode enables bumpless transfer to target mode
    MANUAL Operator or set method can set out.
    AUTO Block algorithm sets out.
    SUPER Supervisory task (supvSP) sets setpoint.
    LINKED Permitted attribute indicates target connected to external source.

INTERLOCK interlock.in sets out when interlock.trigger is true.

options is a packed boolean byte with bits assigned as:
MAN_START Block returns from out-of-service in MANUAL mode.
ALARM_BLURRED Block alarm triggered by BLURRED signal status.

I_O out is provided to device and point.

alarm is an optional reference to the source of an out Alarm object.
alarmHi.hi is the high alarm limit, a FloatParameter.
alarmHi.lo is the low alarm limit, a FloatParameter.
alarmHi.hys is the alarm hysteresis, a FloatParameter.
alarmHi.delay is an optional alarm delay in seconds, a FloatParameter
alarmHi.noAck is a boolean, alarm requires no acknowledge if true.

interlock is an optional object used to invoke an override of the current Mode.
interlock.trigger is a BoolParameter used to invoke INTERLOCK Mode. interlock.reset is a BoolParameter used to return to normal Mode, provided interlock.trigger is false. interlock.in is a FloatParameter that sets out in the INTERLOCK Mode.

device is the String name of an I/O device that is the sink of out.

point is an integer used to identify an i/o address within the device.

out is a IntVariable representing the current output. In the MANUAL mode out can be set.

Methods for Developer

UniDirBoolOutput (constructor)
Arguments: none.
Instantiates out.
Returns: none.

startup
Arguments: none.
Called when out-of-service, returns true if ready to run.
Returns: none.

manAutoTarget
Arguments: none.
Determines the internal target mode
Returns: none.

modeHandle
Arguments: period is the time since the last update in seconds, a double.
Provides functionality for active mode.
Returns: none.

CascIntOutput

Overview

CascIntOutput is an output interface part that provides initialization and auto/manual/supervisory switching.
Its methods are called by its container block.
startup( ) Called when out-of-service, returns true if ready to run.
manAutoTarget( ) Determines the internal target mode.
bkCalc( ) Set the backword values.
initialize( ) Provides bumpless mode transitions.
modeHandle(period) Provides functionality for active mode.

Attributes point is an integer used to identify address of out.

Attributes from Super Class supvOut is an optional reference to the source of the supervisory output, a IntVariable.

mas is the output manual-auto-supervisory Mode having target, actual, permitted, and last packed boolean bytes whose bits are:

O_S Block is out of service
INITIALIZE Transition actual mode enables bumpless transfer to target mode
MANUAL Operator or set method can set out.
AUTO Block algorithm sets out.
SUPER Supervisory task (supvSP) sets setpoint.
LINKED Permitted attribute indicates target connected to external source.
INTERLOCK.interlock in sets out when interlock.trigger is true.

alarm is an optional reference to the source of an out Alarm object.
alarmDev.hi is the high alarm limit, a FloatParameter.
alarmDev.lo is the low alarm limit, a FloatParameter.
alarmDev.hys is the alarm hysteresis, a FloatParameter.
alarmDev.delay is an optional alarm delay in seconds, a FloatParameter
alarmDev.noAck is a boolean, alarm requires no acknowledge if true.

interlock is an optional object used to invoke an override of the current Mode.
interlock.trigger is a BoolParameter used to invoke INTERLOCK Mode. interlock.reset is a BoolParameter used to return to normal Mode, provided interlock.trigger is false. interlock.in is a FloatParameter that sets out in the INTERLOCK Mode.

device is the String name of an I/O device that is the sink of out.

point is an integer used to identify an I/O address within the device.

out is a IntVariable representing the current output. In the MANUAL mode out can be set.

Methods for Developer

CascBoolOutput (constructor)
Arguments: none.
Instantiates out.
Returns: none.

manAutoTarget
Arguments: none.
Determines the internal target mode
Returns: none.

bkCalc
Arguments: none.
Set the backword values for out.
Returns: none.

initialize
Arguments: none.
Provides bumpless mode transitions.
Returns: none.

Methods from Super Class startup
Arguments: none.
Called when out-of-service, returns true if ready to run.
Returns: none.

modeHandle
Arguments: period is the time since the last update in seconds, a double.
Provides functionality for active mode.
Returns: none.

IntFilter

Overview

IntFilter is a part class used in the DiscreteInput class. Its method is y=func(x,period). It is initialized with init(to y=1 each time the input changes state.

$$s = \frac{d()}{dt}$$

$$y = \frac{1}{1 + fTime \cdot s}$$

$$\text{returns:} \begin{cases} \text{input state} & y \geq 0.632 \\ \text{output state} & \text{otherwise} \end{cases}$$

Attributes
fTime is the filter time in seconds, a FloatParameter.
Methods for Developer
BoolFilter(constructor)
    Arguments: none.
    Returns: none.
init
    Arguments: x is the filter input, a double
        Initializes the filter output to equal its input.
    Returns: none.
func
    Arguments: x is the filter input, a double.
        period is the time since the last update in seconds, a double
    Returns: the filter output, a boolean.
PIDParameters
Overview
    PIDParameters is an optional part class containing tuning parameters used in the AdvancedPID class.
Attributes
PGain is the nondimensional prpoortional gain, a FloatParameter.
integral is the integral time in seconds, a FloatParameter.
derivative is the derivative time in seconds, a FloatParameter.
relGain is the nondimensional relative gain on setpoint, a FloatParameter.
dtime is the optional deadtime in seconds, a FloatParameter
ftime is the measurement filter time in seconds, a FloatParameter.
bypass is an optional BoolParameter, if true the controller is bypassed.
zone is an optional object from the Zone class, used to position a region of low gain where the control error is small.
sampleReady is a BoolParameter indicating that a new measurement value is available. Its default value is true.
options is a packed-boolean byte with the following assignments:

| | |
|---|---|
| IFS_IF_BAD_RSP | initiates failsafe if remoteSP is BLIND |
| IFS_IF_BAD_IN | initiates failsafe if in is BLIND |
| INCOPT | increasing in causes out to increase. |
| PD | no controller integral action. |
| I_ONLY | only controller integral action. |
| PASS_RANGE | the range is passed to the setpoint. |

Methods for Developer
PIDParameters (constructor)
    Arguments: none.
        Instantiates pGain, integral, derivative, and relGain.
    Returns: none.
Deadtime
Overview
    Deadtime is a part class used in the AdvancedPID and ProcessSim classes. Its method y=func(x,period) implements a bucket-brigade delay line. The number of buckets is specified as the constructor argument.
Attributes
dt is the deadtime in seconds, a FloatParameter.
Methods for Developer
Deadtime( ) (constructor)
    Arguments: none.
        Instantiates dt, uses 10 buckets.
    Returns: none.
Deadtime (constructor)
    Arguments: numBuckets is the number of buckets, an int.
        Instantiates dt.
    Returns: none.
hold
    Arguments: none
    Returns: none.
init
    Arguments: x
        Initializes the delayed signal to equal input x.
    Returns: none.
func
    Arguments: x
        period is the time since the last update in seconds, a double.
    Returns: the value of the delayed signal, a double.
Zone
Overview
    Zone is a part class used in the AdvancedPID class. It is a three segment characterizer used as a nonlinear noise filter and in pH control. Its method is y=func(x).
Attributes
hi is the upper control error breakpoint in percent of in span, a FloatParameter.
lo is the lower control error breakpoint in percent of in span, a FloatParameter.
Methods for Developer
Zone (constructor)
    Arguments: none.
        Instantiates hi, lo, and k.
    Returns: none.
func
    Arguments: x is the input signal, a double.
    Returns: the Zone output signal, a double.
FailSafe
Overview
    FailSafe is a part class used by AnalogOutput and Logic classes.
Attributes
fsTime fsTimeis a FloatParameter wait time in seconds before failsafe is activated.
var var is the FloatParameter that sets the valve target when failsafe is active.
bool is the value of a BoolParameter that sets out when failsafe is active.
Methods for Developer
Failsafe (constructor)
    Arguments: none.
    Returns: none.
LinearFlow
Overview
    LinearFlow is an optional part used to cause the out Variable of an AnalogOutput block to be a valve position target that will make valve flow linear with the AnalogOutput setpoint. Its methods
    are x=forw(v) and v=back(x). The parameter 0<=beta<=1 is defined as:

Valve pressures at max opening: $p_1$, $p_2$
Supply pressures: $p_s$, $p_a$ $$\text{Liquid:} \quad \beta = \frac{p_1 - p_2}{p_s - p_a}$$

$$\text{Gas:} \quad \beta = \frac{p_1^2 - p_2^2}{p_s^2 - p_a^2}$$

$0<=v<=1$ is normalized flow
$0<=y<=1$ is normalized valve flow area
$0<=x<=1$ is normalized valve stem position.
Maximum liquid power is delivered to the load when beta is ⅓ and v=1.
Then the ratio of max-to-min slopes dv/dy is 5.2. The pressure drop correction is:

$$y^2 = \frac{\beta \cdot v^2}{1 - v^2 \cdot (1 - \beta)}$$

x=func(y,true)
Attributes
beta is the pressure drop ratio, a FloatParameter.
turndown is (max flow area)/(min flow area) for an equql-percentage valve, an optional FloatParameter.
charac is an optional object of the Characterizer class providing normalized stroke vs. normalized area in the forward direction.
Methods for Developer
LinearFlow (constructor)
  Arguments: none.
  Returns: none.
forw
  Arguments: the normalized target flow, a double.
  Returns: the normalized target valve position, a double.
back
  Arguments: the normalized actual valve position, a double.
  Returns: the normalized back-calculated flow, a double.
InfoBuffer
Overview
  InfoBuffer is a part class used by the InfoCollect class. Its method func implements double buffering with a bucket-brigade delay line for each parameter stored. The number of buckets (time steps) is specified as a constructor argument.
Attributes
xTime[buf][step] is an array of time stamp in milliseconds since Jan. 1, 1970, a long.
xFloat[buf][step][nFP] is an optional array of FloatParameter value floats.
xFStatus[buf][step][nBP] is an optional array of FloatParameter status bytes.
xBool[buf][step][nBP] is an optional array of BoolParameter values.
xBStatus[buf][step][nBP] is an optional array of BoolParameter status bytes.
xMode[buf][step][nM] is an optional array of Mode actual bytes.
xAlarm[buf][step][nAl] is an optional array of AlarmSum shorts.
Methods for Developer
InfoBuffer(constructor)
  Arguments: x is the time stamp, a long.
    NumSteps is the length of the buffer, an int.
  Returns: none.
InfoBuffer(constructor)
  Arguments: x is an array of FloatParameters.
    nP is the number of FloatParameters
    NumSteps is the length of the buffer, an int.
  Returns: none.
InfoBuffer(constructor)
  Arguments: x is an array of BoolParameters.
    nP is the number of BoolParameters
    NumSteps is the length of the buffer, an int.
  Returns: none.
InfoBuffer(constructor)
  Arguments: x is an array of Modes.
    nP is the number of Modes.
    NumSteps is the length of the buffer, an int.
  Returns: none.
InfoBuffer(constructor)
  Arguments: x is an array of bytes.
    nP is the number of bytes
    NumSteps is the length of the buffer, an int.
  Returns: none.
func
  Arguments: buf is number of the buffer, an int
    step is the position in the buffer, an int.
    x is the time stamp, a long.
  Returns: none.
func
  Arguments: buf is number of the buffer, an int.
    step is the position in the buffer, an int.
    x is an array of FloatParameters.
  Returns: none.
func
  Arguments: buf is number of the buffer, an int.
    step is the position in the buffer, an int.
    x is an array of BoolParameters.
  Returns: none.
func
  Arguments: buf is number of the buffer, an int.
    step is the position in the buffer, an int.
    x is an array of Modes.
  Returns: none.
func
  Arguments: buf is number of the buffer, an int.
    step is the position in the buffer, an int.
    x is an array of shorts.
  Returns: none.
TimeCount
Overview
  TimeCount is a part class that performs a timer function. Method func returns true when time reaches pre-specified time value.
Attributes
tTime is the time in seconds, a FloatParameter.
timeElapsed is the time elapsed since timer starts, a double.
statusFlag indicates whether timer is running or stopped.
Methods for Developer
TimeCount (constructor)
  Arguments: countUp, a boolean. Timer counts up from 0 if countUp is true; counts down from tTime otherwise.
    Instantiates tTime, a FloatParameter.
  Returns: none.
init
  Arguments: none.
    Initializes the timer. It should be called before timer starts.
  Returns: none.
func
  Arguments: period is the time since the last update in seconds, a double.

Updates the timer.
Returns: none.

stop
Arguments: none.
Stops the timer. It should be called when the timer is going to stop.
Returns: none.

getTime
Arguments: none.
Gets the time elapsed since timer starts.
Returns: elapsed time, a double.

Interlock
Overview
Interlock is an optional part class used to invoke an override of the current out Variable.

Attributes
interlock.trigger is a BoolParameter used to invoke INTERLOCK Mode.
interlock.reset is a BoolParameter used to return to normal Mode.
interlock.in is a FloatParameter or BoolParameter that sets out in the INTERLOCK Mode.

Methods for Developer
None.

Discussion of Parts Classes
Parts are optional or mandatory parts of blocks, providing optional functionality or functionality shared by many blocks. Generally, each block has one or more input parts, a body, and one or more output parts. Exceptions are InfoCollect, Event, and IOInterface blocks.

input (-Input) and output (-Output) parts may be of the unidirectional (UniDir-) or cascade (Casc-) types and may be for float (-Float-), boolean (-Bool-), or short (16 bit) integer (-Int-) value data types.

Unidirectional inputs and outputs are used in blocks, such as AnalogInput and ProcessSim, located in a measurement signal path. Dynamic elements in these blocks are initialized to steady-state corresponding to the current in value.

A unidirectional or cascade output part provides manual, auto, supervisory mode switching to select the source of the out variable. Before the mode switch the auto signal may be modified by an additive or multiplicative feedforward (unidirectional) source. After the mode switch the output is limited (optional in manual) and may be alarmed (optional in manual). In a cascade output part the out limits are each bidirectional variables that can be connected from a bidirectional out variable of another AdvancedPID block to implement a constraint or override. Each output part has an interlock input that when triggered overrides the out variable from other sources.

A cascade input part provides local/remote/supervisory mode switching to select the setpoint sp (bidirectional) source. The local setpoint may be ramped, the setpoint limited and modified by an additive or multiplicative feedforward (unidirectional) source. If the cascade part has an in (unidirectional measurement) signal, both it and the signal in the setpoint path may be linearized with matched functions before being passed to the block body. Then the signal in the measurement path is filtered (quadratic Butterworth).The cascade input part has two unidirectional output variables, pv and deviation. When the block has an in, as in an AdvancedPID block, it is passed to the pv. When it doesn't, as in an AnalogOutput block, pv is back calculated from a signal passed from the body. In either case deviation, which may be alarmed, is the difference between pv and sp.

Signals Classes
This section describes the signal classes, which are contained in the Signals package. Objects from Signals classes contain the information communicated between linked blocks or inserted into blocks as constants. These classes also provide methods to be used by users and tasks for setting and getting values and for linking and unlinking parameters and variables. The Signals package also contains an interface class for shared constants.

Constants
Overview
Constants is an interface containing state, status, mode, and option assignments shared by all blocks and their parts.

Attributes
Manual, auto, supervisory (mas) output modes are:
O_S Block is out of service.
INITIALIZE Transition actual mode enables bumpless transfer to target mode.
MANUAL Operator or set method can set output.
AUTO Block algorithm sets output.
SUPER Supervisory task sets output.
LINKED Permitted attribute indicating Mode target is connected to external source.
INTERLOCK Interlock sets output, actual mode is enabled by trigger, disabled by reset.

Local, remote, supervisory (lrs) setpoint modes are:
O_S Block is out of service
INITIALIZE Transition actual mode enables bumpless transfer to target mode
LOCAL Operator or set method can set setpoint.
REMOTE External block sets setpoint.
SUPER Supervisory task sets setpoint.
LINKED Permitted attribute indicates mode target connected to external source.

Signal quality status has the following (SEVA) ranked values:
CLEAR Signal is valid, on-line, and within spec.
CLOSE_CAS status is used to close cascade connection.
INIT status is used to open cascade connection.
BLURRED Signal is degraded, uncertainty is increased.
DAZZLED Signal is temporarily invalid, replaced by an estimate.
BLIND Signal is permanently invalid, replaced by an estimate.
FAILSAFEstatus indicates valve is forced to failsafe position.
OFFLINE Source is out of service.

Device maintenance status has the following (SEVA) ranked values:
NOMINAL Maintenance is not needed.
ON_TEST Device is in test or calibration mode.
LOW_PRIORITY Minor fault has been detected, quality status is BLURRED.
HIGH_PRIORITY Major fault has been detected, quality status is BLIND.
CRITICAL Critical fault detected, jeopardizing safety.
UNCHECKED maintenance reporting is not supported.

Limit indication and linking and setting permissions are contained in a packed Boolean status:
LIM_LO Signal is at its low limit.
LIM_HI Signal is at its high limit.
CONSTANT Signal is manually set.
CASCADE Signal is cascade connected.
UNSETABLE Signal can not be set. It is linked and not MANUAL or LOCAL LINKED Signal is already linked, it cannot be connected to two sources.

LINK_NOSET Signal can not be set or linked.

NON_NEG Signal is prevented from having a negative value.

NOT_MEDIAN Signal is determined not to be the median signal.

Input part options include:

SP_PV_TRK_MAN Setpoint tracks PV when output is manually set.

SP_DN_UNCER Setpoint is decreased by the uncertainty.

SP_UP_UNCER Setpoint is increased by the uncertainty.

MULT_FF Feedforward is multiplicative, else it is additive.

I_O in is provided from device and point

Output part options include:

LIM_MAN Limits are applied to MANUAL output.

ALM_MAN Alarming is applied to a MANUAL output.
   MAN_START Block returns from out-of-service in MANUAL mode.

MULT_FF Feedforward is multiplicative, else it is additive.

ALARM_BLURRED Block alarm triggered by BLURRED signal status.

I_O out is provided to device and point.

Feedback tuner states are;

PRETUNE Pretune is active. Controller must be in MANUAL.

OFF Tuner is off or not connected.
   HOLD Selftune is suspended but stored tuning sets are used.
   QUIET The loop is undisturbed, no error-peak search is in progress.

| | |
|---|---|
| LOCATE_1 | Error peak 1 is sought. |
| LOCATE_2 | Error peak 2 is sought. |
| LOCATE_3 | Error peak 3 is sought. |
| LOCATE_4 | Error peak 4 is sought. |

WAIT Tuning update is waiting for an output peak search to complete.
   SETTLE Selftune is testing for error settling before returning to QUIET.

The feedforward tuner states are:

OFF Tuner is off or not connected.
   HOLD Feedforward tuning is suspended and stored tuning sets are used.
   QUIET The loop is undisturbed, no moment integration is in progress.

UNMEAS An error upset is detected before a load upset.

MEAS A load upset is detected while QUIET.
   SIGNIF When MEAS, the control error exceeds the threshold CNFIRM When SIGNIF, the feedback tuner finds peak 1.

WAIT There is no wait time before compensation update.
   SETTLE The error is tested for settling before returning to QUIET.

The alarmSum states are:

LL_ACT Low-tow alarm is active.

LO_ACT Low alarm is active.

HI_ACT High-high alarm is active.

HH_ACT High alarm is active.

B_ACT Boolean alarm is active.

BLK_ACT Block alarm is active.

LL_UNACK Low-low alarm is unacknowledged.

LO_UNACK Low alarm is unacknowledged.

HI_UNACK High-high alarm is unacknowledged.
   HH_UNACK High alarm is unacknowledged.

B_UNACK Boolean alarm is unacknowledged.

BLK_UNACK Block alarm is unacknowledged.

UNACK Set to false to acknowledge all of these alarms.

Mode

Overview

The cascade input parts use the Mode class for local-remote-supervisory (lrs) switching. The output parts use the Mode class for manual-auto-supervisory (mas) switching.

Attributes

The Mode class has four byte attributes whose bit assignments are assigned by the Constants interface:

target requested mode; one bit is set, default O_S bit set.

actual currently active mode; one bit is set, default O_S bit set.

permitted allowed modes; several bits may be set, default all bits are set.

last the last mode both requested and active; one bit is set, default O_S bit set.

Methods getMode
   Arguments: none.
   Returns: active mode.

setMode
   Arguments: desired mode.
   If the mode is not linked
      target mode is set to desired mode.
      Returns: true
   Else:
      target mode is not changed.
      Returns: false linkTo Called from source
   Arguments: sink reference.
   If the sink is not linked
      Source and sink are linked.
      Returns: source reference
   Else:
      Returns: unchanged sink reference unlink Called from source
   Arguments: new sink reference.
      Source and sink are unlinked
      Returns: instantiates new sink object with existing target, actual, permitted (not linked), and last.

Parameter

Overview

Parameter is an abstract class providing features common to FloatParameter, BoolParameter, and IntParameter.

Attributes status (SEVA ranked) signal quality status, enumerated byte.

limStatus Limit indication and link and set permissions, packed boolean byte.

source source is a String name.

time timestamp, a long integer msec. since 1970

Methods
getStatus
> Arguments: none.
> Returns: signal quality status.

FloatParameter
Overview
A block's or part's continuous tuning parameters are instances of the FloatParameter class.

It inherits from the Parameter class. The FloatParameter contains floating-point value and two status bytes. The value of an unlinked parameter may be set with the set Value method. A source for a linked parameter may be the forw or back part source block's out variable. It is linked (connected) by its linkTo method with a reference for the sink block's parameter.

Attributes
value floating point signal value.

Attributes from Super Class
status (SEVA ranked) signal quality status, enumerated byte.
limStatus Limit indication and link and set permissions, packed boolean byte.
source source is a String name.
time timestamp, a long integer msec. since 1970

Methods
linkTo Called from source
> Arguments: sink reference, source name.
> If the sink is not linked
>> Source and sink are linked.
>> The source name is assigned
>> Returns: source reference
> Else:
>> Returns: unchanged sink reference unlink Called from source
> Arguments: sink reference.
>> Source and sink are unlinked
>> Returns: instantiates new sink object with existing value and clear status.

getValue
> Arguments: none.
> Returns: value.

setValue
> Arguments: desired value.
> If the mode is not unsetable:
>> value is set to desired value.
>> Returns: true
> Else:
>> value is not changed.
>> Returns: false Methods from Super Class
getStatus
> Arguments: none.
> Returns: signal quality status.

FloatRange
Overview
The FloatRange class contains the high and low range limits and their units. A range object is contained in a FloatVariable. Range information is entered at the signal source and propagated downstream with a unidirectional connection and upstream with a bidirectional (cascade) connection.

Attributes
hi high range limit in engineering units, float, default is 100.
low range limit in engineering units, float, default 0.
units engineering units, String, default %.
delta is a communication threshold, a float value in engineering units, default 0.

Variable
Overview
Variable is an abstract class providing features common to Float Variable, Bool Variable, and Int Variable.

Attributes
alarmSum active and unacknowledged alarms, packed Boolean short.
maintenance SEVA ranked maintenance status, enumerated byte.
source source is a String name.

Methods
ack
> Arguments: none.
> All alarms are acknowledged.
> Returns: none.

getAlarmHI
> Arguments: none.
> If high alarm is active:
>> Returns: true.
> Else
>> Returns false.

getAlarmHH
> Arguments: none.
> If high-high alarm is active:
>> Returns: true.
> Else
>> Returns false.

getAlarmLO
> Arguments: none.
> If low alarm is active:
>> Returns: true.
> Else
>> Returns false getAlarmLL
> Arguments: none.
> If low-low alarm is active:
>> Returns: true.
> Else
>> Returns false.

getAlarmBLK
> Arguments: none.
> If block alarm is active:
>> Returns: true.
> Else
>> Returns false.

getAlarmB
> Arguments: none.
> If boolean alarm is active:
>> Returns: true.
> Else
>> Returns false.

FloatVariable
Overview
A block output or input signal is an instance of the FloatVariable class. It inherits from Variable and is usually contained in the source block's output part and linked (connected) by its linkTo method with a reference for the sink block's variable. A cascade connection, such as primary-out to secondary-remoteSP, is bidirectional. A FloatParameter (forw) is set by the primary. Another Float- Parameter (back) is set by the.secondary. Both parameters and other entities are contained in the FloatVariable class. A connection from an AnalogInput's out to an AdvancedPID's in is uni-directional. It's FloatVariable has a forw parameter but no back parameter. The FloatVariable also conveys uncertainty, range, and maintenance information, backwards for a cascade connection and forwards for a uni-directional connection. Alarm summary information is conveyed forwards.

Attributes forw forward propagated FloatParameter, value (eu), status, limStatus.

back backward propagated FloatParameter, value (eu), status, limStatus.

range high, low range limits in engineering units (eu), FloatRange class.

uncertainty SEVA uncertainty, float value (eu).

Attributes from Super Class alarmSum active and unacknowledged alarms, packed Boolean short.

maintenance SEVA ranked maintenance status, enumerated byte.

source source is a String name.

Methods linkTo Called from forw source
   Arguments: forw sink reference, source name.
   If the forw sink is not linked
     Source and sink are linked.
       The source name is assigned.
       Returns: forw source reference
   Else:
     Returns: unchanged forw sink reference Unlink Called from forw source
   Arguments: forw sink reference.
       CASCADE or 0.
     Source and sink are unlinked
   Returns: instantiates new sink object.

Methods from Super Class ack
   Arguments: none.
   All alarms are acknowledged.
   Returns: none.

getAlarmHI
   Arguments: none.
   If high alarm is active:
     Returns: true.
   Else
     Returns false.

getAlarmHH
   Arguments: none.
   If high-high alarm is active:
     Returns: true.
   Else
     Returns false.

getAlarmLO
   Arguments: none.
   If low alarm is active:
     Returns: true.
   Else
     Returns false.

getAlarmLL
   Arguments: none.
   If low-low alarm is active:
     Returns: true.
   Else
     Returns false.

getAlarmBLK
   Arguments: none.
   If block alarm is active:
     Returns: true.
   Else
     Returns false.

BoolParameter

Overview

A block's or part's binary parameters are instances of the BoolParameter class. It inherits from the Parameter class. The BoolParameter contains boolean value and two status bytes. The value of an unlinked parameter may be set with the setValue method. A source for a linked parameter may be the forw or back part source block's out variable. It is linked (connected) by its linkTo method with a reference for the sink block's parameter.

Attributes value boolean signal value.

Attributes from Super Class status (SEVA ranked) signal quality status, enumerated byte.

limStatus limit indication and link and set permissions, packed Boolean byte.

source source is a String name.

time timestamp, a long integer msec. since 1970

Methods linkTo Called from source
   Arguments: sink reference, source name.
   If the sink is not linked.
     Source and sink are linked.
       The source name is assigned
     Returns: source reference.
   Else:
     Returns: unchanged sink reference.

unlink Called from source
   Arguments: sink reference.
     Source and sink are unlinked
     Returns: instantiates new sink object with existing value and clear status.

getValue
   Arguments: none.
   Returns: value.

setValue
   Arguments: desired value.
   If the parameter is not unsetable:
     value is set to desired value.
     Returns: true
   Else:
     value is not changed.
     Returns: false Methods from Super Class getStatus
   Arguments: none.
   Returns: signal quality status.

BooleanVariable

Overview

A block's binary output or input signal is an instance of the BoolVariable class. It inherits from Variable and is usually contained in the source blocs output part and linked (connected) by its linkTo method with a reference for the sink block's variable. A cascade connection, such as primary-out to secondary-remoteSP, is bidirectional. A BoolParameter (forw) is set by the primary. Another BoolParameter (back) is set by the secondary. Both parameters and other entities are contained in the BoolVariable class. The BoolVariable also conveys the maintenance information, backwards for a cascade connection and forwards for a unidirectional connection. Alarm summary information is conveyed forwards.
Attributes
forw forward propagated BoolParameter, value (eu), status, limStatus.
back backward propagated BoolParameter, value (eu), status, limStatus.
Attributes from Super Class
alarmSum active and unacknowledged alarms, packed boolean short.
maintenance SEVA ranked maintenance status, enumerated byte.
source source is a String name.
Methods
linkTo Called from forw source
   Arguments: forw sink reference, source name.
   If the forw sink is not linked
     Source and sink are linked.
       The source name is assigned.
     Returns: forw source reference
   Else:
     Returns: unchanged forw sink reference
unlink Called from forw source
   Arguments: forw sink reference
     CASCADE or 0
     Source and sink are unlinked
   Returns: instantiates new sink object.
Methods from Super Class
ack
   Arguments: none.
   The boolean alarm is acknowledged.
   Returns: none.
getAlarm
   Arguments: none.
   If boolean alarm is active:
     Returns: true.
   Else
     Returns false.
getAlarmBLK
   Arguments: none.
   If block alarm is active:
     Returns: true.
   Else
     Returns false.
IntParameter
Overview
   A block's or part's integer parameters are instances of the IntParameter class. It inherits from the Parameter class. The IntParameter contains integer value and two status bytes. The value of an unlinked parameter may be set with the setValue method. A source for a linked parameter may be the forw or back part source block's out variable. It is linked (connected) by its linkTo method with a reference for the sink block's parameter.
Attributes
value integer signal value.
Attributes from Super Class
status (SEVA ranked) signal quality status, enumerated byte.
limStatus limit indication and link and set permissions, packed Boolean byte.
source source is a String name.
time timestamp, a long integer msec. since 1970
Methods
linkTo Called from source
   Arguments: sink reference, source name.
   If the sink is not linked
     Source and sink are linked.
       The source name is assigned.
     Returns: source reference.
   Else:
     Returns: unchanged sink reference.
unlink Called from source
   Arguments: sink reference.
     Source and sink are unlinked
   Returns: new sink reference with existing value and clear status.
getValue
   Arguments: none.
   Returns: value.
setValue
   Arguments: desired value.
   If the parameter is not unsetable:
     value is set to desired value.
     Returns: true
   Else:
     value is not changed.
     Returns: false
Methods from Super Class
getStatus
   Arguments: none.
   Returns: signal quality status.
IntRange
Overview
   The IntRange class contains the high and low range limits. A range object is contained in an IntVariable. Range information is entered at the signal source and propagated downstream with a unidirectional connection and upstream with a bidirectional (cascade) connection.
Attributes
hi high range limit in integer, default is 1.
lo low range limit in integer, default is 0.
IntVariable
Overview
   A block's integer output or input signal is an instance of the IntVariable class. It inherits from Variable and is usually contained in the source block's output part and linked (connected) by its linkTo method with a reference for the sink block's variable. A cascade connection, such as primary-out to secondary-remoteSP, is bidirectional. An IntParameter (forw) is set by the primary. Another IntParameter (back) is set by the secondary. Both parameters and other entities are contained in the IntVariable class. The IntVariable also conveys range, and maintenance information, backwards for a cascade connection and forwards for a unidirectional connection. Alarm summary information is conveyed forwards.
Attributes
forw forward propagated BoolParameter, value (eu), status, limStatus.
back backward propagated BoolParameter, value (eu), status, limStatus.
range high, low range limits in engineering units (eu), IntRange class.

Attributes from Super Class
alarmSum active and unacknowledged alarms, packed Boolean short.
maintenance SEVA ranked maintenance status, enumerated byte.
source source is a String name.
Methods
linkTo Called from forw source
    Arguments: forw sink reference, source name.
    If the forw sink is not linked
        Source and sink are linked.
            The source name is assigned.
            Returns: forw source reference
        Else:
            Returns: unchanged forw sink reference
unlink Called from forw source
    Arguments: forw sink reference, CASCADE or 0
        Source and sink are unlinked
    Returns: instantiates new sink object.
Methods from Super Class
ack
    Arguments: none.
    All alarms are acknowledged.
    Returns: none.
getAlarmHI
    Arguments: none.
    If high alarm is active:
        Returns: true.
    Else
        Returns false.
getAlarmHH
    Arguments: none.
    If high-high alarm is active:
            Returns: true.
    Else
        Returns false.
getAlarmLO
    Arguments: none.
    If low alarm is active:
        Returns: true.
    Else
        Returns false.
getAlarmLL
    Arguments: none.
    If low-low alarm is active:
        Returns: true.
    Else
        Returns false.
getAlarmBLK
    Arguments: none.
    If block alarm is active:
        Returns: true.
    Else
        Returns false.
Discussion of Signals Classes Interblock connections are performed with Variable and Parameter objects contained in the upstream block and linked by reference to the downstream block. When the upstream block and downstream block are in different stations, it is necessary to have a periodically updated proxy Variable or Parameter in the station with the downstream block. Fixed constants shared by potentially all blocks and parts are made available in the Constants interface implemented or inherited by all PCOs. All PCOs also inherit or implement the Serializable interface. Composites and blocks also inherit or implement the Runnable interface.

External Interfaces for Signals Classes

Output signals are objects of a float, boolean, or int Variable class contained in the upstream block. An input Variable of one block may be linked by reference to an output Variable contained in another block in the same station. When the output variable is contained in a block from a different station it is necessary to store a periodically updated copy of the output Variable in the same station as the downstream block so that the input may be linked by reference to the copy (proxy). A bidirectional Variable involved in a cascade connection requires that certain of its Parameters and attributes (forw and alarmSum) be communicated in the downstream direction, while others (back and range) are communicated in the upstream direction.

Parameters of one block may be linked by reference to a Parameter component of an output Variable in another block. Similarly an updated proxy Parameter is required in the downstream block's station if the upstream block is in a different station.

A PCO Temperature Cascade Control Loop with a Simulated Process

Figure 16:
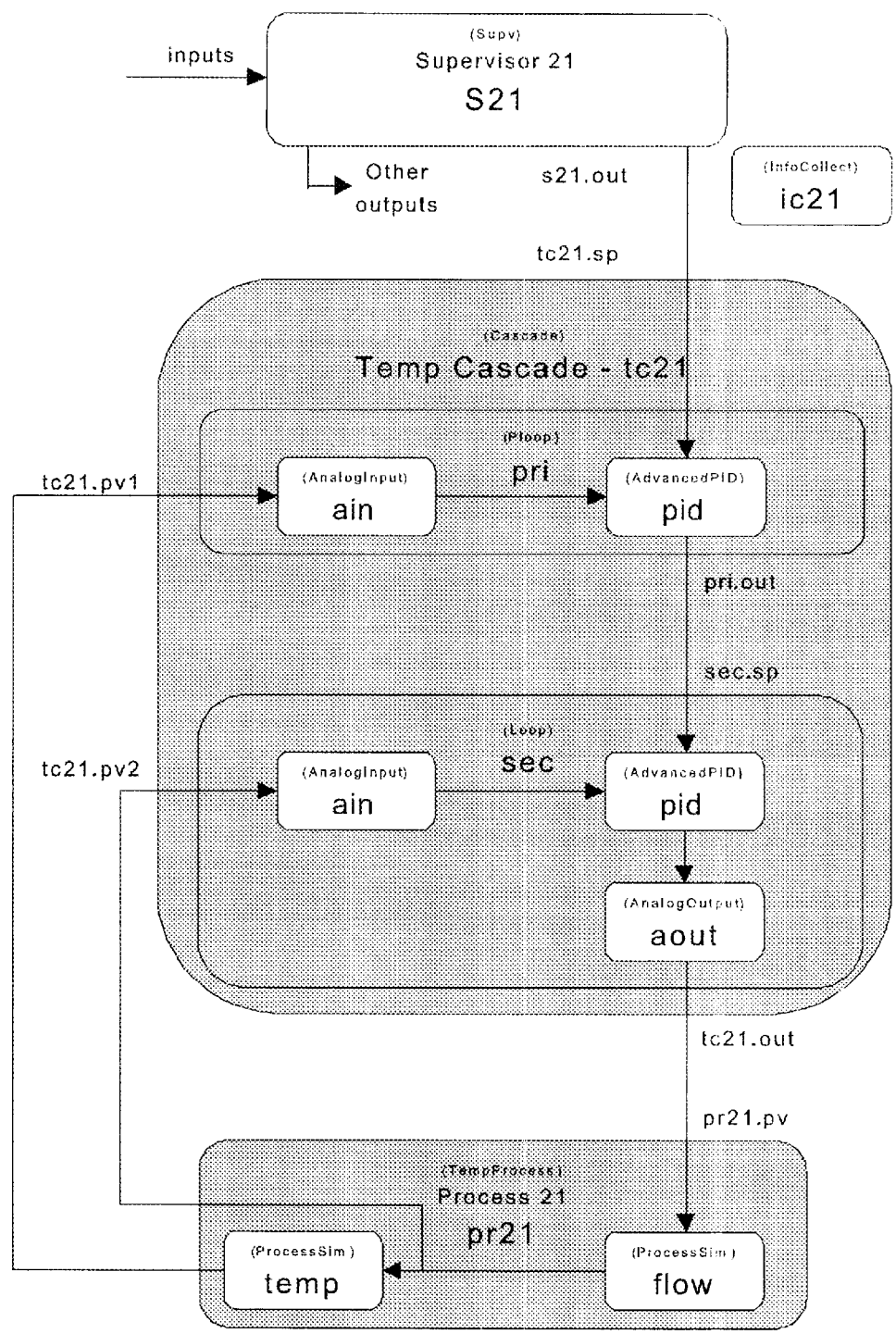
FIG. 16 depicts TempCasc control and process objects and details in a control system according to the invention.

A further appreciation of the operation of a control system 10 (FIG. 1) and particularly, for example, of a controller 36 (or other control device) that utilizes process control objects (PCOs) of the type described above may be attained by reference to the Java code listing that follows. This is an application of a PCO that implements a temperature cascade control loop on the device (e.g., controller 36) on which it resides. A graphical depiction of the operation of that control loop is presented in FIG. 16, above.

Referring to the listing, in lines 3–7 declare and instantiate the composites and blocks that make up the temperature cascade control loop PCO, to wit, supervisor (Supv) block the cascase composite (Cascade), the temperature process composite (TempProcess), the information collection block (InfoCollect), and the object (ObjList) that enumerates all objects that are to be executed by the control system 10. The latter object is referred to as the "run" list. In lines 9–10, the code declares alias names for parameters internal to the TempCasc PCO object itself.

Line 13 begins the configuration method, which is provided here merely as an example of how a previously-instantiated PCO (e.g., the TempCasc PCO) can be customized for use in a particular control system. Those skilled in the art will, of course, appreciate that configuration can be performed other than via "hard coding" as shown in lines 13, et seq. Typically, such configuration is performed via a graphical user interface.

In line 16, the previously instantiated user block object (s21) is added to the run list. No additional configuration is shown here with respect thereto.

In lines 19–33, the cascade composite object (tc21) is configured and its input variables connected, by reference, to the outputs of other objects utilized in the system 10. Particularly, in lines 19–20, the analog input of the primary control loop in temperature cascade object tc21 is connected to the temperature measurement output of the simulated process object (pr21). In lines 21–22, a bidirectional connection is established between the PID supervisory setpoint of the composite object tc21 and the output of the supervisory block s21. In lines 23–24, a unidirectional connection is established between the flow measurement output of the simulated process object pr21 and the analog input of the secondary control loop in the temperature cascade object tc21.

In step 25, the configuration method of the temperature cascade control object tc21 is invoked. This effects initialization of the parameters and connections for that object tc21.

In step 26–27, an optional alarm part of object tc21's primary loop analog input is instantiated. The default alarm limits are set in accord with the output range of the analog input. In steps 28–29, the high and low alarm limits are set to 75 and 30, respectively.

In step 30, the input mode of the object tc21's primary PID is set to "supervisory," indicating that it will take its setpoint from supervisory object s21. Those skilled in the art will, of course, appreciate that the supervisory setpoint could be set by other external sources.

In steps 31–32, the tuning settings previously defined in user block s21 are inserted into the primary and secondary loops of the PID controllers of the composite tc21. In step 33, the block period of the analog input block of the secondary loop is set.

In step 34, the composite tc21 is added to the run list.

In steps 37–40, the secondary analog output of the simulated process block tc21 is connected to the flow process input of composite pr21, the latter's configure method is called and it is added to the run list.

In lines 43–47, inputs for the information collection block are connected to outputs of blocks and composites of interest, and the former is added to the run list.

In lines 49–50, the composite objects tc21 and pr21 are turned "on" for execution.

The run method of the temperature cascade control loop begins at line 54. This method is called by the control system 10 scheduler each BPC based on the loop's inclusion in the run list. In steps 64–78, the run method of the cascade control loop invokes the run methods of its respective composites and blocks, specifically, those enumerated the run list. Though not shown here, the composites have their own run lists, the blocks on which are called as each composite is called. In the illustrated embodiment, a loop beginning at step 62 limits the foregoing to n cycles, merely for purposes of testing and illustration.

```
public class TempCasc implements Constants
{
    static Supv                   s21 = new Supv();
    static Cascade                tc21 = new Cascade()
    static TempProcess            pr21 = new TempProcess();
    static InfoCollect            ic21 = new InfoCollect(10,0,4,0,0,0);
    static ObjList                comp = new ObjList(10);
    static Floatparameter         tc21_temp;
    static FloatParameter         tc21_flow;
    static void config()
    {
        // User block
        comp.add(s21);
        // Cascade Object
        tc21.getPri().getAin().getInput(0).in = pr21.temp.getOutput().getOut().linkTo(
            tc21.getPri().getAin().getInput(0).in)
        tc21.getPri().getPid().getInput().supvSP = s21.getOutputFloat(0).getOut().linkTo(
            tc21.getPri().getPid().getInput().supvSP)
        tc21.getSec().getAin().getInput(0).in = pr21.flow.getOutput().getOut().linkTo(
            tc21.getsec().getAin().getInput(0).in);
        tc21.config()
        tc21.getPri().getAin().getOutput().alarmHi = new Alarm(
            tc21.getPri().getAin().getOutput().getOut().range);
            tc21.getPri().getAin().getOutput().alarmHi.getHi().setValue(75.);
        tc21.getPri().getAin().getOutput().alarmHi.getLo().setValue(30.);
        tc21.getPri().getPid().getInput().getLrs().setMode(SUPER);
        tc21.getPri().getPid().cntl = s21.parTC;
        tc21.getSec().getPid().cntl = s21.parFC;
        tc21.getSec().getAin().setBlockPeriod(.1);
        comp.add(tc21);
        // TempProcess
        pr21.flow.getInput(0).in = tc21.getSec().getAout().getOutput().getOut().linkTo
            (pr21.flow.getInput(0).in,~CASCADE);
        pr21.config();
        comp.add(pr21);
        // InfoCollect
        ic21.paramFloat[0] = tc21.getSp().linkTo(ic21.paramFloat[0]);
        ic21.paramFloat[1] = tc21.getPv1().linkTo(ic21.paramFloat[1]);
        ic21.paramFloat[2] = tc21.getPv2().linkTo(ic21.paramFloat[2]);
        ic21.paramFloat[3] = tc21.getOut().linkTo(ic21.paramFloat[3]);
        comp.add(ic21);
        tc21.setOffOn(true);
        pr21.setOffOn(true);
    } // end of config()
    public void run()
    {
        int n,i,ii;
        double x;
        long timeStart, dif;
        n = 30;
        timeStart = System.currentTimeMillis();
        for (i = 0; i<=n; i++)
        {
```

-continued

```
        for (int j = 0; j<fc22.getBpcPerPeriod(); j++)
        {
            for (int k = ; k<comp.getLength(); k++)
            {
                if (comp.getList(k)==null) break;
                comp.getList(k).run();
            }
            timeStart += 100L;
            dif = timeStart-System.currentTimeMillis();
            if (dif>0)
            {
                try {Thread.sleep(dif);}
                catch(InterruptedException e) {System.out.println(e);}
            }
        }
    }
    } // end of run()
public static void main(String args[])
{
    TempCasc device = new TempCasc();
    Thread  thd1 = new Thread(device);
    device.config();
    thd1.start();
}
}
```

SUMMARY

Described herein are control systems and method meeting the objects set forth above. Those skilled in the art will appreciate that the illustrated embodiment is an example of the invention and that other embodiments incorporating changes therein fall within the scope of the invention. Thus, by way of example, it will be appreciated that the invention can be practiced utilizing, instead of or in addition to Java objects, Java applets, servlets, and/or software constructs of programming languages other than Java. Moreover, it will be appreciated that the invention can be utilized in a range of control application, including, process, industrial, and environmental, among others. In view thereof, what we claim is:

What is claimed is:

1. A control device comprising:

a virtual machine environment, the virtual machine environment executing an object or other software construct (collectively, "object") that configures the control device to provide a control function, the object communicating a datum with an entity that stores the datum, and the object accessing the datum by reference to storage maintained in the entity.

2. The control device of claim 1, wherein the virtual machine environment is a Java virtual machine, and the object is a Java object.

3. The control device of claim 1, wherein the object accesses the datum via any of a pointer, an address, or a symbolic or other reference to storage maintained in the entity.

4. The control device of claim 3, wherein the object accesses the datum for purposes of any of getting or setting a value thereof.

5. The control device of claim 3, wherein the object does not maintain a copy of the datum.

6. The control device of any one of claims 1–5, wherein the datum is any of a measurement, a setpoint or other value, or any of a range, a status, a limit status, a time stamp or other information pertaining to such measurement, setpoint or other value.

7. The control device of any one of claims 1–5, wherein the object configures the control device to provide any of sensing, actuation and other control functions.

8. The control device of any one of claims 1–5, wherein the object configures the control device to execute one or more control blocks.

9. The control device of claim 8, wherein one or more of the control blocks execute a control algorithm, provide input, and/or provide output.

10. The control device of any one of claims 1–5, wherein the device is any of a workstation, controller, control station, and a field device.

11. The control device of any one of claims 1–5 adapted for providing any of process, industrial, environmental or other control.

12. The control device of any one of claims 1–5, wherein the object comprises one or more mandatory portions for which memory is allocated in the control device at the time of object creation, and one or more optional parts for which memory space is allocated subsequent to object creation as needed.

13. The control device of any one of claims 1–5, comprising a second object that executes in the virtual machine environment, the object and the second object having input and output parts defined from subsets of a common set of input and output classes, respectively.

14. The control device of any one of claims 1–5, wherein the object configures the device to provide an analog input function with multiple inputs coupled to accept readings from multiple respective input devices and to generate an output based on one or more of those readings.

15. A control system comprising:

one or more control devices, each providing a virtual machine environment, a plurality of objects executing in the one or more virtual machine environments, the plurality of objects including a first object and a second object that communicate a datum with one another, the first object maintaining a sole instance of the datum as between at least the first and second objects, the second object accessing the datum by reference.

16. The control system of claim 15, wherein the virtual machine environment maintained by the control devices is a Java virtual machine, and the first object and the second object are Java objects.

17. The control system of claim 15, wherein the second object accesses the datum via any of a pointer, an address, or a symbolic or other reference to the instance of the datum maintained by the first object.

18. The control system of claim 17, wherein the second object accesses the datum for purposes of any of getting or setting a value thereof.

19. The control system of any one of claims 15–18, wherein the datum is any of a measurement, a setpoint or other value, or any of a range, a status, a limit status, a time stamp or other information pertaining to such measurement, setpoint or other value.

20. The control system of any one of claims 15–18, wherein the first and second objects configure control devices on which they execute to provide any of sensing, actuation and other control functions.

21. The control system of any one of claims 15–18, wherein the first and second objects configure the one or more control devices on which they reside to execute control blocks.

22. The control system of claim 21, wherein at least one of the control blocks executes a control algorithm, provides input and/or provides output.

23. The control system of any one of claims 15–18, wherein one or more of the control devices is any of a workstation, controller, control station, and a field device.

24. The control system of any one of claims 15–18 adapted for providing any of process, environmental or other control.

25. The control system of any one of claims 15–18, wherein at least one of the first and second object comprise one or more mandatory portions for which memory is allocated in the control device at the time of object creation, and one or more optional parts for which memory space is allocated subsequent to object creation as needed.

26. The control system of any one of claims 15–18, wherein the first and second objects have input and output parts defined from subsets of a common set of input and output classes, respectively.

27. The control system of any one of claims 15–18, wherein at least one of the first and second objects configures the device to provide an analog input function with multiple inputs coupled to accept readings from multiple respective input devices and to generate an output based on one or more of those readings.

28. A control system comprising:

one or more control devices, each providing a virtual machine environment, a plurality of objects executing in the one or more virtual machine environments, the plurality of objects including a first object and a second object between which a connection is established to communicate with one another one or more data contained in a data structure, the first object maintaining a sole instance of the data structure and data contained therein as between at least the first and second objects, the second object accessing data in the data structure by reference.

29. The control system of claim 28, wherein the data structure comprises a unidirectional variable able having a measurement, a setpoint or other value, and any of a range, a status, a limit status, a time stamp or other information pertaining to such measurement, setpoint or other value.

30. The control system of claim 29, wherein the virtual machine environment maintained by the control devices is a Java virtual machine, and the first object and the second objects are Java objects.

31. The control system of claim 29, wherein the second object accesses data in the data structure via any of a pointer, an address, or a symbolic or other reference to the instance of the data structure maintained by the first object.

32. The control system of claim 29, wherein the second object accesses the data structure for purposes of any of getting or setting a datum thereof.

33. The control system of claim 28, wherein the datum is any of a measurement, a setpoint or other value, or any of a range, a status, a limit status, a time stamp or other information pertaining to such measurement, setpoint or other value.

34. The control system of claim 28, wherein the first and second objects configure control devices on which they execute to provide any of sensing, actuation and other control functions.

35. The control system of claim 28, wherein the first and second objects configure the one or more control devices on which they reside to execute control blocks.

36. The control system of claim 33, wherein at least one of the control blocks executes a control algorithm, provides input and/or provides output.

37. The control system of claim 28, wherein one or more of the control devices is any of a workstation, controller, control station, and a field device.

38. The control system of claim 28 adapted for providing any of process, environmental or other control.

39. The control system of any one of claims 28–38, wherein the data structure comprises a bi-directional variable having a forward-going measurement, setpoint or other value (collectively, "forward-going value"), any of a range, a status, a limit status, a time stamp or other information pertaining to the forward-going value, a back-going measurement, setpoint or other value (collectively, "back-going value"), and any of a range, a status, a limit status, a time stamp or other information pertaining to the back-going value).

40. A control system comprising:

one or more control devices, each providing a virtual machine environment, a plurality of objects executing in the one or more virtual machine environments, the plurality of objects including a first object that communicates a datum with a second object and a third object, the first object maintaining a sole instance of the datum as between at least the first, second and third objects, the second and third objects accessing the datum by reference.

41. A control system comprising:

one or more control devices, each providing a virtual machine environment, a plurality of objects executing in the one or more virtual machine environments, the plurality of objects including a first object with which connections are established by a second object and by a third object, each connection being for the transfer of data contained in a data structure, the first object maintaining a sole instance of the data structure and data contained therein as between at least the first, second and third objects, the second and third objects accessing data in the data structure by reference.

42. The control system of any one of claims 40–41, wherein the data structure comprises a bi-directional variable having a forward-going measurement, setpoint or other value (collectively, "forward-going value"), any of a range, a status, a limit status, a time stamp or other information pertaining to the forward-going value, a back-going measurement, setpoint or other value (collectively, "back-going value"), and any of a range, a status, a limit status, a time stamp or other information pertaining to the back-going value).

43. A method of operating a control device comprising:

executing an object or other software construct (collectively, "object") on a virtual machine environment provided in the control device, the object configuring the control device to provide a control function, communicating a datum between the object and an entity that stores the datum, the object accessing the datum by reference to storage maintained in the entity.

44. The method of claim 43, wherein the virtual machine environment is a Java virtual machine, and wherein the object is a Java object.

45. The method of claim 43, composing accessing the datum from the object via any of a pointer, an address, or a symbolic or other reference to storage maintained in the entity.

46. The method of claim 45, comprising accessing the datum for purposes of any of getting or setting a value thereof.

47. The method of claim 45, wherein the object does not maintain a copy of the datum.

48. The method of any one of claims 43–47, wherein the datum is any of a measurement, a setpoint or other value, or any of a range, a status, a limit status, a time stamp or other information pertaining to such measurement, setpoint or other value.

49. The method of any one of claims 43–47, comprising executing the object to configure the control device to provide any of sensing, actuation and other control functions.

50. The method of any one of claims 43–47, wherein the executing step includes executing one or more control blocks associated with the object.

51. The method of claim 50, wherein one or more of the control blocks comprises a control algorithm, an input function, and/or an output function.

52. The method of any one of claims 43–47, wherein the device is any of a workstation, controller, control station, and a field device.

53. The method of any one of claims 43–47 adapted for providing any of process, industrial, environmental or other control.

54. A method of operating a control system comprising:

executing a plurality of objects in virtual machine environments provided on one or more control devices, the objects configuring the one or more devices to provide control functions, communicating a datum between first and second ones of the plurality of objects, maintaining in the first object a sole instance of the datum, as between at least the first and second objects, and accessing by reference the datum with the second object.

55. The method of claim 54, wherein the virtual machine environment is a Java virtual machine, and the plurality of objects are Java objects.

56. The method of claim 54, wherein the accessing step includes accessing the datum via any of a pointer, an address, or a symbolic or other reference to the instance of the datum maintained by the first object.

57. The method of any one of claims 54–56, wherein the datum is any of a measurement, a setpoint or other value, or any of a range, a status, a limit status, a time stamp or other information pertaining to such measurement, setpoint or other value.

58. The method of any one of claims 54–56, wherein the executing step includes executing at least the first and second objects to configure the control devices to provide any of sensing, actuation and other control functions.

59. The method of any one of claims 54–56, wherein the executing step includes executing one or more control blocks associated with the first and second objects.

60. The method of claim 59, wherein at least one of the control blocks executes a control algorithm, provides input and/or provides output.

61. The method of any one of claims 54–56, wherein one or more of the control devices is any of a workstation, controller, control station, and a field device.

62. The method of any one of claims 54–56 adapted for providing any of process, environmental or other control.

63. A method of operating a control system, comprising:

executing a plurality of objects in virtual machine environments provided on one or more control devices, the objects configuring the one or more devices to provide control functions, communicating one or more data contained in a data structure between first and second ones of the plurality of objects, maintaining in the first object a sole instance of the data structure and data contained therein as between at least the first and second objects, accessing by reference data in the data structure with the second object.

64. The method of claim 63, wherein the data structure comprises a unidirectional variable having a measurement, a setpoint or other value, and any of a range, a status, a limit status, a time stamp or other information pertaining to such measurement setpoint or other value.

65. The method of claim 63, wherein the executing step includes executing at least the first and second objects to configure the control devices to provide any of sensing, actuation and other control functions.

66. The method of claim 63, wherein the executing step includes executing one or more control blocks associated with the first and second objects.

67. The method of claim 63, wherein at least one of the control blocks executes a control algorithm, provides input and/or provides output.

68. The method of claim 63, wherein one or more of the control devices is any of a workstation, controller, control station, and a field device.

69. The method of claim 63 adapted for providing any of process, environmental or other control.

70. The method of any one of claims 63–69, wherein the data structure comprises a bi-directional variable having a forward-going measurement, setpoint or other value (collectively, "forward-going value"), any of a range, a status, a limit status, a time stamp or other information pertaining to the forward-going value, a back-going measurement, setpoint or other value (collectively, "back-going value"), and any of a range, a status, a limit status, a time stamp or other information pertaining to the back-going value).

71. A method of operating a control system, comprising:

executing a plurality of objects in virtual machine environments provided on one or more control devices, the objects configuring the one or more devices to provide control functions, communicating one or more data contained, in a data structure between first one of the objects and second and third ones of the objects, maintaining in the first object a sole instance of the data structure and data contained therein as between at least the first, second and third objects, accessing by reference data in the data structure with the second and third objects.

72. The method of claim 71, wherein the data structure comprises a bi-directional variable having a forward-going measurement, setpoint or other value (collectively, "forward-going value"), any of a range, a status, a limit status, a time stamp or other information pertaining to the forward-going value, a back-going measurement, setpoint or other value (collectively, "back-going value"), and any of a range, a status, a limit status, a time stamp or other information pertaining to the back-going value).

* * * * *

UNITED STATES PATENT AND TRADEMARK OFFICE
CERTIFICATE OF CORRECTION

PATENT NO. : 6,510,352 B1
DATED : January 21, 2003
INVENTOR(S) : Paul C. Badavas and Peter D. Hansen It is certified that error appears in the above-identified patent and that said Letters Patent is hereby corrected as shown below:

<u>Column 64,</u>
Line 2, please delete "able".

<u>Column 65,</u>
Line 33, please delete "composing"; and insert therefore -- comprising --.

Signed and Sealed this

Twenty-second Day of April, 2003

JAMES E. ROGAN
*Director of the United States Patent and Trademark Office*